US012799030B1

(12) United States Patent
Hargis et al.

(10) Patent No.: US 12,799,030 B1
(45) **Date of Patent: *Nov. 17, 2026**

(54) COMPOSITIONS, METHODS, AND SYSTEMS TO FORM VATERITE WITH MAGNESIUM OXIDE

(71) Applicant: Arelac, Inc., San Jose, CA (US)

(72) Inventors: Craig Hargis, Campbell, CA (US); Ryan J Gilliam, San Jose, CA (US)

(73) Assignee: Arelac, Inc., San Jose, CA (US)

( * ) Notice: Subject to any disclaimer, the term of this patent is extended or adjusted under 35 U.S.C. 154(b) by 601 days.

This patent is subject to a terminal disclaimer.

(21) Appl. No.: 18/136,600

(22) Filed: Apr. 19, 2023

Related U.S. Application Data

(63) Continuation of application No. 17/988,560, filed on Nov. 16, 2022, now Pat. No. 11,667,567, which is a continuation of application No. 17/723,718, filed on Apr. 19, 2022, now Pat. No. 11,530,164.

(60) Provisional application No. 63/176,709, filed on Apr. 19, 2021.

(51) Int. Cl.

| | |
|---|---|
| ***C04B 9/12*** | (2006.01) |
| ***C04B 2/10*** | (2006.01) |
| ***C04B 7/34*** | (2006.01) |
| ***C04B 7/36*** | (2006.01) |
| ***C04B 7/43*** | (2006.01) |
| ***C04B 9/20*** | (2006.01) |
| ***C04B 22/12*** | (2006.01) |
| ***C04B 28/10*** | (2006.01) |
| *C04B 111/00* | (2006.01) |

(52) U.S. Cl.
CPC .................. *C04B 9/12* (2013.01); *C04B 2/10* (2013.01); *C04B 7/34* (2013.01); *C04B 7/367* (2013.01); *C04B 7/434* (2013.01); *C04B 9/20* (2013.01); *C04B 22/124* (2013.01); *C04B 28/10* (2013.01); *C04B 2111/00017* (2013.01)

(58) Field of Classification Search
CPC .... C04B 9/12; C04B 2/10; C04B 7/34; C04B 7/367; C04B 7/434; C04B 9/20; C04B 22/124; C04B 28/10; C04B 2111/00017
See application file for complete search history.

(56) References Cited

U.S. PATENT DOCUMENTS

| | | | |
|---|---|---|---|
| 7,771,684 | B2 | 8/2010 | Constantz et al. |
| 7,829,053 | B2 | 11/2010 | Constantz et al. |

(Continued)

FOREIGN PATENT DOCUMENTS

| | | | |
|---|---|---|---|
| CN | 101952326 | A | 1/2011 |
| CN | 104118895 | A | 10/2014 |

(Continued)

OTHER PUBLICATIONS

Bischoff, J.L., Kinetics of calcite nucleation: Magnesium ion inhibition and ionic strength catalysis, J. Geophys. Res., 73 (1968) 3315-3322.

(Continued)

*Primary Examiner* — Michael G Hoang
*Assistant Examiner* — Kurt J Wolford
(74) *Attorney, Agent, or Firm* — Schwegman Lundberg & Woessner, P.A.

(57) ABSTRACT

Provided herein are compositions, methods, and systems comprising vaterite and magnesium oxide.

20 Claims, 7 Drawing Sheets

(56) References Cited

U.S. PATENT DOCUMENTS

| | | | | |
|---|---|---|---|---|
| 7,922,809 | B1 * | 4/2011 | Constantz | C04B 28/04 106/713 |
| 8,906,156 | B2 | 12/2014 | Constantz et al. | |
| 11,377,363 | B2 | 7/2022 | Gilliam et al. | |
| 11,530,164 | B2 | 12/2022 | Hargis et al. | |
| 11,577,965 | B2 | 2/2023 | Weiss et al. | |
| 11,667,567 | B2 | 6/2023 | Hargis et al. | |
| 11,673,832 | B1 | 6/2023 | Hargis et al. | |
| 2012/0031303 | A1 | 2/2012 | Constantz et al. | |
| 2013/0167756 | A1 | 7/2013 | Chen et al. | |
| 2013/0336859 | A1 | 12/2013 | Tavakkoli et al. | |
| 2015/0183654 | A1 | 7/2015 | Tavakkoli et al. | |
| 2015/0307400 | A1 | 10/2015 | Devenney et al. | |
| 2015/0307401 | A1 | 10/2015 | Chen et al. | |
| 2016/0355436 | A1 | 12/2016 | Chen et al. | |
| 2021/0017035 | A1 | 1/2021 | Weiss et al. | |
| 2021/0261429 | A1 | 8/2021 | Weiss et al. | |
| 2022/0306483 | A1 | 9/2022 | Gilliam et al. | |
| 2023/0104761 | A1 | 4/2023 | Weiss et al. | |
| 2023/0107410 | A1 | 4/2023 | Weiss et al. | |
| 2023/0112173 | A1 | 4/2023 | Hargis et al. | |
| 2023/0118703 | A1 | 4/2023 | Weiss et al. | |
| 2023/0145402 | A1 | 5/2023 | Gilliam et al. | |
| 2023/0192546 | A1 | 6/2023 | Hargis et al. | |

FOREIGN PATENT DOCUMENTS

| | | | |
|---|---|---|---|
| CN | 107250186 | A | 10/2017 |
| EP | 3999215 | A1 | 5/2022 |
| JP | S6451369 | | 2/1989 |
| JP | H02302317 | A | 12/1990 |
| JP | 2005279335 | A | 10/2005 |
| JP | 2005279355 | A | 10/2005 |
| JP | 2016166355 | A | 9/2016 |
| WO | WO-2022225904 | A1 | 10/2022 |

OTHER PUBLICATIONS

Bischoff, J.L., Catalysis, inhibition, and the calcite-aragonite problem; II. The vaterite-aragonite transformation, Am. J. Sci., 266 (1968) 80-90.

Co-pending U.S. Appl. No. 18/122,930, inventors Craig; W. Hargis et al., filed Mar. 17, 2023.

Co-pending U.S. Appl. No. 18/139,815, inventors Hargiscraig; W. et al., filed Apr. 26, 2023.

Co-pending U.S. Appl. No. 18/141,129, inventors Hargiscraig; W. et al., filed Apr. 28, 2023.

Co-pending U.S. Appl. No. 18/200,208, inventors Michael; Joseph Weiss et al., filed May 22, 2023.

Gutjahr, A. et al., Studies of the growth and dissolution kinetics of the CaCO3 polymorphs calcite and aragonite II. The influence of divalent cation additives on the growth and dissolution rates, J. Cryst. Growth, 158 (1996) 310-315.

Hargis, et al., Calcium carbonate cement: A carbon capture, utilization, and storage (CCUS) technique. Materials 2021; 14(2709) 1-12 Pages.

PCT/US2022/025312 International Search Report and Written Opinion dated Jun. 30, 2022.

U.S. Appl. No. 17/723,718 Notice of Allowance dated Nov. 15, 2022.

U.S. Appl. No. 17/723,718 Notice of Allowance dated Oct. 26, 2022.

U.S. Appl. No. 17/723,718 Office Action dated Sep. 19, 2022.

U.S. Appl. No. 17/988,560 Notice of Allowance dated Apr. 3, 2023.

U.S. Appl. No. 17/988,560 Office Action dated Mar. 8, 2023.

"United Kingdom Application Serial No. 2208592.2, First Examination Report Under Section 183 mailed Apr. 27, 2023", 3 pgs.

"U.S. Appl. No. 17/723,718, Preliminary Amendment filed Jul. 20, 2022", 7 pgs.

"U.S. Appl. No. 17/723,718, Response filed Oct. 14, 2022 to Non Final Office Action mailed Sep. 19, 2022", 7 pgs.

"U.S. Appl. No. 17/988,560, Preliminary Amendment filed Nov. 16, 2022", 6 pgs.

"U.S. Appl. No. 17/988,560, Response filed Mar. 23, 2023 to Non Final Office Action mailed Mar. 28, 2023", 8 pgs.

"International Application Serial No. PCT US2022 025312, International Preliminary Report on Patentability mailed Nov. 2, 2023", 12 pgs.

"Saudi Arabia Application Serial No. 523451201, Office Action mailed Nov. 5, 2023", With English Translation, 4 pgs.

"Chinese Application Serial No. 202280029743.4, Notification to Make Rectification mailed Nov. 16, 2023", With English Machine Translation, 3 pgs.

"Chinese Application Serial No. 202280029743.4, Response filed Dec. 19, 2023 to Notification to Make Rectification mailed Nov. 16, 2023", 1 pg.

"United Kingdom Application Serial No. 2208592.2, Substantive Examination Report mailed Jun. 5, 2024", 3 pgs.

"United Kingdom Application Serial No. 2208592.2, Response filed Aug. 2, 2024 to Substantive Examination Report mailed Jun. 5, 2024", 6 pgs.

"Japanese Application Serial No. 2023-564140, Notification of Reasons for Refusal mailed Mar. 21, 2025", w English Translation, 11 pgs.

"European Application Serial No. 22792298.6, Extended European Search Report mailed May 30, 2025", 5 pgs.

"European Application Serial No. 22792298.6, Response to Communication pursuant to Rules 1612 and 162 EPC filed Jun. 3, 2024", w claims, 4 pgs.

"Japanese Application Serial No. 2023-564140, Response filed Sep. 30, 2025 to Notification of Reasons for Refusal mailed Mar. 21, 2025", w English Claims, 27 pgs.

"Saudi Arabia Application Serial No. 523451201, Substantive Examination Report mailed Sep. 12, 2025", With English Translation, 18 pgs.

"European Application Serial No. 22792298.6, Response filed Nov. 24, 2025 to Extended European Search Report mailed May 30, 2025", w claims, 5 pgs.

"Japanese Application Serial No. 2023-564140, Examiners Decision of Final Refusal Received Decision of Rejection mailed Dec. 12, 2025", 6 pgs.

"Saudi Arabia Application Serial No. 523451201, Response filed Dec. 11, 2025 to Substantive Examination Report mailed Sep. 12, 2025", w claims, 6 pgs.

"Australian Application Serial No. 2022260483, Voluntary Amendment Filed Mar. 27, 2026", w/claims, 5 pgs.

"Canadian Application Serial No. 3215988, Voluntary Amendment Filed Apr. 1, 2026", w/claims, 5 pgs.

"Chinese Application Serial No. 202280029743.4, Office Action mailed Feb. 4, 2026", w/English Translation, 17 pgs.

"Chinese Application Serial No. 202280029743.4, Response filed Jun. 4, 2026 to Office Action mailed Feb. 4, 2026", W/English Claims, 28 pgs.

"European Application Serial No. 22792298.6, Communication Pursuant to Article 94(3) EPC mailed May 13, 2026", 4 pgs.

"Japanese Application Serial No. 2023-564140, Response filed Apr. 13, 2026 to Examiners Decision of Final Refusal Received (Decision of Rejection) mailed Dec. 12, 2025", w/English claims, 22 pgs.

* cited by examiner

COMPOSITIONS, METHODS, AND SYSTEMS TO FORM VATERITE WITH MAGNESIUM OXIDE

CROSS-REFERENCE TO RELATED APPLICATIONS

This application is a continuation of U.S. patent application Ser. No. 17/988,560, filed Nov. 16, 2022, which is a continuation of U.S. patent application Ser. No. 17/723,718, filed Apr. 19, 2022, issued as U.S. Pat. No. 11,530,164 on Dec. 20, 2022, which claims benefit of U.S. Provisional Application No. 63/176,709 filed Apr. 19, 2021, which are all incorporated herein by reference in their entirety in the present disclosure.

BACKGROUND

Carbon dioxide ($CO_2$) emissions have been identified as a major contributor to the phenomenon of global warming. $CO_2$ is a by-product of combustion, and it creates operational, economical, and environmental problems. It may be expected that elevated atmospheric concentrations of $CO_2$ and other greenhouse gases can facilitate greater storage of heat within the atmosphere leading to enhanced surface temperatures and rapid climate change. In addition, elevated levels of $CO_2$ in the atmosphere may also further acidify the world's oceans due to the dissolution of $CO_2$ and formation of carbonic acid. The impact of climate change and ocean acidification would be economically expensive and environmentally hazardous if not timely handled. Reducing potential risks of climate change requires sequestration and avoidance of $CO_2$ from various anthropogenic processes.

SUMMARY

Provided herein are methods and systems that relate to capturing the $CO_2$ emissions and producing compositions with unique properties that can be used to make cementitious or non-cementitious products.

In one aspect, there is provided cement or non-cement composition, comprising: vaterite and magnesium oxide. In some embodiments of the aforementioned aspect, the vaterite is between about 30-99 wt % and magnesium oxide is between about 1-70 wt %. In some embodiments of the aforementioned aspect and embodiments, the particle size of the vaterite is between about 0.1-100 micron. In some embodiments of the aforementioned aspect and embodiments, the composition is a dry powder composition. In some embodiments of the aforementioned aspect and embodiments, the composition is wet cake composition or is slurry. In some embodiments of the aforementioned aspect and embodiments, the magnesium oxide is under burnt magnesium oxide, soft burnt magnesium oxide, dead burnt magnesium oxide, or combination thereof. In some embodiments of the aforementioned aspect and embodiments, the vaterite is partially on surface of the magnesium oxide. In some embodiments of the aforementioned aspect and embodiments, the composition further comprises admixture, aggregate, additive, Portland cement clinker, supplementary cementitious material (SCM), or combination thereof.

In some embodiments of the aforementioned aspect and embodiments, the composition further comprises aragonite, calcite, magnesium hydroxide, or combination thereof, and water, wherein the composition is a slurry composition. In one aspect, there is provided cement or non-cement slurry composition comprising vaterite, aragonite, calcite, magnesium oxide, magnesium hydroxide, or combination thereof, and water. In some embodiments of the aforementioned aspect, the vaterite transforms to the aragonite and/or the calcite upon dissolution and re-precipitation in water and the magnesium oxide transforms to the magnesium hydroxide. In some embodiments of the aforementioned aspect and embodiments, the aragonite is in shape of network of needles. In some embodiments of the aforementioned aspect and embodiments, the magnesium hydroxide binds the aragonite needles together. In some embodiments of the aforementioned aspect and embodiments, the magnesium hydroxide binds the calcite together. In some embodiments of the aforementioned aspect and embodiments, the magnesium hydroxide stabilizes the aragonite and prevents its transformation to calcite. In some embodiments of the aforementioned aspect and embodiments, the water is bound to the composition in form of the magnesium hydroxide. In some embodiments of the aforementioned aspect and embodiments, the composition has a pH of above 10. In some embodiments of the aforementioned aspect and embodiments, the composition further comprises admixture, aggregate, additive, Portland cement clinker, supplementary cementitious material (SCM), or combination thereof.

In one aspect, there is provided cement or non-cement product comprising aragonite and/or calcite, and magnesium hydroxide wherein the magnesium hydroxide binds the aragonite and/or the calcite together. In some embodiments of the aforementioned aspect, the product has between 0-95% porosity. In some embodiments of the aforementioned aspect and embodiments, the product has compressive strength of more than 0.05 MPa. In some embodiments of the aforementioned aspect and embodiments, the product has a pH of above 10 and prevents steel corrosion. In some embodiments of the aforementioned aspect and embodiments, the aragonite is in shape of network of needles. In some embodiments of the aforementioned aspect and embodiments, the magnesium hydroxide binds the aragonite and/or the calcite together. In some embodiments of the aforementioned aspect and embodiments, the magnesium hydroxide fills porosity of the aragonite and/or the calcite making it dense and less porous. In some embodiments of the aforementioned aspect and embodiments, the magnesium hydroxide stabilizes the aragonite and prevents its transformation to calcite.

In one aspect, there are provided methods to form a composition, comprising:

(i) calcining limestone to form a mixture comprising lime and magnesium oxide, and a gaseous stream comprising carbon dioxide;

(ii) dissolving the mixture comprising lime and magnesium oxide in a N-containing salt solution to produce an aqueous solution comprising calcium salt and magnesium oxide; and (iii) treating the aqueous solution comprising calcium salt and magnesium oxide with the gaseous stream comprising carbon dioxide to form a composition comprising vaterite and magnesium oxide.

In some embodiments of the aforementioned aspect, the method further comprises producing a solid comprising magnesium oxide in step (ii) and treating the aqueous solution comprising calcium salt and magnesium oxide and the solid comprising magnesium oxide with the gaseous stream comprising carbon dioxide to form the composition comprising vaterite, magnesium oxide, and solid comprising magnesium oxide.

In one aspect, there are provided methods to form a composition, comprising:

(i) calcining limestone to form a mixture comprising lime and magnesium oxide, and a gaseous stream comprising carbon dioxide;

(ii) dissolving the mixture comprising lime and magnesium oxide in a N-containing salt solution to produce an aqueous solution comprising calcium salt and a solid comprising magnesium oxide;

(iii) separating the solid from the aqueous solution;

(iv) treating the aqueous solution comprising calcium salt with the gaseous stream comprising carbon dioxide to form a composition comprising vaterite; and (v) mixing the composition comprising vaterite and the solid comprising magnesium oxide.

In one aspect, there are provided methods to form a composition, comprising:

(i) calcining limestone to form a mixture comprising lime and magnesium oxide, and a gaseous stream comprising carbon dioxide;

(ii) dissolving the mixture comprising lime and magnesium oxide, in an aqueous N-containing salt solution to produce a first aqueous solution comprising calcium salt and magnesium oxide, and a gaseous stream comprising ammonia;

(iii) recovering the gaseous stream comprising carbon dioxide and the gaseous stream comprising ammonia and subjecting the gaseous streams to a cooling process to condense a second aqueous solution comprising ammonium bicarbonate, ammonium carbonate, ammonia, ammonia carbamate, or combinations thereof; and (iv) treating the first aqueous solution comprising calcium salt and magnesium oxide with the second aqueous solution comprising ammonium bicarbonate, ammonium carbonate, ammonia, ammonia carbamate, or combinations thereof to form a composition comprising vaterite and magnesium oxide.

In some embodiments of the aforementioned aspect, the method further comprises producing a solid comprising magnesium oxide in step (ii) and treating the first aqueous solution comprising calcium salt and magnesium oxide and the solid comprising magnesium oxide with the second aqueous solution to form the composition comprising vaterite, magnesium oxide, and solid comprising magnesium oxide.

In one aspect, there are provided methods to form a composition, comprising:

(i) calcining limestone to form a mixture comprising lime and magnesium oxide, and a gaseous stream comprising carbon dioxide;

(ii) dissolving the mixture comprising lime and magnesium oxide, in an aqueous N-containing salt solution to produce a first aqueous solution comprising calcium salt, a solid comprising magnesium oxide, and a gaseous stream comprising ammonia;

(iii) separating the solid from the first aqueous solution;

(iv) recovering the gaseous stream comprising carbon dioxide and the gaseous stream comprising ammonia and subjecting the gaseous streams to a cooling process to condense a second aqueous solution comprising ammonium bicarbonate, ammonium carbonate, ammonia, ammonia carbamate, or combinations thereof;

(v) treating the first aqueous solution comprising calcium salt with the second aqueous solution comprising ammonium bicarbonate, ammonium carbonate, ammonia, ammonia carbamate, or combinations thereof to form a composition comprising vaterite; and (vi) mixing the composition comprising vaterite and the solid comprising magnesium oxide.

In some embodiments of the foregoing aspects, the limestone comprises between about 1-70% magnesium or magnesium bearing mineral. In some embodiments of the foregoing aspects and embodiments, the methods further comprise mixing a magnesium bearing mineral with the limestone before the calcination. In some embodiments of the foregoing aspects and embodiments, the magnesium bearing mineral comprises between about 1-70% magnesium. In some embodiments of the foregoing aspects and embodiments, the magnesium or magnesium bearing mineral upon the calcination forms the magnesium oxide. In some embodiments of the foregoing aspects and embodiments, the magnesium bearing mineral comprises magnesium carbonate, calcium magnesium carbonate, magnesium salt, potassium magnesium salt, magnesium hydroxide, magnesium silicate, magnesium iron silicate, magnesium sulfate, or combination thereof. In some embodiments of the foregoing aspects and embodiments, the magnesium bearing mineral comprises magnesium carbonate, magnesium salt, magnesium hydroxide, magnesium silicate, magnesium sulfate, or combination thereof. In some embodiments of the foregoing aspects and embodiments, the magnesium bearing mineral is selected from the group consisting of dolomite, magnesite, brucite, carnallite, talc, olivine, artinite, hydromagnesite, dypingite, barringonite, nesquehonite, lansfordite, kieserite, and combination thereof.

In some embodiments of the foregoing aspects and embodiments, the calcining produces a mixture comprising under burnt lime, soft burnt lime, dead burnt lime, under burnt magnesium oxide, soft burnt magnesium oxide, dead burnt magnesium oxide, or combination thereof. In some embodiments of the foregoing aspects and embodiments, the methods further comprise controlling the calcination process to control components of the mixture. In some embodiments of the foregoing aspects and embodiments, the controlling the calcination process comprises controlling temperature and/or duration of heating of the limestone.

In some embodiments of the foregoing aspects and embodiments, the methods further comprise transforming the vaterite to aragonite and/or calcite upon dissolution and re-precipitation in water and transforming the magnesium oxide to magnesium hydroxide. In some embodiments of the foregoing aspects and embodiments, the methods further comprise forming the aragonite in needle shape. In some embodiments of the foregoing aspects and embodiments, the methods further comprise binding the aragonite and/or the calcite together with the magnesium hydroxide. In some embodiments of the foregoing aspects and embodiments, the methods further comprise stabilizing the aragonite with the magnesium hydroxide and preventing its transformation to calcite. In some embodiments of the foregoing aspects and embodiments, the methods further comprise forming the composition with a pH of above 10. In some embodiments of the foregoing aspects and embodiments, the methods further comprise binding water to the composition in form of the magnesium hydroxide thereby preventing unbound water in the composition.

In some embodiments of the foregoing aspects and embodiments, the methods further comprise setting and hardening of the aragonite and/or the calcite and forming a cement product. In some embodiments of the foregoing aspects and embodiments, the methods further comprise filling porosity of the aragonite and/or the calcite with the magnesium hydroxide making it dense and less porous. In some embodiments of the foregoing aspects and embodiments, the methods further comprise preventing transformation of the aragonite to the calcite due to the presence of the magnesium hydroxide.

In some embodiments of the foregoing aspects and embodiments, the N-containing salt is selected from the group consisting of N-containing inorganic salt, N-containing organic salt, and combination thereof. In some embodiments of the foregoing aspects and embodiments, the calcination is carried out in shaft kiln, rotary kiln, or electric kiln. In some embodiments of the foregoing aspects and embodiments, the N-containing inorganic salt is selected from the group consisting of ammonium halide, ammonium acetate, ammonium sulfate, ammonium sulfite, ammonium nitrate, ammonium nitrite, and combination thereof. In some embodiments of the foregoing aspects and embodiments, the ammonium halide is ammonium chloride.

In some embodiments of the foregoing aspects and embodiments, the aqueous solution or the first aqueous solution further comprises ammonia and/or N-containing salt.

In some embodiments of the foregoing aspects and embodiments, molar ratio of the N-containing salt: the mixture comprising lime and magnesium oxide is between about 0.5:1-3:1.

In some embodiments of the foregoing aspects and embodiments, the dissolving step is under one or more dissolution conditions selected from the group consisting of temperature between about 30-200° C.; pressure between about 0.1-10 atm; the N-containing salt wt % in water between about 0.5-50%; and combination thereof.

In some embodiments of the foregoing aspects and embodiments, no external source of carbon dioxide and/or ammonia is used and the process is a closed loop process.

In some embodiments of the foregoing aspects and embodiments, the gaseous stream comprising ammonia further comprises water vapor.

In some embodiments of the foregoing aspects and embodiments, the gaseous stream further comprises between about 20-90% water vapor.

In some embodiments of the foregoing aspects and embodiments, no external water is added to the cooling process.

In some embodiments of the foregoing aspects and embodiments, the cooling step is under one or more cooling conditions comprising temperature between about 0-100° C.; pressure between about 0.5-50 atm; pH of the aqueous solution between about 8-12; flow rate of the $CO_2$; ratio of $CO_2:NH_3$ between about 0.1:1-20:1; or combination thereof.

In some embodiments of the foregoing aspects and embodiments, the second aqueous solution is formed by the condensation of the gases.

In some embodiments of the foregoing aspects and embodiments, the treating step is under one or more precipitation conditions selected from the group consisting of pH of the aqueous solution or the first aqueous solution of between 7-9, temperature of the solution between 20-60° C., residence time of between 5-60 minutes, or combination thereof.

In some embodiments of the foregoing aspects and embodiments where the solid comprising magnesium oxide is formed, the solid further comprises silicate, iron oxide, alumina, or combination thereof. In some embodiments of the foregoing aspects and embodiments, the solids are between 1-40 wt % in the aqueous solution or the first aqueous solution, in the composition, or combinations thereof.

In some embodiments of the foregoing aspects and embodiments, the methods further comprise separating the solids from the aqueous solution or the first aqueous solution before the treatment step by filtration and/or centrifugation. In some embodiments of the foregoing aspects and embodiments, the separated solids are added back to the composition as filler.

In some embodiments of the foregoing aspects and embodiments, the separated solids further comprise residual ammonium halide when the N-containing inorganic salt is the ammonium halide.

In some embodiments of the foregoing aspects and embodiments, the method further comprises recovering the residual ammonium halide from the solids using a recovery process selected from the group consisting of rinsing, thermal decomposition, pH adjustment, and combination thereof.

In some embodiments of the foregoing aspects and embodiments, the method further comprises dewatering the precipitation material/composition to separate the composition from the supernatant solution.

In some embodiments of the foregoing aspects and embodiments, the composition and the supernatant solution comprise residual N-containing salt.

In some embodiments of the foregoing aspects and embodiments, the method further comprises removing and optionally recovering ammonia and/or N-containing inorganic salt from the residual N-containing inorganic salt comprising removing and optionally recovering the residual N-containing inorganic salt from the supernatant aqueous solution and/or removing and optionally recovering the residual N-containing inorganic salt from the precipitation material/composition.

In some embodiments of the foregoing aspects and embodiments, the method further comprises recovering the residual N-containing inorganic salt from the supernatant aqueous solution using recovery process selected from the group consisting of thermal decomposition, pH adjustment, reverse osmosis, multi-stage flash distillation, multi-effect distillation, vapor recompression, distillation, and combination thereof.

In some embodiments of the foregoing aspects and embodiments, the step of removing and optionally recovering the residual N-containing inorganic salt from the precipitation material/composition comprises heating the composition between about 300-360° C. to evaporate the N-containing inorganic salt from the composition with optional recovery by condensation of the N-containing inorganic salt.

In some embodiments of the foregoing aspects and embodiments, the N-containing inorganic salt is ammonium chloride which evaporates from the composition in a form comprising ammonia gas, hydrogen chloride gas, chlorine gas, or combinations thereof.

In some embodiments of the foregoing aspects and embodiments, the method further comprises recycling the recovered residual ammonia and/or N-containing inorganic salt back to the dissolving and/or treating step of the process.

In some embodiments of the foregoing aspects and embodiments, the aragonite and/or the calcite sets and hardens to form the cementitious product selected from masonry unit, construction panel, conduit, basin, beam, column, slab, acoustic barrier, insulation material, and combination thereof.

In some embodiments of the foregoing aspects and embodiments, the aragonite and/or the calcite sets and hardens to form the non-cementitious product.

In some embodiments of the foregoing aspects and embodiments, the method further comprises adding an additive to the aqueous solution, to the first aqueous solution, and/or to the composition, wherein the additive is selected from the group consisting of fatty acid ester, sodium decyl sulfate, lauric acid, sodium salt of lauric acid, urea, citric acid, sodium salt of citric acid, phthalic acid, sodium salt of phthalic acid, taurine, creatine, dextrose, poly(n-vinyl-1-pyrrolidone), aspartic acid, sodium salt of aspartic acid, magnesium chloride, acetic acid, sodium salt of acetic acid, glutamic acid, sodium salt of glutamic acid, strontium chloride, gypsum, lithium chloride, sodium chloride, glycine, sodium citrate dehydrate, sodium bicarbonate, magnesium sulfate, magnesium acetate, sodium polystyrene, sodium dodecylsulfonate, poly-vinyl alcohol, and combination thereof.

In some embodiments of the foregoing aspects and embodiments, the vaterite is unimodal, bimodal, or multimodal distribution of a particulate composition with an average particle size of between about 0.1-100 micron.

In some embodiments of the foregoing aspects and embodiments, the method further comprises blending the composition with Ordinary Portland Cement (OPC), aggregate, limestone, or combination thereof.

In some embodiments of the foregoing aspects and embodiments, the method further comprises mixing the composition with an admixture selected from the group consisting of set accelerator, set retarder, air-entraining agent, foaming agent, defoamer, alkali-reactivity reducer, bonding admixture, dispersant, coloring admixture, corrosion inhibitor, damp-proofing admixture, gas former, permeability reducer, pumping aid, shrinkage compensation admixture, fungicidal admixture, germicidal admixture, insecticidal admixture, rheology modifying agent, finely divided mineral admixture, pozzolan, aggregate, wetting agent, strength enhancing agent, water repellent, reinforced material, and combination thereof.

In some embodiments of the foregoing aspects and embodiments, the reinforced material is a fiber made of zirconia, aluminum, glass, steel, carbon, ceramic, grass, bamboo, wood, fiberglass, synthetic material, or combination thereof.

In one aspect, there is provided a product formed by the methods according to the aforementioned aspects and the embodiments.

In one aspect, there are provided systems to form a composition, comprising:

(i) a calcining reactor configured to calcine limestone to form a mixture comprising lime and magnesium oxide, and a gaseous stream comprising carbon dioxide;

(ii) a dissolution reactor operably connected to the calcination reactor configured for dissolving the mixture comprising lime and magnesium oxide in an aqueous N-containing salt solution to produce an aqueous solution comprising calcium salt and magnesium oxide; and (iii) a treatment reactor operably connected to the dissolution reactor and the calcination reactor configured for treating the aqueous solution comprising calcium salt and magnesium oxide with the gaseous stream comprising carbon dioxide to form a composition comprising vaterite and magnesium oxide.

In one aspect, there are provided systems to form a composition, comprising:

(i) a calcining reactor configured to calcine limestone to form a mixture comprising lime and magnesium oxide, and a gaseous stream comprising carbon dioxide;

(ii) a dissolution reactor operably connected to the calcination reactor configured for dissolving the mixture comprising lime and magnesium oxide in an aqueous N-containing salt solution to produce a first aqueous solution comprising calcium salt and magnesium oxide, and a gaseous stream comprising ammonia;

(iii) a cooling reactor operably connected to the dissolution reactor and the calcination reactor configured for recovering the gaseous stream comprising carbon dioxide and the gaseous stream comprising ammonia and subjecting the gaseous streams to a cooling process to condense a second aqueous solution comprising ammonium bicarbonate, ammonium carbonate, ammonia, ammonium carbamate, or combinations thereof; and (iv) a treatment reactor operably connected to the dissolution reactor and the cooling reactor configured for treating the first aqueous solution comprising calcium salt and magnesium oxide with the second aqueous solution comprising ammonium bicarbonate, ammonium carbonate, ammonia, ammonium carbamate, or combinations thereof to form a composition comprising vaterite and magnesium oxide.

In some embodiments of the foregoing aspects, the dissolution reactor is integrated with the cooling reactor.

DRAWINGS

The features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

DESCRIPTION

Figure 1:
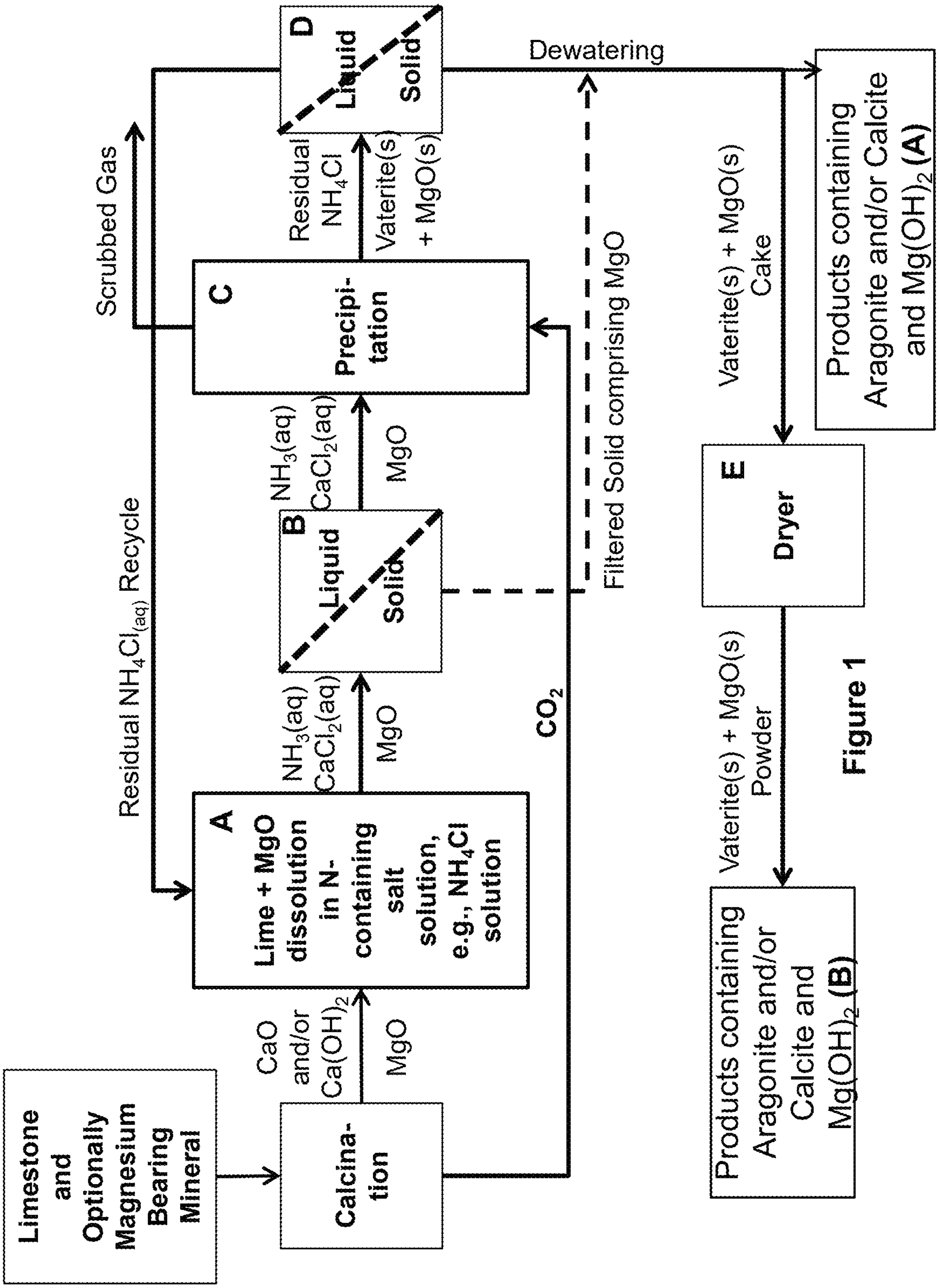
FIG. 1 illustrates some embodiments of the methods and systems provided herein.

Transformation of the calcium carbonate cement may not chemically bind water; therefore, whatever water is used to make the calcium carbonate cement paste, mortar, or concrete, may remain in the cement after the transformation. The remaining water, after evaporation, may contribute to porosity of the calcium carbonate cement paste and negatively affect the hardened cement paste's strength, hardness, and durability. Further, the transformation from the vaterite to either the calcite or the aragonite may result in a decrease in solid volume which may further increase the porosity of the cement, creating durability and strength challenges of the cemented composite.

Applicants have found unique compositions, methods, and systems comprising vaterite and magnesium oxide (MgO) that obviate these challenges and provide durable aragonite cement composite and/or calcite cement composite with high compressive strength. It was unexpectedly found that the transformation of the vaterite to the aragonite and/or the calcite and the magnesium oxide to the magnesium hydroxide, after the dissolution and re-precipitation with water, forms the aragonitic cement and/or the calcitic cement bound to the magnesium hydroxide that has high durability and strength.

Incorporating the magnesium oxide (e.g., periclase) into the vaterite composition may provide one or more of the following advantages. First, the magnesium oxide in the composition comprising the vaterite can provide the magnesium ions necessary to control the transformation of the vaterite into the aragonite (optionally preventing further transformation to the calcite) and/or to the calcite. Second, the magnesium oxide may chemically react with the water to form the magnesium hydroxide. The bound water then may add to the hardened cement paste's volume, thereby reducing the cement paste's porosity. The decrease in porosity may result in increase in strength, hardness, and durability. Third, the presence of the magnesium hydroxide may buffer the pH of the cement's pore solution to approximately more than 9, which may be sufficient to prevent mild steel reinforcement from actively corroding in the cement structures.

Accordingly, provided herein are unique compositions, methods, and systems, comprising the vaterite and the magnesium oxide formed from the limestone which can be used to form various products as described herein. The limestone is calcined to form lime which is treated with an aqueous N-containing salt solution, such as for example only, ammonium salt e.g., aqueous ammonium chloride solution or ammonium acetate solution, to solubilize or dissolve calcium of the lime in an aqueous solution. The magnesium oxide may be formed from the minerals in the limestone during calcination; may be formed from any magnesium bearing mineral separately added to the limestone during calcination; and/or may be added to the composition comprising the vaterite after its formation. All of these methods are well within the scope of the invention and one or more of these methods may be combined to achieve the compositions, methods, and systems provided herein. The dissolved calcium in the form of calcium salt is then treated with the carbon dioxide gas (e.g., $CO_2$ evolved during the calcination of the limestone) to form the precipitation material/composition comprising the vaterite and the magnesium oxide.

Typically, the amount of magnesium in OPC is carefully monitored. When a quarry encounters a seam of magnesium bearing rocks, which would cause them to exceed the magnesium limit, then the quarry may be forced to manage that material separately. If the magnesium content is too high, then the quarry may be forced to set the material aside and not use it or to use it for a low value operation such as building roads in the quarry. Having to set quarried rock aside is undesirable because the quarry may still have the expense of blasting and transporting the rock but may not have the value of the cement produced from the high magnesium rock. However, the unique compositions, methods and systems comprising the vaterite and the magnesium oxide provided herein, add an additional advantage of utilizing these high magnesium bearing rocks by producing the cementitious composition comprising the vaterite and the magnesium oxide. The magnesium oxide in the compositions may be in reactive form that converts to the magnesium hydroxide upon hydration (cementation process).

In some embodiments, the composition comprising the vaterite and the magnesium oxide possesses unique properties, including, but not limited to, cementing properties by transforming to the aragonite and/or the calcite and the magnesium hydroxide, respectively, which sets and cements with high compressive strength, durability, and hardness. In some embodiments, the vaterite transformation to the aragonite and/or the calcite results in the cement that can be used to form building materials and/or cementitious products such as, but not limited to, formed building materials such as construction panels, aggregate, concrete, etc. further described herein. In some embodiments, the vaterite may be used as a filler or supplementary cementitious material (SCM) when mixed with other cement such as Ordinary Portland Cement (OPC). The composition comprising the vaterite and the magnesium oxide may be used as an aggregate where the vaterite and the magnesium oxide after contact with the water transforms to the aragonite and/or the calcite and the magnesium hydroxide, respectively, which sets and cements and which is then chopped up after cementation to form the aggregate. In some embodiments, the composition comprising the vaterite and the magnesium oxide after transformation to the aragonite and/or calcite and the magnesium hydroxide, respectively, may be used as a filler in non-cementitious products such as paper product, polymer product, lubricant, adhesive, rubber product, chalk, asphalt product, paint, abrasive for paint removal, personal care product, cosmetic, cleaning product, personal hygiene product, ingestible product, agricultural product, soil amendment product, pesticide, environmental remediation product, and combination thereof. Such non-cementitious products have been described in U.S. Pat. No. 7,829,053, issued Nov. 9, 2010, which is incorporated herein by reference in its entirety.

The compositions, methods and systems provided herein have several advantages, such as but not limited to, reduction of the carbon dioxide emissions through the incorporation of the carbon dioxide back into the process to form the composition comprising the vaterite and the magnesium oxide. Production of the vaterite containing composition, in the methods and systems provided herein, offers advantages including, operating expense savings through the reduction in fuel consumption, and reductions in carbon footprint. Cement is a significant contributor to global carbon dioxide emissions with over 1.5 billion metric tons emitted per year, corresponding to about 5% of total emissions. Over 50% of the cement emissions may result from the release of carbon dioxide from the decomposition of the limestone feedstock ($CaCO_3 \rightarrow CaO+CO_2$). In the methods and systems provided herein, the emissions of the $CO_2$ from the calcination of the limestone to the lime may be avoided by recapturing it back in the cementitious vaterite and magnesium oxide material. By recapturing the carbon dioxide, the vaterite and the magnesium oxide composition has the potential to eliminate a significant amount of the cement carbon dioxide emissions and total global emissions from all sources. The vaterite and magnesium oxide compositions provided herein can be used to replace the OPC either entirely in building applications such as but not limited to, cement fiber board or partially as the SCM.

I. Methods and Systems

In one aspect, there are provided methods and systems to form the composition comprising the vaterite and the magnesium oxide.

In one aspect, there are provided methods to form the composition, comprising dissolving the lime and the magnesium oxide in the aqueous N-containing salt solution under one or more precipitation conditions to produce the composition comprising vaterite and magnesium oxide.

In one aspect, there are provided methods to form the composition, comprising dissolving a mixture comprising lime and magnesium oxide in the N-containing salt solution under one or more dissolution conditions to produce the aqueous solution comprising calcium salt and magnesium oxide; and treating the aqueous solution comprising calcium salt and magnesium oxide with a gaseous stream comprising carbon dioxide under one or more precipitation conditions to form the composition comprising vaterite and magnesium oxide.

In one aspect, there are provided methods to form the composition, comprising:

(i) calcining limestone to form a mixture comprising lime and magnesium oxide, and a gaseous stream comprising carbon dioxide;

(ii) dissolving the mixture comprising lime and magnesium oxide in the N-containing salt solution to produce the aqueous solution comprising calcium salt and magnesium oxide; and (iii) treating the aqueous solution comprising calcium salt and magnesium oxide with the gaseous stream comprising carbon dioxide to form the composition comprising vaterite and magnesium oxide.

In the aforementioned aspect, in some embodiments, the aqueous solution comprising calcium salt and magnesium oxide further comprises dissolved ammonia and/or dissolved N-containing salt.

In one aspect, there are provided methods to form the composition, comprising:

(i) calcining limestone to form the mixture comprising lime and magnesium oxide, and the gaseous stream comprising carbon dioxide;

(ii) dissolving the mixture comprising lime and magnesium oxide in the N-containing salt solution to produce the aqueous solution comprising calcium salt and magnesium oxide, and a gaseous stream comprising ammonia; and (iii) treating the aqueous solution comprising calcium salt and magnesium oxide with the gaseous stream comprising carbon dioxide and the gaseous stream comprising ammonia to form the composition comprising vaterite and magnesium oxide.

In one aspect, there are provided systems to form the composition, comprising:

(i) a calcining reactor configured to calcine limestone to form the mixture comprising lime and magnesium oxide, and the gaseous stream comprising carbon dioxide;

(ii) a dissolution reactor operably connected to the calcination reactor configured for dissolving the mixture comprising lime and magnesium oxide in the aqueous N-containing salt solution to produce the aqueous solution comprising calcium salt and magnesium oxide; and (iii) a treatment reactor operably connected to the dissolution reactor and the calcination reactor configured for treating the aqueous solution comprising calcium salt and magnesium oxide with the gaseous stream comprising carbon dioxide, to form the composition comprising vaterite and magnesium oxide.

In the aforementioned aspects, in some embodiments, the aqueous solution comprising calcium salt and magnesium oxide further comprises dissolved ammonia and/or dissolved N-containing salt.

In one aspect, there are provided systems to form the composition, comprising:

(i) a calcining reactor configured to calcine limestone to form the mixture comprising lime and magnesium oxide, and the gaseous stream comprising carbon dioxide;

(ii) a dissolution reactor operably connected to the calcination reactor configured for dissolving the mixture comprising lime and magnesium oxide in the aqueous N-containing salt solution to produce the aqueous solution comprising calcium salt and magnesium oxide, and a gaseous stream comprising ammonia; and (iii) a treatment reactor operably connected to the dissolution reactor and the calcination reactor configured for treating the aqueous solution comprising calcium salt and magnesium oxide with the gaseous stream comprising carbon dioxide and the gaseous stream comprising ammonia, to form the composition comprising vaterite and magnesium oxide.

In some embodiments of the aforementioned aspect, the aqueous solution further comprises ammonia and/or the N-containing salt.

Some aspects and embodiments of the methods and systems provided herein are as illustrated in FIGS. 1-4. It is to be understood that the steps illustrated in FIGS. 1-4 may be modified or the order of the steps may be changed or more steps may be added or deleted depending on the desired outcome. As illustrated in FIGS. 1-4, the lime is subjected to methods and systems provided herein to produce the composition comprising vaterite and magnesium oxide The "lime" or "CaO" as used herein relates to calcium oxide and/or calcium hydroxide. The presence and amount of the calcium oxide and/or the calcium hydroxide in the lime would vary depending on the conditions for the lime formation.

The calcination or the calcining is a thermal treatment process to bring about a thermal decomposition of the limestone. The "limestone" as used herein, means $CaCO_3$ and may further include other minerals typically present in the limestone. Limestone is a naturally occurring material. The chemical composition of this material may vary from region to region as well as between different deposits in the same region. Therefore, the lime containing the calcium oxide and/or the calcium hydroxide obtained from calcining the limestone from each natural deposit may be different. The limestone may be composed of calcium carbonate ($CaCO_3$), magnesium carbonate ($MgCO_3$), silica ($SiO_2$), alumina ($Al_2O_3$), iron (Fe), sulfur(S) or other trace elements.

The limestone deposits are widely distributed. The limestone from the various deposits may differ in physical chemical properties and can be classified according to their chemical composition, texture and geological formation. The limestone may be classified into the following types: high calcium limestone where the carbonate content may be composed mainly of calcium carbonate with a magnesium carbonate content not more than 5%; magnesium limestone containing magnesium carbonate to about 5-35%; or dolomitic limestone which may contain between 35-46% of $MgCO_3$, the balance amount is calcium carbonate. The limestone from different sources may differ considerably in chemical compositions and physical structures. It is to be understood that the methods and systems provided herein apply to all the cement plants calcining the limestone from any of the sources listed above or commercially available. The quarries include, but not limited to, quarries associated with cement kilns, quarries for lime rock for aggregate for use in concrete, quarries for lime rock for other purposes (road base), and/or quarries associated with lime kilns.

The limestone calcination is a decomposition process where the chemical reaction for the decomposition of the limestone is:

$$CaCO_3 \longrightarrow CaO + CO_{2\,(g)}$$

The limestone may comprise one or more magnesium bearing mineral. In some embodiments of the foregoing aspects, the limestone comprises between about 1-70% magnesium or magnesium bearing mineral or between about 1-60%, or between about 1-50%, or between about 1-40%, or between about 1-30%, or between about 1-20%, or between about 1-10% magnesium or magnesium bearing mineral.

In some embodiments, the limestone may be a pure calcium carbonate. In some embodiments, the limestone may comprise the magnesium or the magnesium bearing mineral and/or a separate magnesium bearing mineral may be mixed with the limestone before and/or during the calcination. The "magnesium bearing mineral" as used herein includes any mineral that contains the magnesium.

In some embodiments of the foregoing aspects and embodiments, the magnesium in the limestone and/or the magnesium bearing mineral upon the calcination partially or fully forms the magnesium oxide. The chemical equation of the formation of the magnesium oxide from the magnesium bearing mineral, e.g., magnesium carbonate is as below:

$$MgCO_3 \longrightarrow MgO + CO_{2\,(g)}$$

In some embodiments of the foregoing aspects and embodiments, the magnesium bearing mineral comprises magnesium carbonate, such as, e.g., calcium magnesium carbonate, magnesium salt, such as, e.g., potassium magnesium salt, magnesium hydroxide, magnesium silicate, such as, e.g., magnesium iron silicate, magnesium sulfate, or combination thereof. In some embodiments of the foregoing aspects and embodiments, the magnesium bearing mineral is selected from the group consisting of dolomite ($CaMg(CO_3)_2$), magnesite, brucite ($Mg(O)H)_2$), carnallite ($KMgCl_3 \cdot 6(H_2O)$)), talc ($Mg_3Si_4O_{10}(OH)_2$), olivine ($(Mg^{2+}, Fe^{2+})_2SiO_4$), and combination thereof. Other examples include, without limitation, artinite ($MgCO_3 \cdot Mg(OH)_2 \cdot 3H_2O$), hydromagnesite ($Mg_5(CO_3)_4(OH)_2 \cdot 4H_2O$), dypingite ($4MgCO_3 \cdot Mg(OH)_2 \cdot 5H_2O$), barringonite ($MgCO_3 \cdot 2H_2O$), nesquebonite ($MgCO_3 \cdot 3H_2O$), lansfordite ($MgCO_3 \cdot 5H_2O$), kieserite ($MgSO_4 \cdot H_2O$) or any other hydration state of magnesium carbonate or sulfate. Sometimes the magnesium bearing mineral occurs with the limestone.

Figure 2:
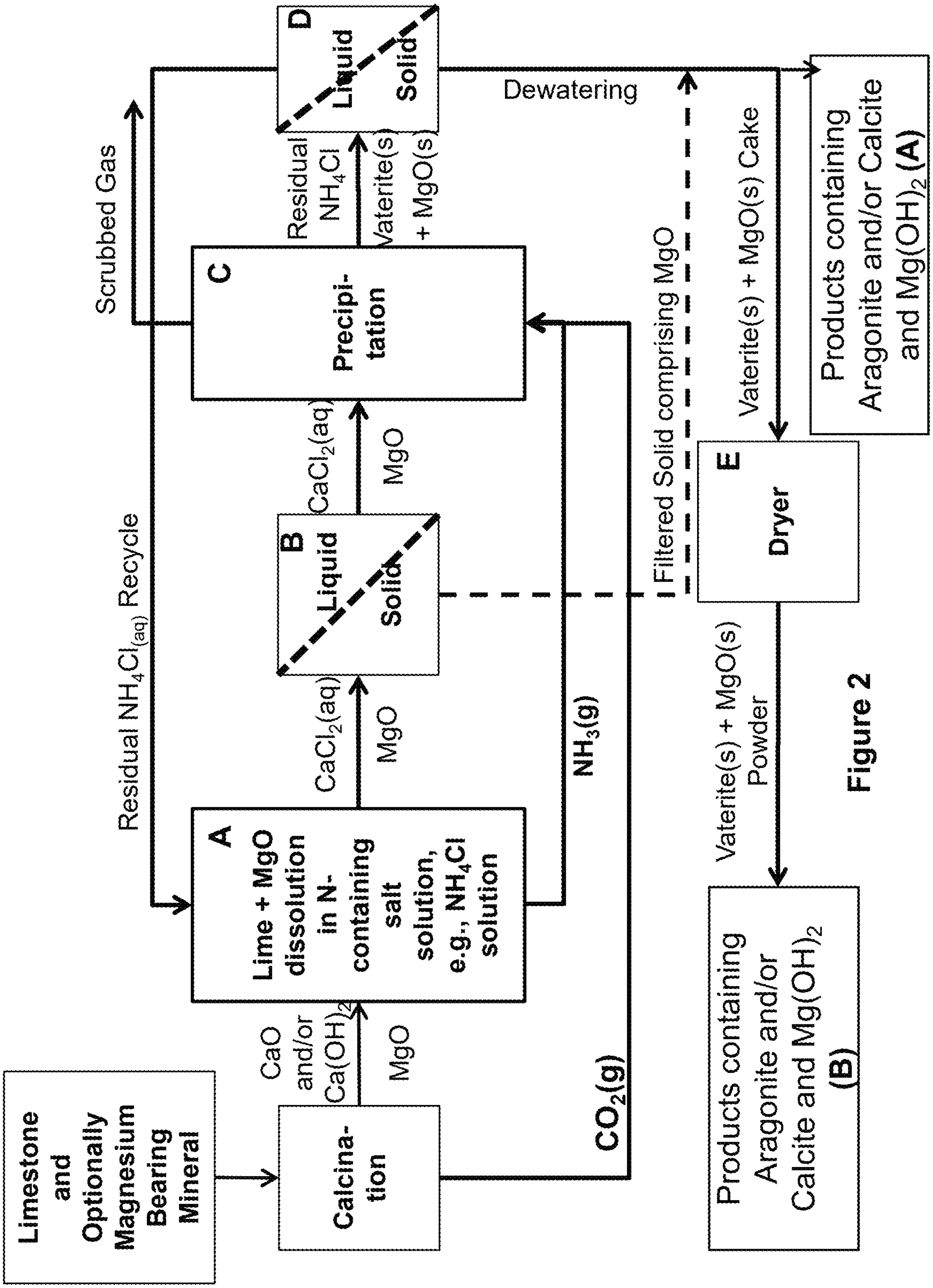
FIG. 2 illustrates some embodiments of the methods and systems provided herein.
Figure 3:
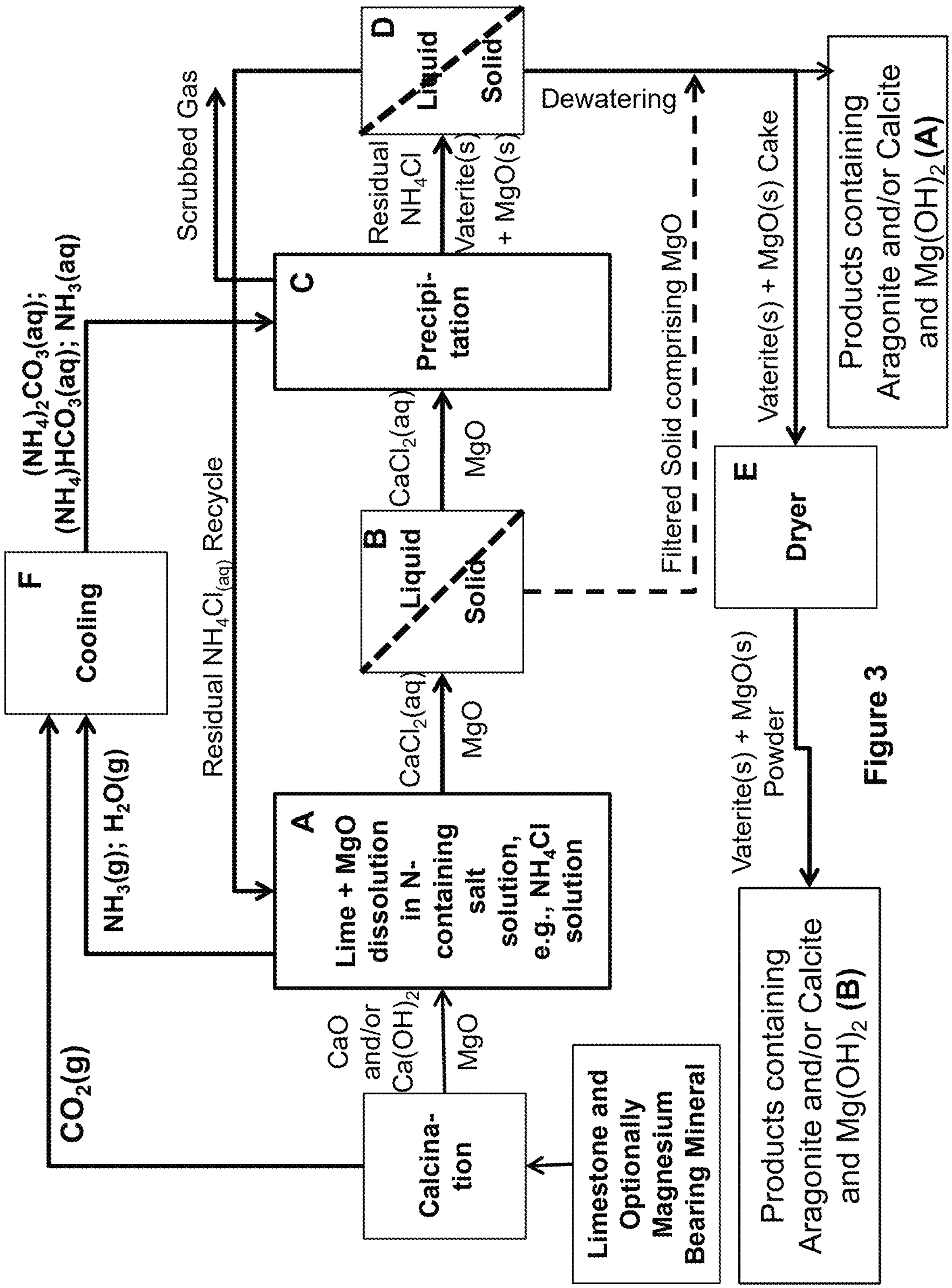
FIG. 3 illustrates some embodiments of the methods and systems provided herein.

This step is illustrated in FIGS. 1-3 as a first step of the calcination of the limestone comprising the magnesium bearing mineral and/or combined with the magnesium bearing mineral to form the mixture comprising lime and magnesium oxide. The lime may be in dry form i.e., calcium oxide, and/or in wet form e.g., calcium hydroxide, depending on the conditions. The production of the lime may depend upon the type of kiln, conditions of the calcination, and the nature of the raw material i.e., the limestone. At relatively low calcination temperatures, products formed in the kiln may contain both un-burnt carbonate and lime and may be called under burnt lime. As the temperature increases, soft burnt or high reactive lime may be produced. At still higher temperatures, dead burnt or low reactive lime may be produced. Soft burnt lime is produced when the reaction front reaches the core of the charged limestone and converts all carbonate present to the lime. A high productive product may be relatively soft, contains small lime crystallites and/or has open porous structure with an easily assessable interior. Such lime may have the optimum properties of high reactivity, high surface area and low bulk density. Increasing the degree of calcination beyond this stage may make lime crystallites grow larger, agglomerate and sinter. This may result in a decrease in surface area, porosity and reactivity and an increase in bulk density. This product may be known as dead burnt or low reactive lime. Without being limited by any theory, the methods and systems provided herein utilize any one or the combination of the aforementioned lime. Therefore, in some embodiments, the lime is under burnt lime, soft burnt lime, dead burnt lime, or combination thereof. Similarly, at relatively low calcination temperatures, products formed in the kiln may contain both un-burnt magnesium bearing mineral and the magnesium oxide and may be called under burnt magnesium oxide. As the temperature increases, soft burnt or high reactive magnesium oxide may be produced. At still higher temperatures, dead burnt or low reactive magnesium oxide may be produced. Soft burnt magnesium oxide is produced when the reaction front reaches the core of the charged magnesium bearing mineral and converts the magnesium bearing mineral present to magnesium oxide. A high productive product may be relatively soft, contains small magnesium oxide crystallites. Such magnesium oxide may have the optimum properties of high reactivity, high surface area and low bulk density. Increasing the degree of the calcination beyond this stage may make magnesium oxide crystallites to grow larger, agglomerate and sinter. This may result in a decrease in surface area, porosity and reactivity and an increase in bulk density. This product may be known as dead burnt or low reactive magnesium oxide. In some embodiments, the aforementioned reactivity of the magnesium oxide relates to its ability to bind with water to form magnesium hydroxide ($Mg(OH)_2$).

In some embodiments, the calcination temperature to calcine the limestone and/or the magnesium bearing mineral is between about 300° C.-1200° C.; or between about 400° C.-1200° C.; or between about 500° C.-1200° C.; or between about 600° C.-1200° C.; or between about 700° C.-1200° C.; or between about 800° C.-1200° C.; or between about 900° C.-1200° C.; or between about 1000° C.-1200° C.; or between about 300° C.-1200° C.; or between about 300° C.-1000° C.; or between about 300° C.-800° C.; or between about 300° C.-500° C.

In some embodiments, the methods and systems provided herein further comprise controlling the calcination process to control components of the mixture comprising the lime and the magnesium oxide. In some embodiments, the calcination process may be controlled in order to obtain the soft burnt or reactive lime as well as the soft burnt magnesium oxide. In some embodiments, the calcination process may be controlled by controlling the temperature and/or duration of the heating of the limestone. In some embodiments, the methods and systems provided herein further comprise controlling the calcination temperature between about 300° C.-1200° C.; or between about 300° C.-800° C., to burn or fire the lime and the magnesium bearing mineral.

Production of the lime by calcining the limestone may be carried out using various types of kilns, such as, but not limited to, a shaft kiln or a rotary kiln or an electric kiln. The use of the electric kiln in the calcination and the advantages associated with it, have been described in U.S. Provisional Application No. 63/046,239, filed Jun. 30, 2020, which is fully incorporated herein by reference in its entirety.

These apparatuses for the calcining or the calcination reactors are suitable for calcining the limestone in the form of lumps having diameters of several to tens of millimeters. Cement plant waste streams include waste streams from both wet process and dry process plants, which plants may employ shaft kilns, rotary kilns, electric kilns, or combinations thereof and may include pre-calciners. These industrial plants may each burn a single fuel or may burn two or more fuels sequentially or simultaneously.

As illustrated in FIGS. 1-3, the limestone comprising the magnesium bearing mineral and/or combined with the magnesium bearing mineral is subjected to the calcination in the cement plant resulting in the formation of the mixture comprising the lime and the magnesium oxide, and the $CO_2$ gas. The lime may be the calcium oxide in the form of a solid from dry kilns/cement processes and/or may be a combination of the calcium oxide and the calcium hydroxide in the form of slurry in wet kilns/cement processes. When wet the calcium oxide (also known as a base anhydride that converts to its hydroxide form in water) may be present in its hydrated form such as but not limited to, the calcium hydroxide. While the calcium hydroxide (also called slaked lime) is a common hydrated form of the calcium oxide, other intermediate hydrated and/or water complexes may also be present in the slurry and are all included within the scope of the methods and systems provided herein. It is to be understood that while the lime is illustrated as CaO in some of the figures herein, it may be present as $Ca(OH)_2$ or combination of CaO and $Ca(OH)_2$.

The lime may be sparingly soluble in water. In the methods and systems provided herein, the lime solubility is increased by its treatment with solubilizers.

In the methods and systems provided herein, the mixture comprising lime and magnesium oxide is solvated or dissolved or solubilized with a solubilizer in a dissolution reactor, such as an aqueous weak acid solution, such as N-containing salt solution (step A in FIGS. 1-3) under one or more dissolution conditions to produce the aqueous solution comprising calcium salt and magnesium oxide. For illustration purposes only, the N-containing salt, e.g., N-containing inorganic salt solution is being illustrated in the figures as ammonium chloride ($NH_4Cl$) solution and the subsequent calcium salt is being illustrated as calcium chloride ($CaCl_2$)). Various examples of the N-containing salt have been provided herein and are all within the scope of the invention.

The N-containing salt include without limitation, N-containing inorganic salt, N-containing organic salt, or combination thereof.

The "N-containing inorganic salt" as used herein includes any inorganic salt with nitrogen in it. Examples of N-containing inorganic salt include, but not limited to, ammonium halide (halide is any halogen), ammonium acetate, ammonium sulfate, ammonium sulfite, ammonium nitrate, ammonium nitrite, and the like. In some embodiments, the ammonium halide is ammonium chloride or ammonium bromide. In some embodiments, the ammonium halide is ammonium chloride.

The "N-containing organic salt" as used herein includes any salt of an organic compound with nitrogen in it. Examples of N-containing organic compounds include, but not limited to, aliphatic amine, alicyclic amine, heterocyclic amine, and combinations thereof.

The "aliphatic amine" as used herein includes any alkyl amine of formula $(R)_n$—$NH_{3-n}$ where n is an integer from 1-3, wherein R is independently between C1-C8 linear or branched and substituted or unsubstituted alkyl. An example of the corresponding halide salt (chloride salt, bromide salt, fluoride salt, or iodide salt) of the alkyl amine of formula $(R)_n$—$NH_{3-n}$ is $(R)_n$—$NH_{4-n}{}^+Cl^-$. In some embodiments, when R is substituted alkyl, the substituted alkyl is independently substituted with halogen, hydroxyl, acid and/or ester.

For example, when R is alkyl in $(R)_n$—$NH_{3-n}$, the alkyl amine can be a primary alkyl amine, such as for example only, methylamine, ethylamine, butylamine, pentylamine, etc.; the alkyl amine can be a secondary amine, such as for example only, dimethylamine, diethylamine, methylethylamine, etc.; and/or the alkyl amine can be a tertiary amine, such as for example only, trimethylamine, triethylamine, etc.

For example, when R is substituted alkyl substituted with hydroxyl in $(R)_n$—$NH_{3-n}$, the substituted alkyl amine is an alkanolamine including, but not limited to, monoalkanolamine, dialkanolamine, or trialkanolamine, such as e.g., monoethanolamine, diethanolamine, or triethanolamine, etc.

For example, when R is substituted alkyl substituted with halogen in $(R)_n$—$NH_{3-n}$, the substituted alkyl amine is, for example, chloromethylamine, bromomethylamine, chloroethylamine, bromoethylamine, etc.

For example, when R is substituted alkyl substituted with acid in $(R)_n$—$NH_{3-n}$, the substituted alkyl amine is, for example, amino acids. In some embodiments, the aforementioned amino acid has a polar uncharged alkyl chain, examples include without limitation, serine, threonine, asparagine, glutamine, or combinations thereof. In some embodiments, the aforementioned amino acid has a charged alkyl chain, examples include without limitation, arginine, histidine, lysine, aspartic acid, glutamic acid, or combinations thereof. In some embodiments, the aforementioned amino acid is glycine, proline, or combination thereof.

The "alicyclic amine" as used herein includes any alicyclic amine of formula $(R)_n$—$NH_{3-n}$ where n is an integer from 1-3, wherein R is independently one or more all-carbon rings which may be either saturated or unsaturated, but do not have aromatic character. Alicyclic compounds may have one or more aliphatic side chains attached. An example of the corresponding salt of the alicyclic amine of formula $(R)_n$—$NH_{3-n}$ is $(R)_n$—$NH_{4-n}{}^+Cl^-$. Examples of alicyclic amine include, without limitation, cycloalkylamine: cyclopropylamine, cyclobutylamine, cyclopentylamine, cyclohexylamine, cycloheptylamine, cyclooctylamine, and so on.

The "heterocyclic amine" as used herein includes at least one heterocyclic aromatic ring attached to at least one amine. Examples of heterocyclic rings include, without limitation, pyrrole, pyrrolidine, pyridine, pyrimidine, etc. Such chemicals are well known in the art and are commercially available.

In the methods and systems provided herein, the mixture comprising lime and magnesium oxide is dissolved or solubilized with the solubilizer, such as the N-containing salt solution (step A in FIGS. 1-3) under one or more dissolution conditions to produce the aqueous solution comprising the calcium salt and the magnesium oxide. During and/or after the dissolution process, ammonia and/or the N-containing salt may remain dissolved in the aqueous solution and/or the gaseous stream comprising ammonia may be formed.

As illustrated in step A of FIGS. 1-3, the N-containing salt is exemplified as ammonium chloride ($NH_4Cl$). The lime is solubilized by treatment with $NH_4Cl$ (new and recycled as further explained below) when the reaction that may occur is:

$$CaO + 2\,NH_4Cl(aq) \longrightarrow CaCl_2\,(aq) + 2\,NH_3 + H_2O$$

$$Ca(OH)_2 + 2\,NH_4Cl(aq) \longrightarrow 2\,NH_3 + CaCl_2 + 2H_2O$$

Similarly, when the base is N-containing organic salt, the reaction may be shown as below:

$$CaO + 2\,NH_3RCl \longrightarrow CaCl_2\,(aq) + 2NH_2R + H_2O$$

In some embodiments, the N-containing salt, such as, the N-containing inorganic salt such as, but not limited to, an ammonium salt, e.g., the ammonium chloride solution or the ammonium acetate solution may be supplemented with anhydrous ammonia or an aqueous solution of ammonia to maintain an optimum level of the N-containing salt, such as, the ammonium chloride or the ammonium acetate in the solution.

In some embodiments, the aqueous solution comprising calcium salt and magnesium oxide obtained after dissolution of the mixture comprising lime and magnesium oxide may contain sulfur depending on the source of the lime. The sulfur may get introduced into the aqueous solution after the solubilization of the lime with any of the N-containing salts described herein. In an alkaline solution, various sulfur compounds containing various sulfur ionic species may be present in the solution including, but not limited to, sulfite ($SO_3^{2-}$), sulfate ($SO_4^{2-}$), hydrosulfide ($HS^-$), thiosulfate ($S_2O_3^{2-}$), polysulfides ($S_n^{2-}$), thiol (RSH), and the like. The “sulfur compound” as used herein, includes any sulfur ion containing compound.

In some embodiments, the aqueous solution further comprises the N-containing salt, such as, ammonia and/or N-containing inorganic or N-containing organic salt.

In some embodiments, the amount of the N-containing salt such as, the N-containing inorganic salt, the N-containing organic salt, or combinations thereof, is in more than 20% excess or more than 30% excess to the mixture comprising lime and magnesium oxide. In some embodiments, the molar ratio of the N-containing salt: the mixture comprising lime and magnesium oxide (or the N-containing inorganic salt: the mixture comprising lime and magnesium oxide; or the N-containing organic salt: the mixture comprising lime and magnesium oxide; or the ammonium chloride: the mixture comprising lime and magnesium oxide; or the ammonium acetate: the mixture comprising lime and magnesium oxide) is between 0.5:1-3:1; or 0.5:1-2:1; or 0.5:1-1.5:1; or 1:1-1.5:1; or 1.5:1; or 2:1; or 2.5:1; or 1:1; or 3:1.

In some embodiments of the methods described herein, no polyhydroxy compounds are used to form the precipitation material and/or the products provided herein.

In some embodiments of the methods and systems described herein, the one or more dissolution conditions are selected from the group consisting of temperature between about 30-200° C., or between about 30-150° C., or between about 30-100° C., or between about 30-75° C., or between about 30-50° C., or between about 40-200° C., or between about 40-150° C., or between about 40-100° C., or between about 40-75° C., or between about 40-50° C., or between about 50-200° C., or between about 50-150° C., or between about 50-100° C.; pressure between about 0.1-50 atm, or between about 0.1-40 atm, or between about 0.1-30 atm, or between about 0.1-20 atm, or between about 0.1-10 atm, or between about 0.5-20 atm; the N-containing inorganic or organic salt wt % in water between about 0.5-50%, or between about 0.5-25%, or between about 0.5-10%, or between about 3-30%, or between about 5-20%; or combination thereof.

Agitation may be used to affect dissolution of the mixture comprising lime and magnesium oxide with the aqueous N-containing salt solution in the dissolution reactor, for example, by eliminating hot and cold spots. In some embodiments, the concentration of the lime and the magnesium oxide in water may be between 1 and 10 g/L, 10 and 20 g/L, 20 and 30 g/L, 30 and 40 g/L, 40 and 80 g/L, 80 and 160 g/L, 160 and 320 g/L, 320 and 640 g/L, or 640 and 1280 g/L. To optimize the dissolution/solvation of the lime, high shear mixing, wet milling, and/or sonication may be used to break open the lime. During or after high shear mixing and/or wet milling, the lime suspension may be treated with the N-containing salt solution.

In some embodiments, the dissolution of the mixture comprising lime and magnesium oxide with the N-containing salt solution (illustrated as e.g., ammonium chloride) results in the formation of the aqueous solution comprising calcium salt and solids. In some embodiments, the magnesium oxide formed after the calcination may stay as the solid and may not dissolve or may dissolve partially in the N-containing salt solution. This solid may and/or may not be separated from the aqueous solution comprising calcium salt.

Accordingly, in one aspect, there are provided methods to form the composition, comprising:

- (i) calcining limestone to form the mixture comprising lime and magnesium oxide, and the gaseous stream comprising carbon dioxide;
- (ii) dissolving the mixture comprising lime and magnesium oxide in the N-containing salt solution to produce the aqueous solution comprising calcium salt and the solid comprising magnesium oxide;
- (iii) separating the solid from the aqueous solution;
- (iv) treating the aqueous solution comprising calcium salt with the gaseous stream comprising carbon dioxide to form the composition comprising vaterite; and
- (v) mixing the composition comprising vaterite and the solid comprising magnesium oxide.

In one aspect, there are provided methods to form the composition, comprising:

- (i) calcining limestone to form the mixture comprising lime and magnesium oxide, and the gaseous stream comprising carbon dioxide;
- (ii) dissolving the mixture comprising lime and magnesium oxide in the N-containing salt solution to produce the aqueous solution comprising calcium salt, the solid comprising magnesium oxide, and the gaseous stream comprising ammonia;

(iii) separating the solid from the aqueous solution;

(iv) treating the aqueous solution comprising calcium salt with the gaseous stream comprising carbon dioxide and the gaseous stream comprising ammonia to form the composition comprising vaterite; and (v) mixing the composition comprising vaterite and the solid comprising magnesium oxide.

In one aspect, there are also provided methods to form the composition, comprising:

(i) calcining limestone to form the mixture comprising lime and magnesium oxide, and the gaseous stream comprising carbon dioxide;

(ii) dissolving the mixture comprising lime and magnesium oxide in the N-containing salt solution to produce the aqueous solution comprising calcium salt and the solid comprising magnesium oxide; and (iii) treating the aqueous solution comprising calcium salt and the solid comprising magnesium oxide with the gaseous stream comprising carbon dioxide to form the composition comprising vaterite and the solid comprising magnesium oxide.

In one aspect, there are also provided methods to form the composition, comprising:

(i) calcining limestone to form the mixture comprising lime and magnesium oxide, and the gaseous stream comprising carbon dioxide;

(ii) dissolving the mixture comprising lime and magnesium oxide in the N-containing salt solution to produce the aqueous solution comprising calcium salt, the solid comprising magnesium oxide, and the gaseous stream comprising ammonia; and (iii) treating the aqueous solution comprising calcium salt and the solid comprising magnesium oxide with the gaseous stream comprising carbon dioxide and the gaseous stream comprising ammonia to form the composition comprising vaterite and the solid comprising magnesium oxide.

In another aspect, there are provided systems to form the composition, comprising:

(i) a calcining reactor configured to calcine limestone to form the mixture comprising lime and magnesium oxide, and the gaseous stream comprising carbon dioxide;

(ii) a dissolution reactor operably connected to the calcination reactor configured for dissolving the mixture comprising lime and magnesium oxide in the aqueous N-containing salt solution to produce the aqueous solution comprising calcium salt and the solid comprising magnesium oxide; and (iii) a treatment reactor operably connected to the dissolution reactor and the calcination reactor configured for treating the aqueous solution comprising calcium salt and the solid comprising magnesium oxide with the gaseous stream comprising carbon dioxide, to form the composition comprising vaterite and magnesium oxide.

In another aspect, there are provided systems to form the composition, comprising:

(i) a calcining reactor configured to calcine limestone to form the mixture comprising lime and magnesium oxide, and the gaseous stream comprising carbon dioxide;

(ii) a dissolution reactor operably connected to the calcination reactor configured for dissolving the mixture comprising lime and magnesium oxide in the aqueous N-containing salt solution to produce the aqueous solution comprising calcium salt, the solid comprising magnesium oxide, and the gaseous stream comprising ammonia; and (iii) a treatment reactor operably connected to the dissolution reactor and the calcination reactor configured for treating the aqueous solution comprising calcium salt and the solid comprising magnesium oxide with the gaseous stream comprising carbon dioxide and the gaseous stream comprising ammonia, to form the composition comprising vaterite and magnesium oxide.

In another aspect, there are provided systems to form the composition, comprising:

(i) a calcining reactor configured to calcine limestone to form the mixture comprising lime and magnesium oxide, and the gaseous stream comprising carbon dioxide;

(ii) a dissolution reactor operably connected to the calcination reactor configured for dissolving the mixture comprising lime and magnesium oxide in the aqueous N-containing salt solution to produce the aqueous solution comprising calcium salt and the solid comprising magnesium oxide;

(iii) a separator operably connected to the dissolution reactor configured to separate the solid from the aqueous solution;

(iv) a treatment reactor operably connected to the separator, the dissolution reactor, and the calcination reactor configured for treating the aqueous solution comprising calcium salt with the gaseous stream comprising carbon dioxide, to form the composition comprising vaterite; and (v) a mixer operably connected to the treatment reactor and the separator configured to mix the composition comprising vaterite and the solid comprising magnesium oxide.

As noted in the aforementioned aspects, the solid comprising magnesium oxide may and/or may not be separated from the aqueous solution comprising calcium salt, in the methods and systems provided herein. This step is illustrated as step B (including dashed arrows) in the FIGS. 1-3.

In some embodiments, the solid comprising magnesium oxide may be removed from the aqueous solution of the calcium salt (shown as dashed lines from step B in FIGS. 1-3) before the aqueous solution is treated with the carbon dioxide in the process. The solid comprising magnesium oxide may optionally be removed or separated from the aqueous solution by separators, such as e.g., filtration and/or centrifugation.

It is to be understood that the separation in step B in FIGS. 1-3 is optional and in some embodiments, the solid comprising magnesium oxide may not be removed from the aqueous solution and the aqueous solution comprising calcium salts as well as the solid comprising magnesium oxide are contacted with the carbon dioxide (in step C in FIGS. 1-3) to form the precipitate. In such embodiments, the composition comprising vaterite further comprises solid comprising magnesium oxide.

In some embodiments, the solid comprising magnesium oxide obtained after the dissolution of the lime further comprises calcium depleted solid and may optionally be used as a cement substitute (such as a substitute for Portland cement). In some embodiments, the solid comprising magnesium oxide, may further comprise silicate, iron oxide, aluminate, or combination thereof. The silicate includes, without limitation, clay (phyllosilicate), alumino-silicate, etc.

In some embodiments, the solid comprising magnesium oxide is between 1-75 wt %; or between 1-70 wt %; or between 1-60 wt %; or between 1-50 wt %; or between 1-40 wt %; or between 1-30 wt %; or between 1-20 wt %; or between 1-10 wt % or between 1-5 wt %; or between 1-2 wt %, in the aqueous solution, in the vaterite cake, in the composition comprising vaterite, or combination thereof. In some embodiments, the solid comprising magnesium oxide is between 1-75 wt %; or between 1-70 wt %; or between 1-60 wt %; or between 1-50 wt %; or between 1-40 wt %; or between 1-30 wt %; or between 1-20 wt %; or between 1-10 wt % or between 1-5 wt %; or between 1-2 wt %, of dissolved cement mass. In some embodiments, the solid comprising magnesium oxide is between 1-75 wt %; or between 1-70 wt %; or between 1-60 wt %; or between 1-50 wt %; or between 1-40 wt %; or between 1-30 wt %; or between 1-20 wt %; or between 1-10 wt % or between 1-5 wt %; or between 1-2 wt % of total solid produced (vaterite and solid).

As illustrated in step C in FIG. 1, the aqueous solution comprising calcium salt and magnesium oxide and optionally the solid comprising magnesium oxide and dissolved ammonia and/or ammonium salt is contacted under one or more precipitation conditions with the gaseous stream comprising carbon dioxide recycled from the calcination step of the respective process, to form the composition/precipitation material comprising vaterite, magnesium oxide, and a supernatant solution, shown in the reaction below:

$$CaCl_2(aq) + 2NH_3(aq) + MgO + CO_2(g) + H_2O \longrightarrow CaCO_3(s) + MgO + 2NH_4Cl(aq)$$

The absorption of the $CO_2$ into the aqueous solution produces $CO_2$-charged water containing carbonic acid, a species in equilibrium with both bicarbonate and carbonate. The precipitation material/composition is prepared under the one or more precipitation conditions (as described herein) suitable to form the vaterite.

In some embodiments, as illustrated in FIG. 2, the gaseous stream comprising $CO_2$ from the calcination step and the gaseous stream comprising $NH_3$ from step A of the process is recirculated to the precipitation reactor (step C) for the formation of the composition/precipitation material. Remaining steps of FIG. 2 are identical to the steps of FIG. 1. It is to be understood that the processes of both FIG. 1 and FIG. 2 can also take place simultaneously such that the N-containing salt, such as the N-containing inorganic salt or the N-containing organic salt and the by-product ammonia may be partially present in the aqueous solution and partially present in the gaseous stream.

The reaction taking place in the aforementioned aspect may be shown as below:

$$CaCl_2(aq) + 2NH_3(g) + CO_2(g) + MgO + H_2O \longrightarrow CaCO_3(s) + MgO + 2NH_4Cl(aq)$$

In some embodiments of the aspects and embodiments provided herein, the gaseous stream comprising ammonia may have ammonia from an external source and/or is recovered and recirculated from step A of the process.

In some embodiments of the aspects and embodiments provided herein, wherein the gaseous stream comprises ammonia and/or the gaseous stream comprises carbon dioxide, no external source of carbon dioxide and/or ammonia is used, and the process is a closed loop process. Such closed loop process is being illustrated in the figures described herein.

In some embodiments, the dissolution of the mixture comprising lime and magnesium oxide with the N-containing organic salt may not result in the formation of the ammonia gas or the amount of ammonia gas formed may not be substantial. In embodiments where the ammonia gas is not formed or is not formed in substantial amounts, the methods and systems illustrated in FIG. 1 where the aqueous solution comprising calcium salt is treated with the carbon dioxide gas, are applicable. In such embodiments, the organic amine salt may remain in the aqueous solution in fully or partially dissolved state or may separate as an organic amine layer, as shown in the reaction below:

$$CaO + MgO + 2NH_3R^+Cl^- \longrightarrow CaCl_2(aq) + MgO + 2NH_2R + H_2O$$

The N-containing organic salt or the N-containing organic compound remaining in the supernatant solution after the precipitation may be called residual N-containing organic salt or residual N-containing organic compound. Methods and systems have been described herein to recover the residual compounds from the precipitate as well as the supernatant solution.

In one aspect, there are provided methods to form the composition, comprising:

(i) calcining the limestone to form the mixture comprising lime and magnesium oxide, and the gaseous stream comprising carbon dioxide;
(ii) dissolving the mixture comprising lime and magnesium oxide, in the aqueous N-containing salt solution to produce a first aqueous solution comprising calcium salt and magnesium oxide, and the gaseous stream comprising ammonia;
(iii) recovering the gaseous stream comprising carbon dioxide and the gaseous stream comprising ammonia and subjecting the gaseous streams to a cooling process to condense a second aqueous solution comprising ammonium bicarbonate, ammonium carbonate, ammonia, ammonia carbamate, or combinations thereof; and
(iv) treating the first aqueous solution comprising calcium salt and magnesium oxide with the second aqueous solution comprising ammonium bicarbonate, ammonium carbonate, ammonia, ammonia carbamate, or combinations thereof to form the composition comprising vaterite and magnesium oxide.

In one aspect, there are provided methods to form the composition, comprising:

(i) calcining the limestone to form the mixture comprising lime and magnesium oxide, and the gaseous stream comprising carbon dioxide;
(ii) dissolving the mixture comprising lime and magnesium oxide, in the aqueous N-containing salt solution to produce the first aqueous solution comprising calcium salt, the solid comprising magnesium oxide, and the gaseous stream comprising ammonia;
(iii) separating the solid from the first aqueous solution;
(iv) recovering the gaseous stream comprising carbon dioxide and the gaseous stream comprising ammonia and subjecting the gaseous streams to the cooling process to condense the second aqueous solution comprising ammonium bicarbonate, ammonium carbonate, ammonia, ammonia carbamate, or combinations thereof;

(v) treating the first aqueous solution comprising calcium salt with the second aqueous solution comprising ammonium bicarbonate, ammonium carbonate, ammonia, ammonia carbamate, or combinations thereof to form the composition comprising vaterite; and (vi) mixing the composition comprising vaterite and the solid comprising magnesium oxide. In one aspect, there are provided methods to form the composition, comprising:

(i) calcining the limestone to form the mixture comprising lime and magnesium oxide, and the gaseous stream comprising carbon dioxide;

(ii) dissolving the mixture comprising lime and magnesium oxide, in the aqueous N-containing salt solution to produce the first aqueous solution comprising calcium salt, the solid comprising magnesium oxide, and the gaseous stream comprising ammonia;

(iii) recovering the gaseous stream comprising carbon dioxide and the gaseous stream comprising ammonia and subjecting the gaseous streams to the cooling process to condense the second aqueous solution comprising ammonium bicarbonate, ammonium carbonate, ammonia, ammonia carbamate, or combinations thereof; and (iv) treating the first aqueous solution comprising calcium salt and the solid comprising magnesium oxide with the second aqueous solution comprising ammonium bicarbonate, ammonium carbonate, ammonia, ammonia carbamate, or combinations thereof to form the composition comprising vaterite and the solid comprising magnesium oxide.

In one aspect, there are provided systems to form the composition, comprising:

(i) a calcining reactor configured to calcine the limestone to form the mixture comprising lime and magnesium oxide, and the gaseous stream comprising carbon dioxide;

(ii) a dissolution reactor operably connected to the calcination reactor configured for dissolving the mixture comprising lime and magnesium oxide in the aqueous N-containing salt solution to produce the first aqueous solution comprising calcium salt and magnesium oxide, and the gaseous stream comprising ammonia;

(iii) a cooling reactor operably connected to the dissolution reactor and the calcination reactor configured for recovering the gaseous stream comprising carbon dioxide and the gaseous stream comprising ammonia and subjecting the gaseous streams to the cooling process to condense the second aqueous solution comprising ammonium bicarbonate, ammonium carbonate, ammonia, ammonium carbamate, or combinations thereof; and (iv) a treatment reactor operably connected to the dissolution reactor and the cooling reactor configured for treating the first aqueous solution comprising calcium salt and magnesium oxide with the second aqueous solution comprising ammonium bicarbonate, ammonium carbonate, ammonia, ammonium carbamate, or combinations thereof to form the composition comprising vaterite and magnesium oxide.

In another aspect, there are provided systems to form the composition, comprising:

(i) a calcining reactor configured to calcine the limestone to form the mixture comprising lime and magnesium oxide, and the gaseous stream comprising carbon dioxide;

(ii) a dissolution reactor operably connected to the calcination reactor configured for dissolving the mixture comprising lime and magnesium oxide in the aqueous N-containing salt solution to produce the first aqueous solution comprising calcium salt, the solid comprising magnesium oxide, and the gaseous stream comprising ammonia;

(iii) a separator operably connected to the dissolution reactor configured to separate the solid from the first aqueous solution;

(iv) a cooling reactor operably connected to the dissolution reactor and the calcination reactor configured for recovering the gaseous stream comprising carbon dioxide and the gaseous stream comprising ammonia and subjecting the gaseous streams to the cooling process to condense the second aqueous solution comprising ammonium bicarbonate, ammonium carbonate, ammonia, ammonium carbamate, or combinations thereof;

(v) a treatment reactor operably connected to the separator and the cooling reactor configured for treating the first aqueous solution with the second aqueous solution to form the composition comprising vaterite; and (vi) a mixer operably connected to the treatment reactor and the separator configured to mix the composition comprising vaterite and the solid comprising magnesium oxide.

In another aspect, there are provided systems to form the composition, comprising:

(i) a calcining reactor configured to calcine the limestone to form the mixture comprising lime and magnesium oxide, and the gaseous stream comprising carbon dioxide;

(ii) a dissolution reactor operably connected to the calcination reactor configured for dissolving the mixture comprising lime and magnesium oxide in the aqueous N-containing salt solution to produce the first aqueous solution comprising calcium salt, the solid comprising magnesium oxide, and the gaseous stream comprising ammonia;

(iii) a cooling reactor operably connected to the dissolution reactor and the calcination reactor configured for recovering the gaseous stream comprising carbon dioxide and the gaseous stream comprising ammonia and subjecting the gaseous streams to the cooling process to condense the second aqueous solution comprising ammonium bicarbonate, ammonium carbonate, ammonia, ammonium carbamate, or combinations thereof; and (iv) a treatment reactor operably connected to the dissolution and the cooling reactor configured for treating the first aqueous solution and the solid comprising magnesium oxide with the second aqueous solution, to form the composition comprising vaterite and the solid comprising magnesium oxide.

The aforementioned aspects are illustrated in FIG. 3, wherein the gaseous stream comprising $CO_2$ from the calcination step/reactor and the gaseous stream comprising $NH_3$ from step A of the process is recirculated to the cooling reactor/reaction (step F) for the formation of the carbonate and bicarbonate solutions as shown in the reactions further herein below. Remaining steps of FIG. 3 are identical to the steps of FIGS. 1 and 2. It is to be understood that the first aqueous solution comprising calcium salt as provided herein is same as the aqueous solution comprising calcium salt described herein. The aqueous solution comprising calcium salt is described as first aqueous solution only for clarity when it needs to be differentiated from the second aqueous solution.

It is to be understood that the aforementioned aspects illustrated in FIG. 3 may be combined with the aspects illustrated in FIG. 1 and/or FIG. 2 such that the precipitation step C comprises treating the first aqueous solution comprising calcium salt and magnesium oxide or the solid comprising magnesium oxide with the second aqueous solution comprising ammonium bicarbonate, ammonium carbonate, ammonia, or combinations thereof (illustrated in FIG. 3), as well as comprises treating the aqueous solution comprising calcium salt and magnesium oxide or the solid comprising magnesium oxide with the gaseous stream comprising carbon dioxide (illustrated in FIG. 1) and/or comprises treating the aqueous solution comprising calcium salt and magnesium oxide or the solid comprising magnesium oxide with the gaseous stream comprising carbon dioxide and the gaseous stream comprising ammonia (illustrated in FIG. 2). In such embodiments, the gaseous stream comprising carbon dioxide is split between the stream going to the cooling process and the stream going to the precipitation process. Similarly, in such embodiments, the gaseous stream comprising ammonia is split between the stream going to the cooling process and the stream going to the precipitation process. Any combination of the processes depicted in FIGS. 1-3 is possible and all are within the scope of this disclosure.

In some embodiments of the aforementioned aspects, the second aqueous solution comprises ammonium carbamate. Ammonium carbamate has a formula $NH_4[H_2NCO_2]$ consisting of ammonium ions $NH_4$+, and carbamate ions $H_2NCO_2^-$. In some embodiments of the aforementioned aspect and embodiments, the second aqueous solution comprises ammonium bicarbonate, ammonium carbonate, ammonia, ammonium carbamate, or combinations thereof.

The combination of these condensed products in the second aqueous solution may be dependent on the one or more of the cooling conditions. Table 1 presented below represents various combinations of the condensed products in the second aqueous solution.

TABLE 1

| Ammonium carbonate | Ammonium bicarbonate | Ammonia | Ammonium carbamate |
|---|---|---|---|
| X | | | |
| | X | | |
| | | X | |
| | | | X |
| X | X | | |
| X | | X | |
| X | | | X |
| | X | X | |
| | X | | X |
| | | X | X |
| X | X | X | |
| X | X | | X |
| X | X | X | X |
| | X | X | X |

In some embodiments of the aforementioned aspect and embodiments, the gaseous stream (e.g., the gaseous streams going to the cooling reaction/reactor (step F in FIG. 3)) further comprises water vapor. In some embodiments of the aforementioned aspect and embodiments, the gaseous stream further comprises between about 20-90%; or between about 20-80%; or between about 20-70%; or between about 20-60%; or between about 20-55%; or between about 20-50%; or between about 20-40%; or between about 20-30%; or between about 20-25%; or between about 30-90%; or between about 30-80%; or between about 30-70%; or between about 30-60%; or between about 30-50%; or between about 30-40%; or between about 40-90%; or between about 40-80%; or between about 40-70%; or between about 40-60%; or between about 40-50%; or between about 50-90%; or between about 50-80%; or between about 50-70%; or between about 50-60%; or between about 60-90%; or between about 60-80%; or between about 60-70%; or between about 70-90%; or between about 70-80%; or between about 80-90%, water vapor.

In some embodiments of the aforementioned aspect and embodiments, no external water is added to the cooling process. It is to be understood that the cooling process is similar to condensation of the gases (but not similar to the absorption of the gases) in the existing water vapors such that the gases are not absorbed in the water but are as such cooled down together with the water vapors. Condensation of the gases into a liquid stream may provide process control advantages compared to absorbing the vapors. For example only, the condensation of the gases into the liquid stream may allow pumping of the liquid stream into the precipitation step. Pumping of the liquid stream may be lower in cost than compression of a vapor stream into the absorption process.

Intermediate steps in the cooling reaction/reactor may include the formation of ammonium carbonate and/or ammonium bicarbonate and/or ammonium carbamate, by reactions as below:

$$2NH_3 + CO_2 + H_2O \longrightarrow (NH_4)_2CO_3$$

$$NH_3 + CO_2 + H_2O \longrightarrow (NH_4)HCO_3$$

$$2NH_3 + CO_2 \longrightarrow (NH_4)NH_2CO_2$$

Similar reactions may be shown for the N-containing organic salt:

$$2NH_2R + CO_2 + H_2O \longrightarrow (NH_3R)_2CO_3$$

$$NH_2R + CO_2 + H_2O \longrightarrow (NH_3R)HCO_3$$

An advantage of cooling the ammonia in the cooling reaction/reactor is that ammonia may have a limited vapor pressure in the vapor phase of the dissolution reaction. By reacting the ammonia with $CO_2$, as shown in the reactions above, can remove some ammonia from the vapor space, allowing more ammonia to leave the dissolution solution.

The second aqueous solution comprising ammonium bicarbonate, ammonium carbonate, ammonia, ammonium carbamate, or combinations thereof (exiting the cooling reaction/reactor in FIG. 3) is then treated with the first aqueous solution comprising calcium salt and magnesium oxide or the solid comprising magnesium oxide from the dissolution reaction/reactor, in the precipitation reaction/reactor (step C) to form the composition/precipitation material comprising vaterite and magnesium oxide:

$$(NH_4)_2CO_3 + CaCl_2 + MgO \longrightarrow CaCO_3\ (vaterite) + MgO + 2NH_4Cl$$

$$(NH_4)HCO_3 + NH_3 + CaCl_2 + MgO \longrightarrow CaCO_3\ (vaterite) + MgO + 2NH_4Cl + H_2O$$

$$2(NH_4)HCO_3 + CaCl_2 + MgO \longrightarrow CaCO_3\ (vaterite) + MgO + 2NH_4Cl + H_2O + CO_2$$

$$(NH_4)NH_2CO_2 + H_2O + CaCl_2 + MgO \longrightarrow CaCO_3\ (vaterite) + MgO + 2NH_4Cl$$

Independent of any intermediate steps, the combination of the reactions lead to an overall process chemistry $$CaO\ (lime) + MgO \longrightarrow CaCO_3\ (vaterite) + MgO$$

In some embodiments of the aspects and embodiments provided herein, the one or more cooling conditions comprise temperature between about 0-200° C., or between about 0-150° C., or between about 0-75° C., or between about 0-100° C., or between about 0-80° C., or between about 0-60° C., or between about 0-50° C., or between about 0-40° C., or between about 0-30° C., or between about 0-20° C., or between about 0-10° C., or between about 10-100° C., or between about 10-80° C., or between about 10-60° C., or between about 10-50° C., or between about 10-40° C., or between about 10-30° C., or between about 20-100° C., or between about 20-80° C., or between about 20-60° C., or between about 20-50° C., or between about 20-40° C., or between about 20-30° C., or between about 30-100° C., or between about 30-80° C., or between about 30-60° C., or between about 30-50° C., or between about 30-40° C., or between about 40-100° C., or between about 40-80° C., or between about 40-60° C., or between about 50-100° C., or between about 50-80° C., or between about 60-100° C., or between about 60-80° C., or between about 70-100° C., or between about 70-80° C.

In some embodiments of the aspects and embodiments provided herein, the one or more cooling conditions comprise pressure between about 0.5-50 atm; or between about 0.5-25 atm; or between about 0.5-10 atm; or between about 0.1-10 atm; or between about 0.5-1.5 atm; or between about 0.3-3 atm.

In some embodiments, the formation and the quality of the composition comprising the vaterite and the magnesium oxide formed in the methods and systems provided herein, is dependent on the amount and/or the ratio of the condensed products in the second aqueous solution comprising ammonium bicarbonate, ammonium carbonate, ammonia, ammonium carbamate, or combinations thereof.

In some embodiments, the presence or absence or distribution of the condensed products in the second aqueous solution comprising ammonium bicarbonate, ammonium carbonate, ammonia, ammonium carbamate, or combinations thereof, can be controlled in order to maximize the formation of the composition comprising the vaterite and the magnesium oxide and/or to obtain a desired particle size distribution. This control can be based on the one or more cooling conditions, such as, pH of the aqueous solution in the cooling reactor, flow rate of the $CO_2$ and the $NH_3$ gases, and/or ratio of the $CO_2$:$NH_3$ gases. The inlets for the cooling reactor (F in FIG. 3) may be carbon dioxide ($CO_2$ (g)), the dissolution reactor gas exhaust containing ammonia ($NH_3$ (*g*)), water vapor, and optionally fresh makeup water (or some other dilute water stream). The outlet may be a slipstream of the reactor's recirculating fluid (the second aqueous solution), which is directed to the precipitation reactor for contacting with the first aqueous solution and optionally additional carbon dioxide and/or ammonia. The pH of the system may be controlled by regulating the flow rate of the $CO_2$ and the $NH_3$ into the cooling reactor. The conductivity of the system may be controlled by addition of dilute makeup water to the cooling reactor. Volume may be maintained constant by using a level detector in the cooling reactor or it's reservoir.

In some embodiments, higher pH of the aqueous solution in the cooling reactor (may be achieved by higher flow rate of ammonia) may favor carbamate formation whereas lower pH of the aqueous solution in the cooling reactor (may be achieved by lower flow rate of ammonia) may favor carbonate and/or bicarbonate formation. In some embodiments, the one or more cooling conditions include pH of the aqueous solution formed in the cooling reactor to be between about 8-12, or between about 8-11, or between about 8-10, or between about 8-9.

In some embodiments, the flow rate of the carbon dioxide can be modified to achieve a desired pH of the second aqueous solution exiting the cooling reactor. For example, if the pH of the second aqueous solution is high, the flow rate of the carbon dioxide can be increased to reduce the pH or if the pH of the second aqueous solution is low, the flow rate of the carbon dioxide can be reduced to increase the pH.

In some embodiments, the one or more cooling conditions include ratio of $CO_2$:$NH_3$ in the cooling reactor to be between about 0.1:1-20:1, or between about 0.1:1-1:1, or between about 0.1:1-2:1, or between about 5:1-10:1, or between about 1:1-5:1, or between about 2:1-5:1.

Figure 4:
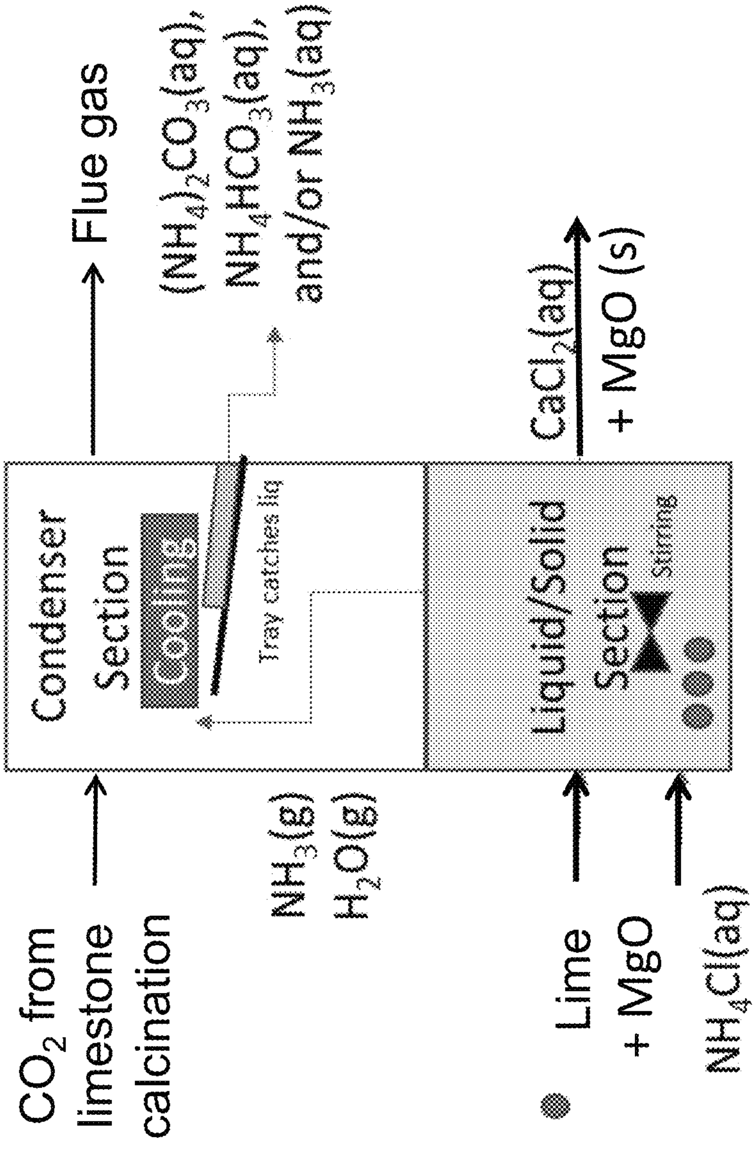
FIG. 4 illustrates some embodiments of the methods and systems comprising an integrated reactor provided herein.

It is to be understood that while FIG. 3 illustrates a separate cooling reaction/reactor, in some embodiments, the dissolution reaction/reactor may be integrated with the cooling reaction/reactor, as illustrated in FIG. 4. For example, the dissolution reactor may be integrated with a condenser acting as a cooling reactor. Both the mixture comprising the lime and the magnesium oxide and the aqueous N-containing salt solution (illustrated as $NH_4Cl$ in FIG. 4) are fed to the dissolution reaction/reactor, when the first aqueous solution comprising the calcium salt (illustrated as $CaCl_2$)) and the magnesium oxide is formed. The solution may optionally contain solid comprising the magnesium oxide that may stay at the bottom of the dissolution reactor. The first aqueous solution comprising the calcium salt (illustrated as $CaCl_2$)) and the magnesium oxide is withdrawn from the dissolution reaction/reactor to be processed further for precipitation. The gaseous stream comprising ammonia and water vapor passes to the upper section of the dissolution reactor (i.e., the cooling reactor; illustrated in FIG. 4) where it is cooled along with the carbon dioxide to condense into the second aqueous solution. The carbon dioxide may be obtained from a plant where the limestone is being calcined into the lime and the carbon dioxide. The carbon dioxide is then fed to the vapor phase of the cooling reactor. The second aqueous solution comprising ammonium bicarbonate, ammonium carbonate, ammonia, ammonium carbamate, or combinations thereof, is collected from the cooling reactor using various means, such as, e.g., one or more trays (e.g., as illustrated in FIG. 4).

In one aspect, there is provided an integrated reactor comprising:

- the dissolution reactor integrated with the cooling reactor wherein the dissolution reactor is positioned below the cooling reactor;
- the dissolution reactor is configured to dissolve the mixture comprising lime and magnesium oxide in the aqueous N-containing inorganic salt solution or the N-containing organic salt solution to produce the first aqueous solution comprising calcium salt and MgO, and the gaseous stream comprising ammonia and water vapor; and
- the cooling reactor operably connected to the dissolution reactor and configured to receive and condense the gaseous stream comprising ammonia and water vapor from the dissolution reactor and the gaseous stream comprising carbon dioxide from the calcination of the limestone to the lime; and form the second aqueous solution comprising ammonium bicarbonate, ammonium carbonate, ammonia, ammonium carbamate, or combinations thereof.

In some embodiments, the cooling reactor is packed with a packing material. The packing material can be any inert material used to aid mass transfer of the $NH_3$ and the $CO_2$ from the vapor into the liquid phase. The packing can be random packing or structured packing. The random packing material can be any material that has individual pieces packed into the vessel or the reactor. The structured packing material can be any material that has an individual monolith that is shaped to provide surface area and enhance mass transfer. Examples of loose or unstructured or random packing material include, but not limited to, Raschig rings (such as in ceramic material), pall rings (e.g., in metal and plastic), lessing rings, Michael Bialecki rings (e.g., in metal), berl saddles, intalox saddles (e.g., in ceramic), super intalox saddles, tellerette® ring (e.g., spiral shape in polymeric material), etc.

Examples of structured packing material include, but not limited to, thin corrugated metal plates or gauzes (honeycomb structures) in different shapes with a specific surface area. The structured packing material may be used as a ring or a layer or a stack of rings or layers that have diameter that may fit into the diameter of the reactor. The ring may be an individual ring or a stack of rings fully filling the reactor. In some embodiments, the voids left out by the structured packing in the reactor are filled with the unstructured or random packing material.

Examples of structured packing material includes, without limitation, Flexipac®, Intalox®, FlexipacR HC®, etc. In a structured packing material, corrugated sheets may be arranged in a crisscross pattern to create flow channels for the vapor phase. The intersections of the corrugated sheets may create mixing points for the liquid and vapor phases. The structured packing material may be rotated about the column (reactor) axis to provide cross mixing and spreading of the vapor and liquid streams in all directions. The structured packing material may be used in various corrugation sizes and the packing configuration may be optimized to attain the highest efficiency, capacity, and pressure drop requirements of the reactor. The structured packing material may be made of a material of construction including, but not limited to, titanium, stainless steel alloys, carbon steel, aluminum, nickel alloys, copper alloys, zirconium, thermoplastic, etc. The corrugation crimp in the structured packing material may be of any size, including, but not limited to, Y designated packing having an inclination angle of 45° from the horizontal or X designated packing having an inclination angle of 60° from the horizontal. The X packing may provide a lower pressure drop per theoretical stage for the same surface area. The specific surface area of the structured packing may be between 50-800 $m^2/m^3$; or between 75-350 $m^2/m^3$; or between 200-800 $m^2/m^3$; or between 150-800 $m^2/m^3$; or between 500-800 $m^2/m^3$.

In some embodiments, the cooling reactor further comprises an inlet to introduce a scrubbing fluid, such as e.g., the ammonium chloride solution or the ammonium acetate or the water to the top of the packing material of the cooling reactor. The scrubbing fluids such as the ammonium chloride solution, or the ammonium acetate solution or the ammonia solution, or water or the like, facilitate formation of the condensed products such as ammonium bicarbonate, ammonium carbonate, ammonia, ammonium carbamate, or combination thereof. The scrubbing fluid can provide more liquid volume for the condensation of the gases. In some embodiments, if the scrubbing fluid is pre-cooled, then it can further aid the condensation process. When the scrubbing fluid is the ammonium chloride solution, the ammonium chloride solution can be a portion of the ammonium chloride solution being fed to the dissolution reactor. In some embodiments, the second aqueous solution comprising ammonium bicarbonate, ammonium carbonate, ammonia, ammonium carbamate, ammonium chloride, or combination thereof, collected from the condensed liquid from the cooling reactor, may be recycled back to the cooling reactor as the scrubbing fluid to further facilitate the condensation process. In some embodiments, the second aqueous solution may be cooled in a heat exchanger prior to recycling it back to the cooling reactor.

Other gases such as flue gas in the gaseous stream comprising carbon dioxide (obtained from the calcination process) may exit the cooling reactor (illustrated in FIG. 4).

In the aforementioned aspects, both the dissolution and the cooling reactors are fitted with inlets and outlets to receive the required gases and collect the aqueous streams. In some embodiments of the aforementioned aspects, the dissolution reactor comprises a stirrer to mix the mixture comprising the lime and the magnesium oxide with the aqueous N-containing salt solution. The stirrer can also facilitate upward movement of the gases. In some embodiments of the aforementioned aspects, the dissolution reactor is configured to collect the solid comprising the magnesium oxide settled at the bottom of the reactor after removing the first aqueous solution comprising the calcium salt and optionally the magnesium oxide. In some embodiments of the aforementioned aspect, the cooling tower comprises one or more trays configured to catch and collect the condensed second aqueous solution and prevent it from falling back into the dissolution reactor. As such, the cooling/condensation may be accomplished through use of infusers, bubblers, fluidic Venturi reactors, spargers, gas filters, sprays, trays, or packed column reactors, and the like.

In some embodiments, the cooling reactor comprises a heat exchanger in the reactor or a heat exchanging surface. The heat exchanger may comprise one or more tubes with a cold fluid circulating inside the tubes such that the cold fluid is isolated from the vapor phase in the cooling reactor but facilitates lowering the temperature of the cooling reactor for the condensation of the gases. The cold fluid can be cooling water, the scrubbing solution described above, and the like. In some embodiments, the second aqueous solution exiting the cooling reactor is cooled down by the heat exchanger before it is used as the scrubbing solution.

As illustrated in step C in FIGS. 1-2, the first aqueous solution comprising the calcium salt and the magnesium oxide, from the treatment of the mixture comprising the lime and the magnesium oxide with the N-containing salt solution as described herein, such as e.g., the ammonium salt e.g., the ammonium halide or the ammonium acetate, is contacted with the $CO_2$ and optionally the $NH_3$ from step A at any time before, during, or after the aqueous solution comprising the calcium salt and the magnesium oxide is subjected to the one or more precipitation conditions (i.e., conditions allowing for the precipitation of the composition/precipitation material). Similarly, as illustrated in step C in FIG. 3, the first aqueous solution comprising the calcium salt and the magnesium oxide, from the treatment of the mixture comprising the lime and the magnesium oxide with the N-containing salt solution as described herein for step A, such as e.g. the ammonium salt e.g., the ammonium halide or the ammonium acetate, is contacted with the second aqueous solution comprising ammonium bicarbonate, ammonium carbonate, ammonia, ammonium carbamate, or combinations thereof from the cooling reaction/reactor at any time before, during, or after the first aqueous solution comprising the calcium salt and the magnesium oxide is subjected to the one or more precipitation conditions (i.e., conditions allowing for the precipitation of the composition/precipitation material).

Accordingly, in some embodiments, the aqueous solution or the first aqueous solution comprising the calcium salt and the magnesium oxide is contacted with the $CO_2$ (and e.g., the $NH_3$ as in FIG. 2 or the second aqueous solution as in FIG. 3) prior to subjecting the aqueous solution or the first aqueous solution to the one or more precipitation conditions that favor formation of the composition comprising the vaterite and the magnesium oxide. In some embodiments, the aqueous solution or the first aqueous solution comprising the calcium salt and the magnesium oxide is contacted with the $CO_2$ (and e.g., the $NH_3$ as in FIG. 2 or the second aqueous solution as in FIG. 3) while the aqueous solution or the first aqueous solution is being subjected to the one or more precipitation conditions that favor formation of the composition comprising the vaterite and the magnesium oxide. In some embodiments, the aqueous solution or the first aqueous solution comprising the calcium salt and the magnesium oxide is contacted with the $CO_2$ (and e.g., the $NH_3$ as in FIG. 2 or the second aqueous solution as in FIG. 3) prior to and while subjecting the aqueous solution or the first aqueous solution to the one or more precipitation conditions that favor formation of the composition comprising the vaterite and the magnesium oxide. In some embodiments, the aqueous solution or the first aqueous solution comprising the calcium salt and the magnesium oxide is contacted with the $CO_2$ (and e.g., the $NH_3$ as in FIG. 2 or the second aqueous solution as in FIG. 3) after subjecting the aqueous solution or the first aqueous solution to the one or more precipitation conditions that favor formation of the composition comprising the vaterite and the magnesium oxide.

In some embodiments, the contacting of the aqueous solution or the first aqueous solution comprising the calcium salt and the magnesium oxide with the carbon dioxide and optionally the ammonia or the second aqueous solution is achieved by contacting the aqueous solution or the first aqueous solution to achieve and maintain a desired pH range, a desired temperature range, and/or desired divalent cation concentration using a convenient protocol as described herein (the one or more precipitation conditions). In some embodiments, the systems include a precipitation reactor configured to contact the aqueous solution or the first aqueous solution comprising the calcium salt and the magnesium oxide with the carbon dioxide and optionally the ammonia from step A of the process or the systems include a precipitation reactor configured to contact the aqueous solution or the first aqueous solution comprising the calcium salt and the magnesium oxide with the second aqueous solution comprising ammonium bicarbonate, ammonium carbonate, ammonia, (optionally ammonium carbamate), or combinations thereof.

In some embodiments, the aqueous solution or the first aqueous solution comprising the calcium salt and the magnesium oxide may be placed in a precipitation reactor, wherein the amount of the aqueous solution or the first aqueous solution comprising the calcium salt and the magnesium oxide added is sufficient to raise the pH to a desired level (e.g., a pH that induces precipitation of the precipitation material) such as pH 7-9, pH 7-8.7, pH 7-8.5, pH 7-8, pH 7.5-8, pH 8-8.5, pH 8.5-9, pH 9-14, pH 10-14, pH 11-14, pH 12-14, or pH 13-14. In some embodiments, the pH of the aqueous solution or the first aqueous solution comprising the calcium salt and the magnesium oxide when contacted with the carbon dioxide and optionally the $NH_3$ or the second aqueous solution, is maintained at between 7-9 or between 7-8.7 or between 7-8.5 or between 7.5-8.5 or between 7-8, or between 7.6-8.5, or between 8-8.5, or between 7.5-9.5 in order to form the composition comprising the vaterite and the magnesium oxide.

In some embodiments, the aqueous solution or the first aqueous solution is immobilized in a column or bed (an example of a configuration of the precipitation reactor). In such embodiments, water is passed through or over an amount of the calcium salt solution sufficient to raise the pH of the water to a desired pH or to a particular divalent cation ($Ca_2^+$) concentration. In some embodiments, the aqueous solution or the first aqueous solution may be cycled more than once, wherein a first cycle of precipitation removes primarily calcium carbonate minerals and leaves an alkaline solution to which additional aqueous solution or the first aqueous solution comprising the calcium salt and the magnesium oxide may be added. The gaseous stream comprising the carbon dioxide and optionally the $NH_3$, or the second aqueous solution when contacted with the recycled solution of the aqueous solution, allows for the precipitation of more calcium carbonate and/or bicarbonate compounds. It will be appreciated that, in these embodiments, the aqueous solution following the first cycle of precipitation may be contacted with the gaseous stream comprising the $CO_2$ and optionally the $NH_3$ (or with the second aqueous solution) before, during, and/or after the aqueous solution or the first aqueous solution comprising the calcium salt and the magnesium oxide has been added. In these embodiments, the water may be recycled or newly introduced. As such, the order of addition of the gaseous stream comprising the $CO_2$ and optionally the $NH_3$ and the aqueous solution or the first aqueous solution comprising the calcium salt and the magnesium oxide may vary. For example, the aqueous solution or the first aqueous solution comprising the calcium salt and the magnesium oxide may be added to, for example, brine, seawater, or freshwater, followed by the addition of the gaseous stream comprising the $CO_2$ and optionally the $NH_3$, or the second aqueous solution. In another example, the gaseous stream comprising the $CO_2$ and optionally the $NH_3$, or the second aqueous solution may be added to, for example, brine, seawater, or freshwater, followed by the addition of the aqueous solution or the first aqueous solution comprising the calcium salt and the magnesium oxide. In another example, the gaseous stream comprising the $CO_2$ and optionally the $NH_3$, or the second aqueous solution may be added directly to the aqueous solution or the first aqueous solution comprising the calcium salt and the magnesium oxide.

The aqueous solution or the first aqueous solution comprising the calcium salt and the magnesium oxide may be contacted with the gaseous stream comprising the $CO_2$ and optionally the $NH_3$ using any convenient protocol. The contact protocols of interest include, but not limited to, direct contacting protocols (e.g., bubbling the gases through the aqueous solution or the first aqueous solution), concurrent contacting means (i.e., contact between unidirectional flowing gaseous and liquid phase streams), countercurrent means (i.e., contact between oppositely flowing gaseous and liquid phase streams), and the like. As such, contact may be accomplished through use of infusers, bubblers, fluidic Venturi reactors, spargers, gas filters, sprays, trays, or packed column reactors, and the like, in the precipitation reactor. In some embodiments, gas-liquid contact is accomplished by forming a liquid sheet of solution with a flat jet nozzle, wherein the gases and the liquid sheet move in countercurrent, co-current, or crosscurrent directions, or in any other suitable manner. In some embodiments, gas-liquid contact is accomplished by contacting liquid droplets of the solution having an average diameter of 500 micrometers or less, such as 100 micrometers or less, with the gas source.

In some embodiments, substantially (e.g., 80% or more or 90% or 99.9% or 100%) the entire gaseous $CO_2$ (from the calcination) and optionally $NH_3$ waste stream produced by step A of the process illustrated in Figs herein is employed in the precipitation of the precipitation material. In some embodiments, a portion of the gaseous $CO_2$ and optionally $NH_3$ waste stream is employed in the precipitation of the precipitation material and may be 75% or less, such as 60% or less, and including 50% and less of the gaseous waste stream.

Any number of the gas-liquid contacting protocols described herein may be utilized. Gas-liquid contact or the liquid-liquid contact is continued until the pH of the precipitation reaction mixture is optimum (various optimum pH values have been described herein to form the composition/precipitation material comprising e.g., the vaterite and the magnesium oxide), after which the precipitation reaction mixture is allowed to stir. The rate at which the pH drops may be controlled by addition of more of the aqueous solution or the first aqueous solution comprising the calcium salt and the magnesium oxide during gas-liquid contact or the liquid-liquid contact. In addition, additional aqueous solution or the first aqueous solution may be added after sparging to raise the pH back to basic levels for precipitation of a portion or all of the precipitation material. In any case, the precipitation material may be formed upon removing protons from certain species in the precipitation reaction mixture. The precipitation material comprising carbonates may then be separated and optionally, further processed.

The rate at which the pH drops may be controlled by addition of additional supernatant or the aqueous solution or the first aqueous solution comprising the calcium salt and the magnesium oxide during gas-liquid contact or the liquid-liquid contact. In addition, additional supernatant or the aqueous solution or the first aqueous solution comprising the calcium salt and the magnesium oxide may be added after gas-liquid contact or the liquid-liquid contact to raise the pH back to basic levels (e.g., between 7-9 or between 7-8.5 or between 7-8 or between 8-9) for precipitation of a portion or all of the composition/precipitation material.

In methods and systems provided herein, the aqueous solution produced by contacting the aqueous solution or the first aqueous solution comprising the calcium salt and the magnesium oxide with the gaseous stream comprising the $CO_2$ and optionally the $NH_3$ or the aqueous solution produced by contacting the first aqueous solution comprising the calcium salt and the magnesium oxide with the second aqueous solution comprising ammonium bicarbonate, ammonium carbonate, ammonia, (optionally ammonium carbamate) or combinations thereof, is subjected to the one or more of precipitation conditions (step C in FIGS. 1-3) sufficient to produce the composition comprising the vaterite and the magnesium oxide and a supernatant (i.e., the part of the solution that is left over after precipitation of the composition/precipitation material). The one or more precipitation conditions favor production of the composition comprising the vaterite and the magnesium oxide.

The one or more precipitation conditions include those that modulate the environment of the precipitation reaction mixture to produce the desired composition comprising the vaterite and the magnesium oxide. Such one or more precipitation conditions, that can be used in the method and system aspects and embodiments described herein, suitable to form composition comprising the vaterite and the magnesium oxide include, but not limited to, temperature, pH, pressure, ion ratio, precipitation rate, presence of additive, presence of ionic species, concentration of additive and ionic species, stirring, residence time, mixing rate, forms of agitation such as ultrasonics, presence of seed crystals, catalysts, membranes, or substrates, dewatering, drying, ball milling, etc. In some embodiments, the average particle size of the vaterite may also depend on the one or more precipitation conditions used in the precipitation of the composition.

For example, the temperature of the precipitation reaction may be raised to a point at which an amount suitable for precipitation of the desired composition occurs. In such embodiments, the temperature of the precipitation reaction may be raised to a value, such as from 20° C. to 60° C., and including from 25° C. to 60° C.; or from 30° C. to 60° C.; or from 35° C. to 60° C.; or from 40° C. to 60° C.; or from 50° C. to 60° C.; or from 25° C. to 50° C.; or from 30° C. to 50° C.; or from 35° C. to 50° C.; or from 40° C. to 50° C.; or from 25° C. to 40° C.; or from 30° C. to 40° C.; or from 25° C. to 30° C. In some embodiments, the temperature of the precipitation reaction may be raised using energy generated from low or zero carbon dioxide emission sources (e.g., solar energy source, wind energy source, hydroelectric energy source, waste heat from the flue gases of the carbon emitter, etc.).

The pH of the precipitation reaction may also be raised to an amount suitable for the precipitation of the desired composition comprising the vaterite and the magnesium oxide. In such embodiments, the pH of the precipitation reaction may be raised to alkaline levels for precipitation. In some embodiments, the pH of the aqueous solution or the first aqueous solution comprising the calcium salt and the magnesium oxide that is contacted with the gaseous stream comprising the carbon dioxide gas and optionally the $NH_3$ gas (or with the second aqueous solution) has an effect on the formation of the composition comprising the vaterite and the magnesium oxide. In some embodiments, the precipitation conditions include conducting the precipitation step of the gaseous stream comprising the carbon dioxide gas and optionally the $NH_3$ gas (or the second aqueous solution) with the aqueous solution or the first aqueous solution comprising the calcium salt and the magnesium oxide at pH higher than 7 or pH of 8 or pH of between 7.1-8.5 or pH of between 7.5-8 or between 7.5-8.5 or between 8-8.5 or between 8-9 or between 7.6-8.4, in order to form the composition/precipitation material. The pH may be raised to pH 9 or higher, such as pH 10 or higher, including pH 11 or higher or pH 12.5 or higher.

Adjusting major ion ratios during precipitation may influence the nature of the precipitation material. Major ion ratios may have considerable influence on polymorph formation. For example, as the magnesium: calcium ratio in the water increases, aragonite become the major polymorph of calcium carbonate in the precipitation material over low-magnesium vaterite.

Precipitation rate may also have an effect on the composition formation, with the most rapid precipitation rate achieved by seeding the solution with a desired phase. Without seeding, rapid precipitation may be achieved by rapidly increasing the pH of the precipitation reaction mixture, which may result in more amorphous constituents. The higher the pH, the more rapid is the precipitation, which may result in a more amorphous precipitation material.

Residence time of the precipitation reaction after contacting the aqueous solution or the first aqueous solution with the gaseous stream comprising the carbon dioxide gas and optionally the $NH_3$ gas (or with the second aqueous solution) may also have an effect on the precipitation material formation. For example, in some embodiments, a longer residence time may result in transformation of the vaterite to the aragonite/calcite within the reaction mixture. In some embodiments, too short residence time may result in an incomplete formation of the vaterite in the reaction mixture. Therefore, the residence time may be critical to the precipitation of the vaterite. Further, the residence time may also affect the particle size of the precipitate. For example, too long residence time may result in the agglomeration of the particles forming large size particles. Therefore, in some embodiments, the residence time of the reaction is between about 5-60 minutes, or between about 5-15 minutes, or between about 10-60 minutes, or between about 15-60 min, or between about 15-45 min, or between about 15-30 min, or between about 30-60 min.

In some embodiments, the one or more precipitation conditions to produce the composition from the precipitation reaction may include, as above, the temperature and pH, as well as, in some instances, the concentrations of additives and ionic species in the water. The additives have been described herein below. The presence of the additives and the concentration of the additives may also favor formation of the composition comprising the vaterite and the magnesium oxide. In some embodiments, a middle chain or long chain fatty acid ester may be added to the aqueous solution or the first aqueous solution during the precipitation. Examples of fatty acid esters include, without limitation, cellulose such as carboxymethyl cellulose, sorbitol, citrate such as sodium or potassium citrate, stearate such as sodium or potassium stearate, phosphate such as sodium or potassium phosphate, sodium tripolyphosphate, hexametaphosphate, EDTA, or combinations thereof. In some embodiments, a combination of stearate and citrate may be added during the precipitation step of the process to form the composition comprising the vaterite and the MgO.

The one or more precipitation conditions may also include factors such as mixing rate, forms of agitation such as ultrasonics, and the presence of seed crystals, catalysts, membranes, or substrates. In some embodiments, the one or more precipitation conditions include supersaturated conditions, temperature, pH, and/or concentration gradients, or cycling or changing any of these parameters. The protocols employed to prepare the precipitation material may be batch, semi-batch, or continuous protocols. The one or more precipitation conditions may be different to produce the precipitation material in a continuous flow system compared to a semi-batch or batch system.

In some embodiments, the gas leaving the precipitation reactor (shown as "scrubbed gas" at step C in FIGS. 1-3) passes to a gas treatment unit for a scrubbing process. The mass balance and equipment design for the gas treatment unit may depend on the properties of the gases. In some embodiments, the gas treatment unit may incorporate an acid scrubber, such as, e.g., hydrochloric acid (HCl) scrubber or sulfuric acid ($H_2SO_4$) scrubber for recovering the small amounts of $NH_3$ in the gas exhaust stream that may be carried from the $CO_2$ absorption, precipitation step by the gas. The $NH_3$ may be captured by the HCl solution through:

$$NH_3(g) + HCl(aq) \longrightarrow NH_4Cl(aq)$$

The $NH_4Cl$ (aq) from the HCl scrubber or the $NH_4SO_4$ (aq) from the $H_2SO_4$ scrubber may be recycled to the dissolution step A.

In some embodiments, the gas exhaust stream comprising ammonia (shown as "scrubbed gas" in FIGS. 1-3) may be subjected to a scrubbing process where the gas exhaust stream comprising ammonia is scrubbed with the carbon dioxide from the industrial process and water to produce a solution of ammonia. The inlets for the scrubber may be carbon dioxide ($CO_2$ (g), the reactor gas exhaust containing ammonia ($NH_{3(g)}$), and fresh makeup water (or some other dilute water stream). The outlet may be a slipstream of the scrubber's recirculating fluid (e.g. $H_3N—CO_{2(aq)}$ or carbamate), which may optionally be returned back to the main reactor for contacting with the carbon dioxide and precipitation. The pH of the system may be controlled by regulating the flow rate of $CO_{2(g)}$ into the scrubber. The conductivity of the system may be controlled by addition of dilute makeup water to the scrubber. Volume may be maintained constant by using a level detector in the scrubber or it's reservoir. While ammonia is a basic gas, the carbon dioxide gases are acidic gases. In some embodiments, the acidic and basic gases may ionize each other to increase their solubilities.

Without being limited by any theory, it is contemplated that the following reaction may take place in the scrubber:

$$NH_3(aq) + CO_2(aq) + H_2O \longrightarrow HCO_3^- + NH_4^+$$

The aqueous solution or the first aqueous solution comprising the calcium salt and the magnesium oxide when contacted with the gaseous stream comprising the $CO_2$ gas and optionally the $NH_3$ gas or with the second aqueous solution under the one or more precipitation conditions results in the precipitation of the composition comprising the vaterite and the magnesium oxide. The one or more precipitation conditions that result in the formation of the composition comprising the vaterite and the magnesium oxide in this process have been described herein.

In some embodiments, the vaterite in the composition may be formed under suitable conditions so that the vaterite is reactive and transforms to the aragonite and/or the calcite upon dissolution-precipitation process (during cementation) in the water. The magnesium oxide transforms to the magnesium hydroxide during the cementation process. The aragonite and/or calcite along with the magnesium hydroxide may impart one or more unique characteristics to the cemented product including, but not limited to, high compressive strength, complex microstructure network, neutral pH, filling of the porosity of the aragonite and/or calcite network with the magnesium hydroxide, etc. The composition comprising the vaterite and the magnesium oxide (either as part of the composition throughout the process or as added solids comprising the magnesium oxide, as described herein) undergoes transformation to the aragonite and/or the calcite and sets and hardens into cementitious products (shown as products (A) in FIGS. 1-3). The non-removal of the magnesium oxide solid in the process to form the composition comprising the vaterite and the magnesium oxide provides an additional advantage of one less step of removal of the solids, eliminating a potential waste stream thereby increasing the efficiency and improving the economics of the process.

In some embodiments, the methods and systems provided herein further include separating the composition/precipitation material (step D in FIGS. 1-3) from the aqueous solution by dewatering to form the calcium carbonate and the magnesium oxide cake (as shown in FIGS. 1-3). The calcium carbonate and the magnesium oxide cake may be subjected optionally to rinsing, and optionally drying (step E in FIGS. 1-3). The drying of the cake form of the composition comprising the calcium carbonate and the magnesium oxide results in the formation of the powder form of the composition comprising the calcium carbonate and the magnesium oxide which may then be used to make cementitious or non-cementitious products (shown as products (B) in FIGS. 1-3). In some embodiments, the calcium carbonate and the magnesium oxide cake may contain impurities (e.g., 1-2% by weight or more) of ammonium ($NH_4^+$) ions, sulfur ions, and/or chloride ($Cl^-$) ions. While rinsing of the calcium carbonate and the magnesium oxide cake may remove some or all of the ammonium salts and/or sulfur compounds, it may result in a dilute concentration of ammonium salts (in the supernatant) which may need concentrating before recycling it back to the process.

The methods and systems provided herein may result in residual N-containing inorganic or N-containing organic salt, e.g., residual ammonium salt remaining in the supernatant solution as well as in the precipitate itself after the formation of the precipitate. The residual N-containing inorganic or the residual N-containing organic salt, e.g. residual ammonium salt (e.g. residual $NH_4Cl$, or residual $NH_4CH_3CO_2$ (ammonium acetate)) as used herein includes any salt that may be formed by ammonium ions and anions present in the solution including, but not limited to halogen ions such as chloride ions, acetate ions, nitrate or nitrite ions, and sulfur ions such as, sulfate ions, sulfite ions, thiosulfate ions, hydrosulfide ions, and the like. In some embodiments, the residual N-containing inorganic salt comprises ammonium halide, ammonium acetate, ammonium sulfate, ammonium sulfite, ammonium hydrosulfide, ammonium thiosulfate, ammonium nitrate, ammonium nitrite, or combinations thereof. Various methods have been provided herein to remove and optionally recover the residual salt from the supernatant solution as well as the precipitate. In some embodiments, the supernatant solution further comprising the N-containing inorganic or N-containing organic salt, e.g., residual ammonium salt (e.g., residual $NH_4Cl$, or residual $NH_4CH_3CO_2$), is recycled back to the dissolution reactor for the dissolution of the mixture (to step A in FIGS. 1-3).

The residual N-containing inorganic or N-containing organic salt solution, e.g., residual ammonium salt solution (e.g., residual $NH_4Cl$ or residual $NH_4CH_3CO_2$) obtained from the dewatering as well as the rinsing stream may optionally be concentrated before being recycled back for the dissolution of the mixture. Additional base, such as e.g., ammonium chloride and/or ammonia (anhydrous or aqueous solution) may be added to the recycled solution to make up for the loss of the ammonium chloride during the process and bring the concentration of ammonium chloride to the optimum level.

In some embodiments, the residual N-containing inorganic or N-containing organic salt solution, e.g., residual ammonium salt solution (e.g. residual $NH_4Cl$ or residual $NH_4CH_3CO_2$), as illustrated in FIGS. 1-3, may be recovered from the supernatant aqueous solution and concentrated using recovery process, such as, but not limited to, thermal decomposition, pH adjustment, reverse osmosis, multi-stage flash distillation, multi-effect distillation, vapor recompression, distillation, or combinations thereof. The systems configured to carry out these processes are available commercially. For example, the pH of the solution may be raised (e.g., with a strong base like NaOH). This may shift the equilibrium towards volatile ammonia ($NH_3(aq)/NH_3(g)$). Rates and total removal could both be improved by heating the solution.

In some embodiments, the residual N-containing inorganic or N-containing organic salt solution, e.g., residual ammonium salt solution (e.g., residual $NH_4Cl$ or residual $NH_4CH_3CO_2$) may be separated and recovered from the precipitate by the thermal decomposition process. This process may be incorporated in the processes illustrated in FIGS. 1-3 at the separation of the composition comprising the vaterite and the magnesium oxide (step D) and/or after the step of the dried powder (step E).

Typically, at 338° C., solid $NH_4Cl$ may decompose into ammonia ($NH_3$) and hydrogen chloride (HCl) gases. While at 840° C., solid $CaCO_3$ decomposes to calcium oxide (CaO) solid and carbon dioxide ($CO_2$) gas.

$$NH_4Cl_{(s)} \rightleftarrows NH_{3(g)} + HCl_{(g)}$$

$$CaCO_{3(s)} \rightleftarrows CaO_{(s)} + CO_{2(g)}$$

In some embodiments, the residual ammonium salt in the precipitate and/or dried powder such as, but not limited to, ammonium chloride, ammonium acetate, ammonium sulfate, ammonium sulfite, ammonium hydrosulfide, ammonium thiosulfate, ammonium nitrate, ammonium nitrite, or combinations thereof may be removed by thermal decomposition at a temperature between 80-840° C. This may be done either during the normal filter cake drying process and/or as a second post-drying heat treatment. A temperature range is desirable that decomposes residual ammonium salts in the precipitation while preserving the cementitious properties of the vaterite in the composition such that the vaterite stays as the vaterite after heating, and after combination with water, successfully transforms to the aragonite and/or the calcite to form the cementitious products.

In some embodiments of the foregoing aspect and embodiments, the step of removing and optionally recovering the residual N-containing inorganic or N-containing organic salt, such as e.g. the ammonium salt from the precipitation material comprises heating the precipitation material between about 80-380° C. or between about 100-

360° C. or between about 150-360° C. or between about 200-360° C. or between about 250-360° C. or between about 300-360° C. or between about 150-200° C. or between about 100-200° C. or between about 200-300° C. or between about 300-350° C. or between about 310-345° C. or between about 320-345° C. or between about 330-345° C. or between about 300-345° C., to evaporate the residual N-containing inorganic or N-containing organic salt from the precipitation material with optional recovery by condensation of the residual N-containing inorganic or N-containing organic salt.

In some embodiments of the foregoing aspect and embodiments, the step of removing and optionally recovering the residual N-containing inorganic or N-containing organic salt, such as e.g. the residual ammonium salt from the precipitation material comprises heating the precipitation material, for a duration of more than about 10 min or of more than about 15 min or for than about 5 min or of between about 10 min to about 1 hour or of between about 10 min to about 1.5 hour or of between about 10 min to about 2 hours or of between about 10 min to about 5 hours or of between about 10 min to about 10 hours.

In some embodiments, the composition/precipitation material is dewatered (to remove the supernatant aqueous solution) and dried to remove water (e.g., by heating at about or above 100° C.) before subjecting the composition to the heating step as above to remove and optionally recover the residual N-containing inorganic or N-containing organic salt, e.g., residual ammonium salt. In some embodiments, the composition is partially dewatered (to remove bulk of the supernatant aqueous solution) and partially dried to remove water (or avoid the drying step) before subjecting the composition to the heating step to remove and optionally recover the residual N-containing inorganic or N-containing organic salt, e.g., residual ammonium salt. In some embodiments, the ammonium salt evaporates from the precipitation material in a form comprising ammonia gas, hydrogen chloride gas, chlorine gas, or combinations thereof. Applicants have found that in some embodiments, maintaining a combination of the amount of temperature and duration of heating may be critical to removing the ammonium salt from the precipitation material yet preserving the cementitious properties of the vaterite. The cementitious products, thus formed, possess minimal or no chloride content and have no foul smell of ammonia or sulfur. In some embodiments, the chloride content is around or below acceptable ASTM standards for the cementitious products.

In some embodiments, the above recited temperature conditions optionally coupled with duration of heating, may be combined with pressure conditions that provide a driving force to improve the thermodynamics of the decomposition of the residual N-containing inorganic or N-containing organic salt, e.g., the residual ammonium salt. For example, the heating of the precipitation material may be carried out in a system in which the headspace is at a pressure lower than atmospheric pressure. The pressure lower than the atm pressure may create a driving force for heating reaction that involves gas phase products (such as, but not limited to, ammonia gas, hydrogen chloride gas, chlorine gas, or combinations thereof), by reducing the partial pressure of the reactant in the vapor phase. Another advantage of operating under reduced pressure or vacuum may be that at lower pressure some sublimation reactions may occur at lower temperatures thereby improving the energy requirements of the heating reaction.

In some embodiments of the above described thermal decomposition process, the separated ammonium chloride in the form of the ammonia and the HCl gases, may be recovered for reuse by either recrystallization of the combined thermally evolved gases or by absorbing the gases into an aqueous medium. Both mechanisms may result in the $NH_4Cl$ product that may be concentrated enough for reuse in the processes as shown in FIGS. 1-3.

In some embodiments, the ammonium salt may be separated and recovered in the above described process by pH adjusted evolution of the $NH_3$ gas from the ammonium salt. This process may be incorporated in the processes illustrated in FIGS. 1-3 at the separation of the vaterite and the magnesium oxide cake. The final pH of the water in the filter cake may typically be about 7.5. At this pH, $NH_4^+$ (pKa=9.25) may be the predominant species. Increasing the pH of this water may drive the acid base equilibrium toward $NH_3$ gas, as described in the following equation:

$$NH_4^+ \longleftrightarrow H^+ + NH_{3(g)}$$

Any source of alkalinity may be used to increase the pH of the filter cake water. In some embodiments, the aqueous solution of the calcium oxide and/or hydroxide or the lime slurry may provide the source of high alkalinity. In some embodiments, the aqueous fraction of the lime may be integrated into the rinsing stage of the dewatering process (e.g., filter cake step) to raise the pH of the system and drive the evolution of $NH_3$ gas. As ammonia has substantial solubility in water, heat and/or vacuum pressure may be applied to drive the equilibrium further toward the gaseous phase. The ammonia may be recovered for reuse by either recrystallization of the ammonia with chloride or by absorbing the ammonia into an aqueous medium. Both mechanisms may result in the ammonia solution or the $NH_4Cl$ product that may be concentrated enough for reuse in the processes described in FIGS. 1-3.

The cake composition comprising the vaterite and the magnesium oxide may be sent to the dryer (step E in FIGS. 1-3) to form the powder composition comprising the vaterite and the magnesium oxide. The powder form of the composition may be used further in applications to form the products, as described herein. The cake may be dried using any drying techniques known in the art such as, but not limited to fluid bed dryer or swirl fluidizer. The resulting solid powder may be then mixed with additives to make different products described herein. In some embodiments, the slurry form with reduced water or the cake form of the composition is directly used to form the products, such as the construction panel, or the concrete, or the aggregate, etc., as described herein.

In the systems provided herein, the separation or the dewatering step D may be carried out on the separation station. The composition comprising the vaterite and the magnesium oxide may be stored in the supernatant for a period of time following the precipitation and prior to the separation. For example, the composition may be stored in the supernatant for a period of time ranging from few min to hours to 1 to 1000 days or longer, such as 1 to 10 days or longer, at a temperature ranging from 1° C. to 40° C., such as 20° C. to 25° C. The separation or the dewatering may be achieved using any of a number of convenient approaches, including draining (e.g., gravitational sedimentation of the precipitation material followed by draining), decanting, filtering (e.g., gravity filtration, vacuum filtration, filtration using forced air), centrifuging, pressing, or any combination thereof. Separation of the bulk water from the composition produces the wet cake of the composition, or the dewatered composition. Liquid-solid separator such as Epuramat's Extrem-Separator ("ExSep") liquid-solid separator, Xerox PARC's spiral concentrator, or a modification of either of Epuramat's ExSep or Xerox PARC's spiral concentrator, may be useful for the separation of the composition from the precipitation reaction.

In some embodiments, the resultant dewatered composition such as the wet cake material (after e.g., thermally removing the N-containing salt) may be directly used to make the products (A) described herein. For example, the wet cake of the composition comprising the vaterite and the magnesium oxide is mixed with the one or more additives, described herein, and is spread out on the conveyer belt where the vaterite transforms to the aragonite and/or the calcite, the magnesium oxide transforms to the magnesium hydroxide, and the mixture sets and hardens. The hardened material is then cut into desired shapes such as boards or panels described herein. In some embodiments, the wet cake is poured onto a sheet of paper on top of the conveyer belt. Another sheet of paper may be put on top of the wet cake which is then pressed to remove excess water. After the setting and hardening of the composition (the vaterite transformation to the aragonite and/or the calcite and the magnesium oxide transformation to the magnesium hydroxide), the material is cut into desired shapes, such as, cement siding boards and drywall etc. In some embodiments, the amount of the one or more additives may be optimized depending on the desired time required for the transformation of the vaterite to the aragonite and/or the calcite (described below). For example, for some applications, it may be desired that the material transforms rapidly and in certain other instance, a slow transformation may be desired. In some embodiments, the wet cake may be heated on the conveyer belt to hasten the transformation of the vaterite to the aragonite and/or the calcite and the magnesium oxide to the magnesium hydroxide. In some embodiments, the wet cake may be poured in the molds of desired shape and the molds are then heated in the autoclave to hasten the transformation of the vaterite to the aragonite and/or the calcite and the magnesium oxide to the magnesium hydroxide (and optionally to remove residual salt). Accordingly, the continuous flow process, batch process or semi-batch process, all are well within the scope of the invention.

In some embodiments, the composition comprising the vaterite and the magnesium oxide, once separated from the precipitation reaction, is washed with fresh water, and then placed into a filter press to produce a filter cake with 30-60% solids. This filter cake is then mechanically pressed in a mold, using any convenient means, e.g., a hydraulic press, at adequate pressures, e.g., ranging from 5 to 5000 psi, such as 1000 to 5000 psi, to produce a formed solid (where the vaterite has transformed to the aragonite and/or the calcite and the magnesium oxide has transformed to the magnesium hydroxide), e.g., a rectangular brick. These resultant solids are then cured, e.g., by placing outside and storing, by placing in a chamber wherein they are subjected to high levels of humidity and heat, etc. These resultant cured solids are then used as building materials themselves or crushed to produce the aggregate.

In processes involving the use of temperature and pressure, the dewatered cake may be dried. The cake is then exposed to a combination of rewatering, and elevated temperature and/or pressure for a certain time. The combination of the amount of water added back, the temperature, the pressure, and the time of exposure, as well as the thickness of the cake, can be varied according to composition of the starting material and the desired results.

A number of different ways of exposing the material to temperature and pressure are described herein; it will be appreciated that any convenient method may be used. Thickness and size of the cake may be adjusted as desired; the thickness can vary in some embodiment from 0.05 inch to 5 inches, e.g., 0.1-2 inches, or 0.3-1 inch. In some embodiments the cake may be 0.5 inch to 6 feet or even thicker. The cake is then exposed to elevated temperature and/or pressure for a given time, by any convenient method, for example, in a platen press using heated platens. The heat to elevate the temperature, e.g., for the platens, may be provided, e.g., by heat from an industrial waste gas stream such as a flue gas stream. The temperature may be any suitable temperature; in general, for a thicker cake a higher temperature is desired; examples of temperature ranges are 40-150° C., e.g., 60-120° C., such as 70-110° C., or 80-100° C. Similarly, the pressure may be any suitable pressure to produce the desired results; exemplary pressures include 1000-100,000 pounds per square inch (psi), including 2000-50,000 psi, or 2000-25,000 psi, or 2000-20,000 psi, or 3000-5000 psi. Finally, the time that the cake is pressed may be any suitable time, e.g., 1-100 seconds, or 1-100 minute, or 1-50 minutes, or 2-25 minutes, or 1-10,000 days. The resultant hard tablet may optionally then cure, e.g., by placing outside and storing, by placing in a chamber wherein they are subjected to high levels of humidity and heat, etc. These hard tablets, optionally cured, are then used as building materials themselves or crushed to produce aggregate.

Another method of providing the temperature and the pressure is the use of a press. A suitable press, e.g., a platen press, may be used to provide pressure at the desired temperature (using heat supplied, e.g., by a flue gas or by other steps of the process to produce a precipitate, e.g., from an electrochemical process) for a desired time. A set of rollers may be used in similar fashion.

Another way to expose the cake to elevated temperature and pressure is by means of an extruder, e.g., a screw-type extruder. The barrel of the extruder can be outfitted to achieve an elevated temperature, e.g., by jacketing; this elevated temperature can be supplied by, e.g., flue gases or the like. Extrusion may be used as a means of pre-heating and drying the feedstock prior to a pressing operation. Such pressing can be performed by means of a compression mold, via rollers, via rollers with shaped indentations (which can provide virtually any shape of aggregate desired), between a belt which provides compression as it travels, or any other convenient method. Alternatively, the extruder may be used to extrude material through a die, exposing the material to pressure as it is forced through the die, and giving any desired shape. In some embodiments, the composition comprising the vaterite and the magnesium oxide is mixed with the fresh water and then placed into the feed section of a rotating screw extruder. The extruder and/or the exit die may be heated to further assist in the process. The turning of the screw conveys the material along its length and compresses it as the flite depth of the screw decreases. The screw and barrel of the extruder may further include vents in the barrel with decompression zones in the screw coincident with the barrel vent openings. Particularly in the case of a heated extruder, these vented areas allow for the release of steam from the conveyed mass, removing water from the material.

The screw conveyed material is then forced through a die section which further compresses the material and shapes it. Typical openings in the die can be circular, oval, square, rectangular, trapezoidal, etc., although any shape which the final aggregate is desired in could be made by adjusting the shape of the opening. The material exiting the die may be cut to any convenient length by any convenient method, such as by a fly knife. Use of a heated die section may further assist in the formation of the product by accelerating the transition of the carbonate mineral to a hard, stable form. Heated dies may also be used in the case of binders to harden or set the binder. Temperatures of 100° C. to 600° C. are commonly used in the heated die section.

In yet other embodiments, the composition comprising the vaterite and the magnesium oxide may be employed for in situ or form-in-place structure fabrication. For example, roads, paved areas, or other structures may be fabricated from the composition by applying a layer of the composition, e.g., as described above, to a substrate, e.g., ground, roadbed, etc., and then hydrating the composition, e.g., by allowing it to be exposed to naturally applied water, such as in the form of rain, or by irrigation. Hydration solidifies the composition (the vaterite transformation to the aragonite and/or the calcite and the magnesium oxide transformation to the magnesium hydroxide) into a desired in situ or form-in-place structure, e.g., road, paved over area, etc. The process may be repeated, e.g., where thicker layers of in-situ formed structures are desired.

In some embodiments, the production of the composition and the products is carried out in the same facility. In some embodiments, the composition is produced in one facility and is transported to another facility to make the end product. The composition may be transported in the slurry form, the wet cake form, or the dry powder form.

In some embodiments, the resultant dewatered composition obtained from the separation station is dried at the drying station to produce the powder form of the composition comprising vaterite and the magnesium oxide. Drying may be achieved by air-drying the composition. In certain embodiments, the drying is achieved by freeze-drying (i.e., lyophilization), wherein the composition is frozen, the surrounding pressure is reduced, and enough heat is added to allow the frozen water in the composition to sublime directly into gas. In yet another embodiment, the composition is spray-dried to dry the composition, wherein the liquid containing the composition is dried by feeding it through a hot gas (such as the gaseous waste stream from the power plant), and wherein the liquid feed is pumped through an atomizer into a main drying chamber and a hot gas is passed as a co-current or counter-current to the atomizer direction. Depending on the particular drying protocol of the system, the drying station may include a filtration element, freeze-drying structure, spray-drying structure, etc. In some embodiments, the precipitate may be dried by fluid bed dryer. In certain embodiments, waste heat from a power plant or similar operation may be used to perform the drying step when appropriate. For example, in some embodiments, the dry product is produced by the use of elevated temperature (e.g., from power plant waste heat), pressure, or a combination thereof. Following the drying of the composition, the material may be then subjected to heating at elevated temperatures to remove the residual N-containing salts, e.g., the residual ammonium salts as described herein.

The resultant supernatant of the precipitation process or slurry of the composition may also be processed as desired. For example, the supernatant or slurry may be returned to the aqueous solution, or the first aqueous solution, or to another location. In some embodiments, the supernatant may be contacted with the gaseous stream comprising $CO_2$ and optionally ammonia gas, as described herein, to sequester additional $CO_2$. For example, in embodiments in which the supernatant is to be returned to the precipitation reactor, the supernatant may be contacted with the gaseous stream of $CO_2$ and optionally the ammonia gas in a manner sufficient to increase the concentration of carbonate ion present in the supernatant. As described above, contact may be conducted using any convenient protocol. In some embodiments, the supernatant has an alkaline pH, and contact with the $CO_2$ gas is carried out in a manner sufficient to reduce the pH to a range between pH 5 and 9, pH 6 and 8.5, or pH 7.5 to 8.7.

In some embodiments, the composition produced by methods provided herein, is employed as the building material (e.g., a construction material for some type of man-made structure such as buildings, roads, bridges, dams, and the like), such that $CO_2$ is effectively sequestered in the built environment. Any man-made structure, such as foundations, parking structures, houses, office buildings, commercial offices, governmental buildings, infrastructures (e.g., pavements; roads; bridges; overpasses; walls; footings for gates, fences and poles; and the like) is considered a part of the built environment. Mortars find use in binding construction blocks (e.g., bricks) together and filling gaps between construction blocks. Mortars can also be used to fix existing structure (e.g., to replace sections where the original mortar has become compromised or eroded), among other uses.

In some embodiments, the powder form of the composition comprising the vaterite and the magnesium oxide is employed as cement, where the vaterite transforms to the aragonite and/or the calcite (the dissolution-re-precipitation process) and the magnesium oxide transforms to the magnesium hydroxide and sets and hardens after combining with water.

In some embodiments, the aggregate is produced from the composition. In such embodiments, where the drying process produces particles of the desired size, little if any additional processing is required to produce the aggregate. In yet other embodiments, further processing of the composition is performed in order to produce the desired aggregate. For example, the composition may be combined with fresh water in a manner sufficient to cause the composition to form a solid product, where the vaterite transforms to the aragonite and/or the calcite (the dissolution-re-precipitation process) and the magnesium oxide transforms to the magnesium hydroxide. By controlling the water content of the wet material, the porosity, and eventual strength and density of the final aggregate may be controlled. Typically, the wet cake may be 40-60 volume % water. For denser aggregates, the wet cake may be <50% water, for less dense cakes, the wet cake may be >50% water. After hardening, the resultant solid product may then be mechanically processed, e.g., crushed or otherwise broken up and sorted to produce the aggregate of the desired characteristics, e.g., size, particular shape, etc. In these processes the setting and mechanical processing steps may be performed in a substantially continuous fashion or at separate times. In certain embodiments, large volumes of the composition may be stored in the open environment where the composition is exposed to the atmosphere. For the setting step, the composition may be irrigated in a convenient fashion with fresh water or allowed to be rained on naturally in order to produce the set product. The set product may then be mechanically processed as described above. Following production of the composition, the composition is processed to produce the desired aggregate. In some embodiment the composition may be left outdoors, where rainwater can be used as the freshwater source, to cause the meteoric water stabilization reaction to occur, hardening the composition to form the aggregate.

Figure 5:
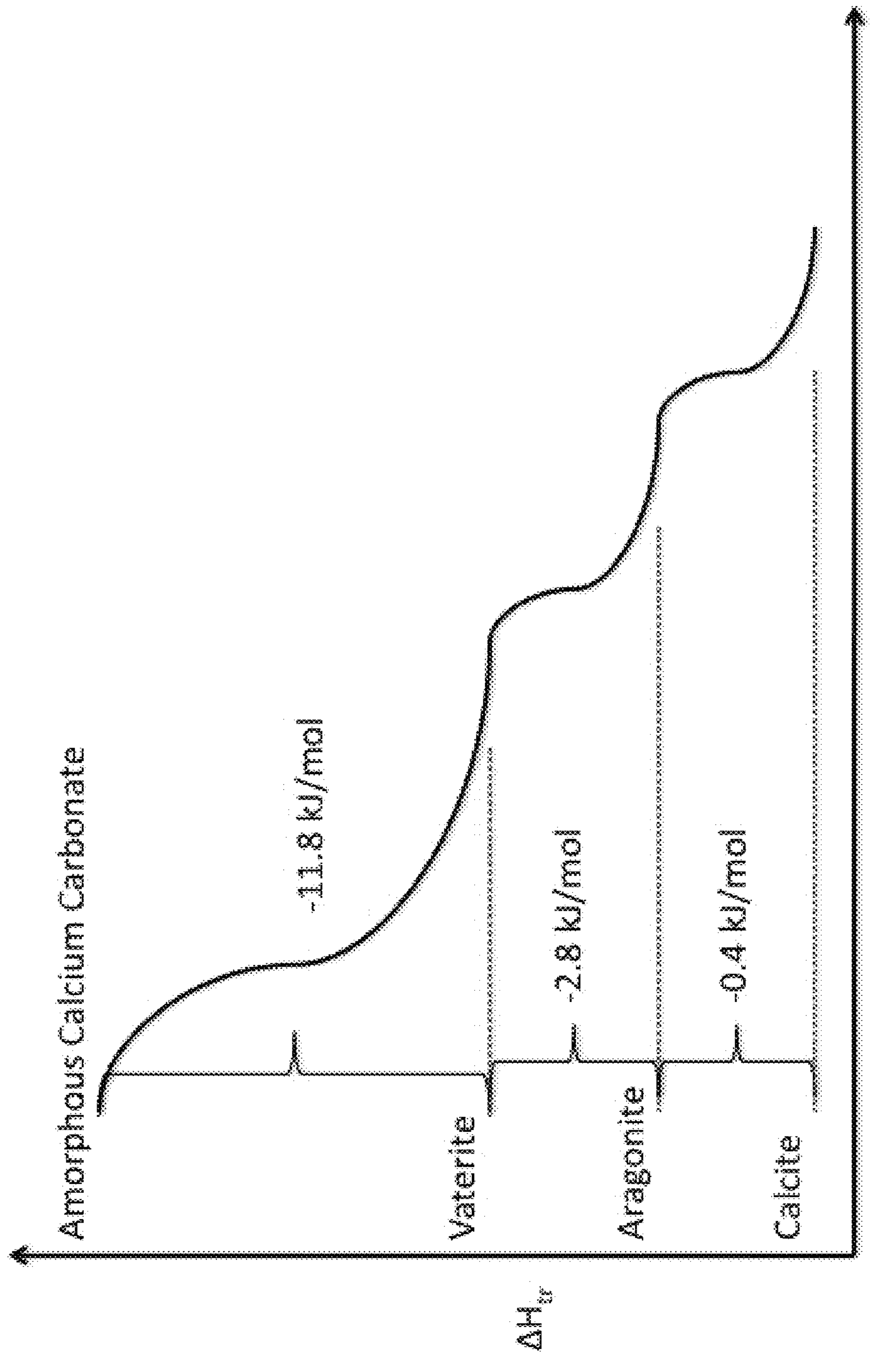
FIG. 5 illustrates a Gibbs free energy diagram of the transition from the vaterite to the aragonite.

Typically, upon precipitation of the calcium carbonate, amorphous calcium carbonate (ACC) may initially precipitate and transform into one or more of its three more stable phases (the vaterite, the aragonite, or the calcite). A thermodynamic driving force may exist for the transformation from unstable phases to more stable phases. For this reason, calcium carbonate phases transform in the order: ACC to vaterite, aragonite, and calcite where intermediate phases may or may not be present. During this transformation, excesses of energy are released, as exhibited in FIG. 5. This intrinsic energy may be harnessed to create a strong aggregation tendency and surface interactions that may lead to agglomeration and setting or cementing. It is to be understood that the values reported in FIG. 5 are well known in the art and may vary.

The methods and systems provided herein produce or isolate the composition comprising the vaterite and the magnesium oxide that transforms to the aragonite form and/or the calcite form containing magnesium hydroxide upon dissolution-re-precipitation. The aragonite form may or may not convert further to more stable calcite form. The product containing the aragonite and/or the calcite form containing the magnesium hydroxide shows one or more unexpected properties, including but not limited to, high compressive strength, high porosity (low density or light weight), neutral pH (useful as artificial reef described below), microstructure network, etc.

Other minor polymorph forms of calcium carbonate that may be present in the carbonate containing precipitation material in addition to the vaterite include, but not limited to, amorphous calcium carbonate, aragonite, calcite, a precursor phase of vaterite, a precursor phase of aragonite, an intermediary phase that is less stable than calcite, polymorphic forms in between these polymorphs or combination thereof.

The vaterite may be present in monodisperse or agglomerated form, and may be in spherical, ellipsoidal, plate like shape, or hexagonal system. The vaterite typically has a hexagonal crystal structure and forms polycrystalline spherical particles upon growth. The precursor form of the vaterite comprises nanoclusters of the vaterite and the precursor form of the aragonite comprises sub-micron to nanoclusters of the aragonite needles. The aragonite, if present in the composition along with the vaterite, may be needle shaped, columnar, or crystals of the rhombic system. The calcite, if present in the composition along with the vaterite, may be cubic, spindle, or crystals of hexagonal system. An intermediary phase that is less stable than the calcite may be a phase that is between the vaterite and the calcite, a phase between precursor of the vaterite and the calcite, a phase between the aragonite and the calcite, and/or a phase between precursor of the aragonite and the calcite.

The transformation between the calcium carbonate polymorphs may occur via solid-state transition, may be solution mediated, or both. In some embodiments, the transformation is solution-mediated as it may require less energy than the thermally activated solid-state transition. The vaterite is metastable and the difference in thermodynamic stability of calcium carbonate polymorphs may be manifested as a difference in solubility, where the least stable phases are the most soluble. Therefore, the vaterite may dissolve readily in solution and transform favorably towards a more stable polymorph, such as the aragonite and/or the calcite. In a polymorphic system like calcium carbonate, two kinetic processes may exist simultaneously in solution: dissolution of the metastable phase and growth of the stable phase. In some embodiments, the aragonite crystals and/or the calcite crystals may be growing while the vaterite is undergoing dissolution in the aqueous medium.

In some embodiments of the compositions, methods and systems provided herein, the combination of the vaterite and the magnesium oxide results in the activation of the vaterite to the aragonitic pathway and not the calcite pathway during dissolution-re-precipitation process. In some embodiments, the vaterite containing composition is activated in such a way that after the dissolution-re-precipitation process, the aragonite formation is enhanced and the calcite formation is suppressed. The activation of the vaterite containing composition may also result in control over the aragonite formation and crystal growth. This selection and activation of the vaterite in the composition to only to the aragonite and not the calcite may be facilitated by the presence of magnesium oxide. As described herein before, the magnesium oxide may not just control the transformation of the vaterite to the aragonite during setting and hardening, but itself converts to magnesium hydroxide filling and binding with the aragonitic needles, thereby providing a stable, durable, and hard material.

It is to be understood that the magnesium hydroxide may fully or partially bind with the aragonitic needles or the calcite and it is not necessary that all the magnesium hydroxide is bonded with the needles or the calcite.

In some embodiments of the compositions, methods and systems provided herein, the combination of the vaterite and the magnesium oxide results in the activation of the vaterite to the calcite pathway during dissolution-re-precipitation process. The process may be driven in such a way that the vaterite transforms to the calcite along with the magnesium oxide transformation to the magnesium hydroxide. The magnesium hydroxide fills and binds with the calcite, thereby providing a stable, durable, and hard material.

In some embodiments of the compositions, methods and systems provided herein, the combination of the vaterite and the magnesium oxide results in the activation of the vaterite to both the aragonite and the calcite pathway during dissolution-re-precipitation process. The process may be driven in such a way that the vaterite transforms to the aragonite and the aragonite partially or fully transforms to the calcite along with the magnesium oxide transformation to the magnesium hydroxide. The magnesium hydroxide fills and binds with the aragonite as well as the calcite, thereby providing a stable, durable, and hard material.

During the dissolution-re-precipitation process the magnesium ions are released into the solution and form the magnesium hydroxide. Likewise, the vaterite transforms to the aragonite and/or the calcite through the solution dissolution precipitation reaction. Applicants have surprisingly found that the vaterite dissolution may need to be parallel to the dissolution of magnesium oxide for the magnesium ions to be in solution at sufficient quantity to promote the aragonite formation. The dissolution timing can be made to coincide via controlling the solubility and the dissolution rate of the vaterite and the magnesium oxide (see Example 3). In some embodiments, the vaterite dissolution rate can be modified by changing the particle size and the crystal lattice. For instance, decreasing the vaterite particle size may increase the rate of the dissolution and the transformation. In some embodiments, inducing the crystal lattice defects may raise the solubility of the vaterite and certain ions such as the ammonium and the sulfate ions can be further utilized to stabilize the vaterite and to decrease the dissolution rate of the vaterite. In some embodiments, the magnesium oxide dissolution rate can be affected by its size and crystallinity. In some embodiments, the size and the properties of the magnesium oxide (under burnt, soft burnt, or dead burnt) can be controlled by grinding and calcining (firing) conditions. In some embodiments, decreased magnesium oxide particle size, decreased firing time, and decreased firing temperature may increase the dissolution rate of the magnesium oxide.

In one aspect, there are provided methods to form the composition, comprising:

(i) calcining the limestone to form the mixture comprising lime and magnesium oxide, and the gaseous stream comprising carbon dioxide;

(ii) dissolving the mixture comprising lime and magnesium oxide in the N-containing salt solution to produce the aqueous solution comprising calcium salt and magnesium oxide;

(iii) treating the aqueous solution comprising calcium salt and magnesium oxide with the gaseous stream comprising carbon dioxide to form the composition comprising vaterite and magnesium oxide; and (iv) controlling average particle size of the vaterite and/or controlling calcining/firing temperature of the limestone and/or the magnesium bearing mineral to form the magnesium oxide and transforming the vaterite to the aragonite and/or the calcite and transforming the magnesium oxide to the magnesium hydroxide.

In the above noted aspect, further comprising controlling the average particle size of the vaterite between about 1-50 micron or between 1-20 micron. In the above noted aspect, further comprising controlling calcining/firing temperature of the limestone and/or the magnesium bearing mineral to form the lime and the magnesium oxide, to between about 300° C.-1200° C.; or between about 300° C.-1000° C.; or between about 300° C.-800° C.; or between about 500° C.-1000° C.

The activation of the composition comprising the vaterite and the magnesium oxide may optionally be further achieved by various other processes. Various examples of the activation of the vaterite, such as, but not limited to, nuclei activation, thermal activation, mechanical activation, chemical activation, or combination thereof, are described herein. In some embodiments, the vaterite is activated through various processes such that aragonite and/or the calcite formation and its morphology and/or crystal growth can be controlled upon reaction of the vaterite containing composition with water. The aragonite and/or the calcite formed results in higher tensile strength and fracture tolerance to the products formed from the vaterite.

In some embodiments, the vaterite may be activated by mechanical means, as described herein. For example, the composition comprising the vaterite and the magnesium oxide may be activated by creating surface defects on the composition such that the aragonite and/or the calcite formation is accelerated. In some embodiments, the composition comprising the vaterite and the magnesium oxide is a ball-milled composition.

The composition comprising the vaterite and the magnesium oxide may also be activated by providing chemical or nuclei activation to the vaterite composition. Such chemical or nuclei activation may be provided by one or more of aragonite seeds, calcite seeds, inorganic additive, or organic additive. The aragonite and/or the calcite seed present in the compositions provided herein may be obtained from natural or synthetic sources. The natural sources include, but not limited to, reef sand, lime, hard skeletal material of certain fresh-water and marine invertebrate organisms, including pelecypods, gastropods, mollusk shell, and calcareous endoskeleton of warm- and cold-water corals, pearls, rocks, sediments, ore minerals (e.g., serpentine), and the like. The synthetic sources include, but not limited to, precipitated aragonite and/or the calcite, such as formed from sodium carbonate and calcium chloride; or the aragonite and/or the calcite formed by the transformation of the vaterite, such as transformed vaterite described herein.

In some embodiments, the inorganic additive or the organic additive in the compositions provided herein can be any additive that activates the vaterite. Some examples of inorganic additive or organic additive in the compositions provided herein, include, but not limited to, sodium decyl sulfate, lauric acid, sodium salt of lauric acid, urea, citric acid, sodium salt of citric acid, phthalic acid, sodium salt of phthalic acid, taurine, creatine, dextrose, poly(n-vinyl-1-pyrrolidone), aspartic acid, sodium salt of aspartic acid, magnesium chloride, acetic acid, sodium salt of acetic acid, glutamic acid, sodium salt of glutamic acid, strontium chloride, gypsum, lithium chloride, sodium chloride, glycine, sodium citrate dehydrate, sodium bicarbonate, magnesium sulfate, magnesium acetate, sodium polystyrene, sodium dodecylsulfonate, poly-vinyl alcohol, or combination thereof. In some embodiments, inorganic additive or organic additive in the compositions provided herein, include, but not limited to, taurine, creatine, poly(n-vinyl-1-pyrrolidone), lauric acid, sodium salt of lauric acid, urea, magnesium chloride, acetic acid, sodium salt of acetic acid, strontium chloride, magnesium sulfate, magnesium acetate, or combination thereof. In some embodiments, inorganic additive or organic additive in the compositions provided herein, include, but not limited to, magnesium chloride, magnesium sulfate, magnesium acetate, or combination thereof.

In some embodiments, the inorganic additive in the compositions provided herein can be additional magnesium oxide that is externally added to the composition comprising the vaterite and the magnesium oxide.

Without being limited by any theory, it is contemplated that the activation of the vaterite with the magnesium oxide and/or further activation by ball-milling or by addition of the aragonite and/or the calcite seed, the inorganic additive or the organic additive or combination thereof may result in control of formation of the aragonite and/or the calcite during dissolution-re-precipitation process of the vaterite including control of properties, such as, but not limited to, polymorph, morphology, particle size, cross-linking, agglomeration, coagulation, aggregation, sedimentation, crystallography, inhibiting growth along a certain face of a crystal, allowing growth along a certain face of a crystal, or combination thereof. For example, the presence of the magnesium oxide and optionally other additives such as the aragonite seed, the inorganic additive or the organic additive may selectively target the morphology of the aragonite, inhibit the calcite growth and promote the formation of the aragonite that may generally not be favorable kinetically.

In some embodiments, the one or more inorganic additives may be added to facilitate transformation of the vaterite to the aragonite and/or the calcite and the magnesium oxide to the magnesium hydroxide. The one or more additives may be added during any step of the process. For example, the one or more additives may be added during contact of the aqueous solution or the first aqueous solution with the carbon dioxide gas and optionally the ammonia gas or the second aqueous solution; after contact of the aqueous solution or the first aqueous solution with the carbon dioxide gas and optionally the ammonia gas or the second aqueous solution; during precipitation of the composition, after precipitation of the composition in the slurry, in the slurry after the dewatering of the composition, in the powder after the drying of the slurry, in the aqueous solution to be mixed with the powder composition, or in the slurry made from the powdered composition with water, or any combination thereof. In some embodiments, the water used in the process of making the composition may already contain the one or more additives or the one or more additive ions. For example, if sea water is used in the process, then the additive ion may already be present in the sea water.

In some embodiments, in the foregoing methods, the amount of the one or more additives added during the process is more than 0.1% by weight, or more than 0.5% by weight, or more than 1% by weight, or more than 1.5% by weight, or more than 1.6% by weight, or more than 1.7% by weight, or more than 1.8% by weight, or more than 1.9% by weight, or more than 2% by weight, or more than 2.1% by weight, or more than 2.2% by weight, or more than 2.3% by weight, or more than 2.4% by weight, or more than 2.5% by weight, or more than 2.6% by weight, or more than 2.7% by weight, or more than 2.8% by weight, or more than 2.9% by weight, or more than 3% by weight, or more than 3.5% by weight, or more than 4% by weight, or more than 4.5% by weight, or more than 5% by weight, or between 0.5-5% by weight, or between 0.5-4% by weight, or between 0.5-3% by weight, or 0.5-2% by weight, or 0.5-1% by weight, or 1-3% by weight, or 1-2.5% by weight, or 1-2% by weight, or 1.5-2.5% by weight, or 2-3% by weight, or 2.5-3% by weight, or 0.5% by weight, or 1% by weight, or 1.5% by weight, or 2% by weight, or 2.5% by weight, or 3% by weight, or 3.5% by weight, or 4% by weight, or 4.5% by weight, or 5% by weight. In some embodiments, in the foregoing methods, the amount of the one or more additives added during the process is between 0.5-3% by weight or between 1.5-2.5% by weight.

In some embodiments, the composition comprising the vaterite and the magnesium oxide, as prepared by the methods and systems described herein, sets and hardens (the vaterite transforms to the aragonite and/or the calcite and the magnesium oxide to the magnesium hydroxide) after treatment with the aqueous medium under one or more suitable conditions. The aqueous medium includes, but is not limited to, fresh water optionally containing additives or brine. In some embodiments, the one or more suitable conditions include, but are not limited to, temperature, pressure, time period for setting, a ratio of the aqueous medium to the composition, and combination thereof. The temperature may be related to the temperature of the aqueous medium. In some embodiments, the temperature is in a range of 0-110° C.; or 0-80° C.; or 0-60° C.; or 0-40° C.; or 25-100° C.; or 25-75° C.; or 25-50° C.; or 37-100° C.; or 37-60° C.; or 40-100° C.; or 40-60° C.; or 50-100° C.; or 50-80° C.; or 60-100° C.; or 60-80° C.; or 80-100° C.; or 100-200° C. In some embodiments, the pressure is atmospheric pressure or above atm. pressure. In some embodiments, the time period for setting the cement product is 30 min. to 48 hrs; or 30 min. to 24 hrs; or 30 min. to 12 hrs; or 30 min. to 8 hrs; or 30 min. to 4 hrs; or 30 min. to 2 hrs; 2 to 48 hrs; or 2 to 24 hrs; or 2 to 12 hrs; or 2 to 8 hrs; or 2 to 4 hrs; 5 to 48 hrs; or 5 to 24 hrs; or 5 to 12 hrs; or 5 to 8 hrs; or 5 to 4 hrs; or 5 to 2 hrs; 10 to 48 hrs; or 10 to 24 hrs; or 24 to 48 hrs.

During the mixing of the composition or the precipitation material with the aqueous medium, the precipitate may be subjected to high shear mixer. After mixing, the precipitate may be dewatered again and placed in pre-formed molds to make formed building materials or may be used to make formed building materials using the processes well known in the art or as described herein. Alternatively, the precipitate may be mixed with water and may be allowed to set. The precipitate may set over a period of days and may be then placed in the oven for drying, e.g., at 40° C., or from 40° C.-60° C., or from 40° C.-50° C., or from 40° C.-100° C., or from 50° C.-60° C., or from 50° C.-80° C., or from 50° C.-100° C., or from 60° C.-80° C., or from 60° C.-100° C. The precipitate may be subjected to curing at high temperature, such as, from 50° C.-60° C., or from 50° C.-80° C., or from 50° C.-100° C., or from 60° C.-80° C., or from 60° C.-100° C., or 60° C., or 80° C.-100° C., or 100° C.-200° C. in high humidity, such as, in 30%, or 40%, or 50%, or 60%, or 100% relative humidity.

In some embodiments of the aforementioned aspects and embodiments, the system further comprises a recovering system to recover the residual N-containing salt from the aqueous solution to be recycled back to the dissolution reactor. The recovering system is the system configured to carry out thermal decomposition, reverse osmosis, multi-stage flash distillation, multi-effect distillation, vapor recompression, distillation, and combinations thereof, as described herein above.

The methods and systems provided herein may be carried out at land (e.g., at a location close to the limestone quarry, or is easily and economically transported in), at sea, or in the ocean. In some embodiments, the cement plants calcining the lime may be retro-fitted with the systems described herein to form the composition and further to form products from the composition.

Aspects include systems, including processing plants or factories, for practicing the methods as described herein. Systems may have any configuration that enables practice of the particular production method of interest.

In certain embodiments, the systems include a source of the lime and a structure having an input for the aqueous N-containing salt solution. For example, the systems may include a pipeline or analogous feed of the aqueous N-containing salt solution, wherein the aqueous N-containing salt solution is as described herein. The system further includes an input for the $CO_2$ as well as components for combining these sources with water (optionally an aqueous solution such as water, brine or seawater) before the precipitation or the treatment reactor or in the treatment reactor. In some embodiments, the treatment reactor is a gas-liquid contactor configured to contact enough $CO_2$ to produce the composition in excess of 1, 10, 100, 1,000, or 10,000 tons per day.

The systems further include a treatment reactor that subjects the aqueous solution, or the first aqueous solution introduced to the treatment reactor to the one or more precipitation conditions (as described herein) and produces the composition and the supernatant. In some embodiments, the treatment reactor is configured to hold water sufficient to produce the composition in excess of 1, 10, 100, 1,000, or 10,000 tons per day. The treatment reactor may also be configured to include any of a number of different elements such as temperature modulation elements (e.g., configured to heat the water to a desired temperature), chemical additive elements (e.g., configured for introducing additives etc. into the precipitation reaction mixture), computer automation, and the like.

The gaseous waste stream comprising the $CO_2$ and optionally the $NH_3$ may be provided to the treatment reactor and/or the cooling reactor in any convenient manner. In some embodiments, the gaseous waste stream is provided with a gas conveyer (e.g., a duct) that runs from the dissolution reactor to the treatment reactor and/or the cooling reactor.

Where the water source that is processed by the system to produce the precipitation material is seawater, the input is in fluid communication with a source of sea water, e.g., such as where the input is a pipeline or feed from ocean water to a land-based system or an inlet port in the hull of ship, e.g., where the system is part of a ship, e.g., in an ocean-based system.

The methods and systems may also include one or more detectors configured for monitoring the aqueous N-containing salt solution, the lime, and/or the carbon dioxide (not illustrated in figures). Monitoring may include, but is not limited to, collecting data about the pressure, temperature and composition of the water or the carbon dioxide gas. The detectors may be any convenient device configured to monitor, for example, pressure sensors (e.g., electromagnetic pressure sensors, potentiometric pressure sensors, etc.), temperature sensors (resistance temperature detectors, thermocouples, gas thermometers, thermistors, pyrometers, infrared radiation sensors, etc.), volume sensors (e.g., geophysical diffraction tomography, X-ray tomography, hydroacoustic surveyers, etc.), and devices for determining chemical makeup of the water or the carbon dioxide gas (e.g, IR spectrometer, NMR spectrometer, UV-vis spectrophotometer, high performance liquid chromatographs, inductively coupled plasma emission spectrometers, inductively coupled plasma mass spectrometers, ion chromatographs, X-ray diffractometers, gas chromatographs, gas chromatography-mass spectrometers, flow-injection analysis, scintillation counters, acidimetric titration, and flame emission spectrometers, etc.).

In some embodiments, the detectors may also include a computer interface which is configured to provide a user with the collected data about the aqueous N-containing salt solution, the lime and the magnesium oxide, and/or the carbon dioxide/ammonia gas. In some embodiments, the summary may be stored as a computer readable data file or may be printed out as a user readable document.

In some embodiments, the detector may be a monitoring device such that it can collect real-time data (e.g., internal pressure, temperature, etc.). In other embodiments, the detector may be one or more detectors configured to determine the parameters of the aqueous N-containing salt solution, the lime, and/or the carbon dioxide and/or $NH_3$ gas at regular intervals, e.g., determining the composition every 1 minute, every 5 minutes, every 10 minutes, every 30 minutes, every 60 minutes, every 100 minutes, every 200 minutes, every 500 minutes, or some other interval.

In certain embodiments, the system may further include a station for preparing a building material, such as cement or aggregate, from the composition. Other materials such as formed building materials and/or non-cementitious materials may also be formed from the composition and appropriate station may be used for preparing the same.

As indicated above, the system may be present on land or sea. For example, the system may be land-based system that is in a coastal region, e.g., close to a source of seawater, or even an interior location, where water is piped into the system from a water source, e.g., ocean. Alternatively, the system is a water-based system, i.e., a system that is present on or in water. Such a system may be present on a boat, ocean-based platform etc., as desired.

Calcium carbonate slurry is pumped via pump to the drying system, which in some embodiments includes a filtration step followed by spray drying. The water separated from the drying system is discharged or is recirculated to the reactor. The resultant solid or powder from the drying system is utilized as the cement or the aggregate to produce the building materials. The solid or the powder may also be used as a filler in non-cementitious products such as paper, plastic, paint etc. The solid or powder may also be used in forming formed building materials, such as drywall, cement boards, etc.

In some embodiments, the systems may include a control station, configured to control the amount of the aqueous N-containing salt solution and/or the amount of the lime conveyed to the treatment reactor or the dissolution reactor; the amount of the precipitate conveyed to the separator; the amount of the precipitate conveyed to the drying station; and/or the amount of the precipitate conveyed to the refining station. A control station may include a set of valves or multi-valve systems which are manually, mechanically or digitally controlled, or may employ any other convenient flow regulator protocol. In some instances, the control station may include a computer interface, (where regulation is computer-assisted or is entirely controlled by computer) configured to provide a user with input and output parameters to control the amount, as described above.

II. Compositions

In one aspect, there is provided a cement or non-cement composition comprising the vaterite and the magnesium oxide.

As described herein, the magnesium oxide is under burnt magnesium oxide, soft burnt magnesium oxide, dead burnt magnesium oxide, or combinations thereof.

In some embodiments of the compositions, methods, and systems aspects provided herein, the vaterite is partially formed on the surface of the magnesium oxide. The aforementioned embodiment may occur when the lime and the magnesium oxide go through the processes outlined in FIGS. 1-4 to form the composition comprising the vaterite and the magnesium oxide.

In some embodiments, the compositions provided herein are in a powder form. In some embodiments, the compositions provided herein are in a dry powder form. In some embodiments, the compositions provided herein are wet cake compositions or slurry. In some embodiments, the compositions provided herein are disordered or are not in an ordered array. In still some embodiments, the compositions provided herein are in a partially or wholly hydrated form. In still some embodiments, the compositions provided herein are in saltwater or fresh water. In still some embodiments, the compositions provided herein are in water containing sodium chloride. In still some embodiments, the compositions provided herein are in water containing alkaline earth metal ions, such as, but are not limited to, calcium, magnesium, etc. In some embodiments, the compositions provided herein are non-medical or are not for medical procedures.

In one aspect, there is provided the cement or the non-cement slurry composition comprising the vaterite, the aragonite, the calcite, the magnesium oxide, the magnesium hydroxide, or combinations thereof, and the water. In the aforementioned aspect, the composition comprising the vaterite and the magnesium oxide, when comes in contact with the water to form the slurry, undergoes transformation of the vaterite to the aragonite and/or the calcite (dissolution and re-precipitation in water) and the magnesium oxide to the magnesium hydroxide.

In some embodiments, the aragonite in the compositions, methods, and systems provided herein is in shape of network of needles. In some embodiments, the magnesium hydroxide binds the aragonite needles together. In some embodiments, the magnesium hydroxide stabilizes the aragonite and prevents its transformation to the calcite. In some embodiments, the magnesium hydroxide binds the calcite crystals together. In some embodiments, the magnesium hydroxide stabilizes the calcite.

In some embodiments, the water is bound to the composition in form of the magnesium hydroxide.

In some embodiments, the compositions provided herein have a pH of above 10.

In some embodiments of the foregoing aspects and embodiments, the composition includes at least 10 wt % vaterite; or at least 20 wt % vaterite; or at least 30 wt % vaterite; or at least 40 wt % vaterite; or at least 50 wt % vaterite; or at least 60 wt % vaterite; or at least 70 wt % vaterite; or at least 80 wt % vaterite; or at least 90 wt % vaterite; or at least 95 wt % vaterite; or at least 99 wt % vaterite; or from 10 wt % to 99 wt % vaterite; or from 10 wt % to 90 wt % vaterite; or from 10 wt % to 80 wt % vaterite; or from 10 wt % to 70 wt % vaterite; or from 10 wt % to 60 wt % vaterite; or from 10 wt % to 50 wt % vaterite; or from 10 wt % to 40 wt % vaterite; or from 10 wt % to 30 wt % vaterite; or from 10 wt % to 20 wt % vaterite; or from 20 wt % to 99 wt % vaterite; or from 20 wt % to 95 wt % vaterite; or from 20 wt % to 90 wt % vaterite; or from 20 wt % to 75 wt % vaterite; or from 20 wt % to 50 wt % vaterite; or from 30 wt % to 99 wt % vaterite; or from 30 wt % to 95 wt % vaterite; or from 30 wt % to 90 wt % vaterite; or from 30 wt % to 75 wt % vaterite; or from 30 wt % to 50 wt % vaterite; or from 40 wt % to 99 wt % vaterite; or from 40 wt % to 95 wt % vaterite; or from 40 wt % to 90 wt % vaterite; or from 40 wt % to 75 wt % vaterite; or from 50 wt % to 99 wt % vaterite; or from 50 wt % to 95 wt % vaterite; or from 50 wt % to 90 wt % vaterite; or from 50 wt % to 75 wt % vaterite; or from 60 wt % to 99 wt % vaterite; or from 60 wt % to 95 wt % vaterite; or from 60 wt % to 90 wt % vaterite; or from 70 wt % to 99 wt % vaterite; or from 70 wt % to 95 wt % vaterite; or from 70 wt % to 90 wt % vaterite; or from 80 wt % to 99 wt % vaterite; or from 80 wt % to 95 wt % vaterite; or from 80 wt % to 90 wt % vaterite; or from 90 wt % to 99 wt % vaterite; or 10 wt % vaterite; or 20 wt % vaterite; or 30 wt % vaterite; or 40 wt % vaterite; or 50 wt % vaterite; or 60 wt % vaterite; or 70 wt % vaterite; or 75 wt % vaterite; or 80 wt % vaterite; or 85 wt % vaterite; or 90 wt % vaterite; or 95 wt % vaterite; or 99 wt % vaterite.

In some embodiments of the foregoing aspects and embodiments, the composition includes between about 10-70 wt % of magnesium oxide; or between about 10-60 wt % of magnesium oxide; or between about 10-50 wt % of magnesium oxide; or between about 10-45 wt %; or between about 10-40 wt %; or between about 10-35 wt %; or between about 10-30 wt %; or between about 10-25 wt %; or between about 10-20 wt %; or between about 10-15 wt %; or between about 20-70 wt %; or between about 20-60 wt %; or between about 20-50 wt %; or between about 20-40 wt %; or between about 20-30 wt %; or between about 20-25 wt %; or between about 30-70 wt %; or between about 30-60 wt %; or between about 30-50 wt %; or between about 30-40 wt %; or between about 40-70 wt %; or between about 40-60 wt %; or between about 40-50 wt % of magnesium oxide in the compositions.

In some embodiments of the foregoing aspects and embodiments, the composition includes between about 30-99 wt % vaterite and between about 1-70 wt % magnesium oxide; or between about 50-90 wt % vaterite and between about 10-50 wt % magnesium oxide; or between about 60-90 wt % vaterite and between about 10-40 wt % magnesium oxide; or between about 70-90 wt % vaterite and between about 10-30 wt % magnesium oxide; or between about 80-99 wt % vaterite and between about 1-20 wt % magnesium oxide.

In some embodiments, the composition comprising the vaterite and the magnesium oxide is a particulate composition with an average particle size of between about 0.1-100 microns. The average particle size (or average particle diameter) may be determined using any conventional particle size determination method, such as, but not limited to, multi-detector laser scattering or laser diffraction or sieving. In certain embodiments, unimodel or multimodal, e.g., bimodal or other, distributions are present. Bimodal distributions may allow the surface area to be minimized, thus allowing a lower liquids/solids mass ratio when composition is mixed with water yet providing smaller reactive particles for early reaction. In some embodiments, the composition or the precipitation material comprising the vaterite and the magnesium oxide provided herein is the particulate composition with an average particle size of 0.1-1000 microns; or 0.1-500 microns; or 0.1-100 microns; or 0.1-50 microns; or 0.1-20 microns; or 0.1-10 microns; or 0.1-5 microns; or 1-50 microns; or 1-25 microns; or 1-20 microns; or 1-10 microns; or 1-5 microns; or 5-70 microns; or 5-50 microns; or 5-20 microns; or 5-10 microns; or 10-100 microns; or 10-50 microns; or 10-20 microns; or 10-15 microns; or 15-50 microns; or 15-30 microns; or 15-20 microns; or 20-50 microns; or 20-30 microns; or 30-50 microns; or 40-50 microns; or 50-100 microns; or 50-60 microns; or 60-100 microns; or 60-70 microns; or 70-100 microns; or 70-80 microns; or 80-100 microns; or 80-90 microns; or 0.1 microns; or 0.5 microns; or 1 microns; or 2 microns; or 3 microns; or 4 microns; or 5 microns; or 8 microns; or 10 microns; or 15 microns; or 20 microns; or 30 microns; or 40 microns; or 50 microns; or 60 microns; or 70 microns; or 80 microns; or 100 microns. For example, in some embodiments, the composition comprising the vaterite and the magnesium oxide provided herein is the particulate composition with an average particle size of 0.1-20 micron; or 0.1-15 micron; or 0.1-10 micron; or 0.1-8 micron; or 0.1-5 micron; or 1-25 micron; or 1-20 micron; or 1-15 micron; or 1-10 micron; or 1-5 micron; or 5-20 micron; or 5-10 micron. In some embodiments, the composition comprising the vaterite and the magnesium oxide includes two or more, or three or more, or four or more, or five or more, or ten or more, or 20 or more, or 3-20, or 4-10 different sizes of the particles in the composition or the precipitation material. For example, the composition may include two or more, or three or more, or between 3-20 particles ranging from 0.1-10 micron, 10-50 micron, 50-100 micron, 100-200 micron, 200-500 micron, 500-1000 micron, and/or sub-micron sizes of the particles. In some embodiments, the composition may have average particle size below 0.1 micron, or sub-micron or between 0.001 micron to 1 micron or more.

In some embodiments, the composition comprising the vaterite and the magnesium oxide may further include OPC or Portland cement clinker. The amount of Portland cement component may vary and range from 10 to 95 wt %; or 10 to 90 wt %; or 10 to 80 wt %; or 10 to 70 wt %; or 10 to 60 wt %; or 10 to 50 wt %; or 10 to 40 wt %; or 10 to 30 wt %; or 10 to 20 wt %; or 20 to 90 wt %; or 20 to 80 wt %; or 20 to 70 wt %; or 20 to 60 wt %; or 20 to 50 wt %; or 20 to 40 wt %; or 20 to 30 wt %; or 30 to 90 wt %; or 30 to 80 wt %; or 30 to 70 wt %; or 30 to 60 wt %; or 30 to 50 wt %; or 30 to 40 wt %; or 40 to 90 wt %; or 40 to 80 wt %; or 40 to 70 wt %; or 40 to 60 wt %; or 40 to 50 wt %; or 50 to 90 wt %; or 50 to 80 wt %; or 50 to 70 wt %; or 50 to 60 wt %; or 60 to 90 wt %; or 60 to 80 wt %; or 60 to 70 wt %; or 70 to 90 wt %; or 70 to 80 wt %. For example, the composition comprising the vaterite and the magnesium oxide may include a blend of 75% OPC and 25% composition; or 80% OPC and 20% composition; or 85% OPC and 15% composition; or 90% OPC and 10% composition; or 95% OPC and 5% composition.

In certain embodiments, the composition comprising the vaterite and the magnesium oxide may further include the aggregate. The aggregate may be included in the composition or the precipitation material to provide for mortars which include fine aggregate and concretes which also include coarse aggregate. The fine aggregates are materials that almost entirely pass through a Number 4 sieve (ASTM C 125 and ASTM C 33), such as silica sand. The coarse aggregate are materials that are predominantly retained on a Number 4 sieve (ASTM C 125 and ASTM C 33), such as silica, quartz, crushed round marble, glass spheres, granite, lime, calcite, feldspar, alluvial sands, sands or any other durable aggregate, and mixtures thereof. As such, the aggregate is used broadly to refer to a number of different types of both coarse and fine particulate material, including, but are not limited to, sand, gravel, crushed stone, slag, and recycled concrete. The amount and nature of the aggregate may vary widely. In some embodiments, the amount of aggregate may range from 25 to 80 wt %, such as 40 to 70 wt % and including 50 to 70 wt % of the total composition made up of both the composition and the aggregate.

In some embodiments, the composition comprising the vaterite and the magnesium oxide in wet or dried form, further comprises one or more admixtures to impart one or more properties to the product including, but not limited to, strength, flexural strength, compressive strength, porosity, thermal conductivity, etc. The amount of admixture that is employed may vary depending on the nature of the admixture. In some embodiments, the amount of the one or more admixtures ranges from 0.01-50 wt %, such as 1-30 wt %, or 1-25 wt %, or 1-20 wt %, or 2-10 wt %. Examples of the admixtures include, but not limited to, set accelerators, set retarders, air-entraining agents, foaming agents, defoamers, alkali-reactivity reducers, bonding admixtures, dispersants, coloring admixtures, corrosion inhibitors, damp-proofing admixtures, gas formers, permeability reducers, pumping aids, shrinkage compensation admixtures, fungicidal admixtures, germicidal admixtures, insecticidal admixtures, rheology modifying agents, finely divided mineral admixtures, pozzolans, aggregates, wetting agents, strength enhancing agents, water repellents, reinforced material such as fibers, and any other admixture. When using an admixture, the composition or the precipitation material, to which the admixture raw materials are introduced, is mixed for sufficient time to cause the admixture raw materials to be dispersed relatively uniformly throughout the composition.

Set accelerators may be used to accelerate the setting and early strength development of cement. Examples of set accelerators that may be used include, but are not limited to, POZZOLITH®NC534, non-chloride type set accelerator and/or RHEOCRETE®CNI calcium nitrite-based corrosion inhibitor. Set retarding, also known as delayed-setting or hydration control, admixtures are used to retard, delay, or slow the rate of setting of cement. Most set retarders may also act as low-level water reducers and can also be used to entrain some air into product. An example of a retarder is DELVO®. The air entrainer includes any substance that will entrain air in the compositions. Some air entrainers can also reduce the surface tension of a composition at low concentration. Air-entraining admixtures are used to purposely entrain microscopic air bubbles into cement. Air entrainment may increase the workability of the mix while eliminating or reducing segregation and bleeding. Materials used to achieve these desired effects can be selected from wood resin, natural resin, synthetic resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, an inorganic air entrainer, synthetic detergents, and their corresponding salts, and mixtures thereof. The air entrainers are added in an amount to yield a desired level of air in a cementitious composition. Examples of the air entrainers that can be utilized in the admixture system include, but are not limited to MB AE 90, MB VR and MICRO AIRR, all available from BASF Admixtures Inc. of Cleveland, Ohio.

In some embodiments, the composition comprising the vaterite and the magnesium oxide further comprises foaming agent. The foaming agents incorporate large quantities of air voids/porosity and facilitate reduction of the material's density. Examples of the foaming agents include, but not limited to, soap, detergent (alkyl ether sulfate), millifoam™ (alkyl ether sulfate), cedepal™ (ammonium alkyl ethoxy sulfate), witcolate™ 12760, and the like.

In some embodiments, the composition comprising the vaterite and the magnesium oxide further comprises defoamers. The defoamers are used to decrease the air content in the cementitious composition. Also of interest as admixtures are dispersants. The dispersant includes, but is not limited to, polycarboxylate dispersants, with or without polyether units. The term dispersant is also meant to include those chemicals that also function as a plasticizer, water reducer such as a high range water reducer, fluidizer, anti-flocculating agent, or superplasticizer for compositions, such as lignosulfonates, salts of sulfonated naphthalene sulfonate condensates, salts of sulfonated melamine sulfonate condensates, beta naphthalene sulfonates, sulfonated melamine formaldehyde condensates, naphthalene sulfonate formaldehyde condensate resins for example LOMAR DR dispersant (Cognis Inc., Cincinnati, Ohio), polyaspartates, or oligomeric dispersants. Polycarboxylate dispersants can be used, by which is meant a dispersant having a carbon backbone with pendant side chains, wherein at least a portion of the side chains are attached to the backbone through a carboxyl group or an ether group.

Natural and synthetic admixtures may be used to color the product for aesthetic and safety reasons. These coloring admixtures may be composed of pigments and include carbon black, iron oxide, phthalocyanine, umber, chromium oxide, titanium oxide, cobalt blue, and organic coloring agents. Also of interest as admixtures are corrosion inhibitors. The corrosion inhibitors may serve to protect embedded reinforcing steel from corrosion. The materials commonly used to inhibit the corrosion are calcium nitrite, sodium nitrite, sodium benzoate, certain phosphates or fluorosilicates, fluoroaluminites, amines and related chemicals. Also of interest are damp-proofing admixtures. The damp-proofing admixtures reduce the permeability of the product that has low cement contents, high water-cement ratios, or a deficiency of fines in the aggregate. These admixtures retard moisture penetration into dry products and include certain soaps, stearates, and petroleum products. Also of interest are gas former admixtures. The gas formers, or gas-forming agents, are sometimes added to the mix to cause a slight expansion prior to hardening. The amount of expansion is dependent upon the amount of gas-forming material used and the temperature of the fresh mixture. Aluminum powder, resin soap and vegetable or animal glue, saponin or hydrolyzed protein can be used as gas formers. Also of interest are permeability reducers. The permeability reducers may be used to reduce the rate at which water under pressure is transmitted through the mix. Silica fume, fly ash, ground slag, natural pozzolans, water reducers, and latex may be employed to decrease the permeability of the mix.

In some embodiments, the composition comprising the vaterite and the magnesium oxide further comprises rheology modifying agent admixtures. The rheology modifying agents may be used to increase the viscosity of the compositions. Suitable examples of rheology modifier include firmed silica, colloidal silica, hydroxyethyl cellulose, starch, hydroxypropyl cellulose, fly ash (as defined in ASTM C618), mineral oils (such as light naphthenic), clay such as hectorite clay, polyoxyalkylenes, polysaccharides, natural gums, or mixtures thereof. Some of the mineral extenders such as, but not limited to, sepiolite clay are rheology modifying agents.

In some embodiments, the composition comprising the vaterite and the magnesium oxide further comprises shrinkage compensation admixtures. TETRAGUARD® is an example of a shrinkage reducing agent. Bacterial and fungal growth on or in hardened product may be partially controlled through the use of fungicidal and germicidal admixtures. The materials for these purposes include, but are not limited to, polyhalogenated phenols, dialdrin emulsions, and copper compounds. Also of interest in some embodiments is workability improving admixtures. Entrained air, which acts like a lubricant, can be used as a workability improving agent. Other workability agents are water reducers and certain finely divided admixtures.

In some embodiments, the composition comprising the vaterite and the magnesium oxide further comprises reinforced material such as fibers, e.g., where fiber-reinforced product is desirable. The fibers can be made of zirconia containing materials, aluminum, glass, steel, carbon, ceramic, grass, bamboo, wood, fiberglass, or synthetic materials, e.g., polypropylene, polycarbonate, polyvinyl chloride, polyvinyl alcohol, nylon, polyethylene, polyester, rayon, high-strength aramid, (e.g., Kevlar®), or mixtures thereof. The reinforced material is described in U.S. patent application Ser. No. 13/560,246, filed Jul. 27, 2012, which is incorporated herein in its entirety in the present disclosure.

In some embodiments, the compositions provided herein further include one or more additional components including, but are not limited to, blast furnace slag, fly ash, diatomaceous earth, and other natural or artificial pozzolans, silica fumes, limestone, gypsum, hydrated lime, air entrainers, retarders, waterproofers and coloring agents. These components may be added to modify the properties of the cement, e.g., to provide desired strength attainment, to provide desired setting times, etc. The amount of such components present in the composition may vary, and in certain embodiments the amounts of these components range from 0.01 to 50 wt %, or 10 to 50 wt %, such as 2 to 10 wt %.

In some embodiments, the compositions provided herein further include supplementary cementitious materials (SCM). In some embodiments, the SCM is slag, fly ash, silica fume, or calcined clay.

The components of the composition can be combined using any suitable protocol. Each material may be mixed at the time of work, or part of or all of the materials may be mixed in advance. Alternatively, some of the materials are mixed with water with or without admixtures, such as high-range water-reducing admixtures, and then the remaining materials may be mixed therewith. As a mixing apparatus, any conventional apparatus can be used. For example, Hobart mixer, slant cylinder mixer, Omni Mixer, Henschel mixer, V-type mixer, and Nauta mixer can be employed.

III. Products

Provided herein are methods and systems for utilizing the composition comprising the vaterite and the magnesium oxide formed from the calcination of the limestone comprising the magnesium bearing minerals and/or mixed with the magnesium bearing minerals, to form the cementitious and/or the non-cementitious products. Provided herein are environmentally friendly methods and systems of removing or separating the $CO_2$ in the gaseous waste stream from the calcination of the limestone, and fixing the $CO_2$ into the non-gaseous, storage-stable form (e.g., materials for the construction of structures such as buildings and infrastructure, as well as the structures themselves or formed building materials such as drywall, or non-cementitious materials such as paper, paint, plastic, etc. or artificial reefs) such that the $CO_2$ does not escape into the atmosphere.

The product produced by the methods described herein may be the aggregate or the building material or a pre-cast material or a formed building material. In some embodiments, the product produced by the methods described herein includes the non-cementitious materials such as paper, paint, PVC etc. In some embodiments, the product produced by the methods described herein includes artificial reefs. These products have been described herein.

In one aspect, there are provided cement or non-cement products comprising the aragonite and/or the calcite and the magnesium hydroxide. In some embodiments, the aragonite is in shape of network of needles. In some embodiments, the magnesium hydroxide binds the aragonite and/or the calcite together. In some embodiments, the magnesium hydroxide imparts unique characteristics to the aragonitic cement and/or the calcitic cement including but not limited to, filling porosity of the aragonite and/or the calcite making it dense and less porous; stabilizing the aragonite and preventing its transformation to the calcite; binding the aragonite needles together enhancing its strength and durability; binding the calcite together enhancing its strength and durability; and imparting a pH of above 10 to the product and preventing any steel corrosion of the steel enforcements in the cement structures.

In some embodiments, the porosity of the product is between about 0-95%; or between about 0-90%; or between about 0-80%; or between about 0-70%; or between about 0-60%; or between about 0-50%; or between about 0-40%; or between about 0-30%; or between about 0-20%; or between about 0-10%; or between about 10-95%; or between about 10-80%; or between about 10-70%; or between about 10-60%; or between about 10-50%; or between about 10-40%; or between about 10-30%; or between about 10-20%; or between about 20-95%; or between about 20-80%; or between about 20-70%; or between about 20-60%; or between about 20-50%; or between about 20-40%; or between about 20-30%; or between about 30-95%; or between about 30-80%; or between about 30-70%; or between about 30-60%; or between about 30-50%; or between about 30-40%; or between about 50-95%; or between about 70-80%; or between about 40-70%. In some embodiments, the amount of the magnesium oxide may be optimized in the composition comprising the vaterite such that the porosity of the product (after transformation of the vaterite to the aragonite and/or the calcite and the magnesium oxide to the magnesium hydroxide) formed from the composition can be optimized.

Without being limited by the methods and systems provided herein, the composition comprising the vaterite and the magnesium oxide may be formed by mixing the composition comprising the vaterite with the magnesium oxide where the magnesium oxide is added as an additive to the composition. In some embodiments, the magnesium oxide may be added to supplement the magnesium oxide already present in the composition.

The products made from the compositions, or the precipitation material provided herein show one or more properties, such as, high compressive strength, high durability, high porosity (light weight), high flexural strength, and less maintenance costs. In some embodiments, the compositions comprising the vaterite and the magnesium oxide upon combination with water, setting, and hardening, have a compressive strength of at least 0.05 MPa (megapascal), at least 3 MPa, or at least 7 MPa, or at least 10 MPa or in some embodiments, between 0.05-30 MPa, or between 3-30 MPa, or between 14-80 MPa or 14-35 MPa.

In some embodiments of the foregoing aspects and the foregoing embodiments, the composition comprising the vaterite and the magnesium oxide after combination with water, setting, and hardening (i.e. transformation of the vaterite to the aragonite and/or the calcite and the magnesium oxide to the magnesium hydroxide) has the compressive strength of at least 0.05 MPa; at least 3 MPa; at least 7 MPa; at least 14 MPa; or at least 16 MPa; or at least 18 MPa; or at least 20 MPa; or at least 25 MPa; or at least 30 MPa; or at least 35 MPa; or at least 40 MPa; or at least 45 MPa; or at least 50 MPa; or at least 55 MPa; or at least 60 MPa; or at least 65 MPa; or at least 70 MPa; or at least 75 MPa; or at least 80 MPa; or at least 85 MPa; or at least 90 MPa; or at least 95 MPa; or at least 100 MPa; or from 0.05-50 MPa; or from 3-50 MPa; or from 3-25 MPa; or from 3-15 MPa; or from 3-10 MPa; or from 14-25 MPa; or from 14-100 MPa; or from 14-80 MPa; or from 14-75 MPa; or from 14-50 MPa; or from 14-25 MPa; or from 17-35 MPa; or from 17-25 MPa; or from 20-100 MPa; or from 20-75 MPa; or from 20-50 MPa; or from 20-40 MPa; or from 30-90 MPa; or from 30-75 MPa; or from 30-60 MPa; or from 40-90 MPa; or from 40-75 MPa; or from 50-90 MPa; or from 50-75 MPa; or from 60-90 MPa; or from 60-75 MPa; or from 70-90 MPa; or from 70-80 MPa; or from 70-75 MPa; or from 80-100 MPa; or from 90-100 MPa; or from 90-95 MPa; or 14 MPa; or 3 MPa; or 7 MPa; or 16 MPa; or 18 MPa; or 20 MPa; or 25 MPa; or 30 MPa; or 35 MPa; or 40 MPa; or 45 MPa. For example, in some embodiments of the foregoing aspects and the foregoing embodiments, the composition after setting, and hardening has a compressive strength of 3 MPa to 25 MPa; or 14 MPa to 40 MPa; or 17 MPa to 40 MPa; or 20 MPa to 40 MPa; or 30 MPa to 40 MPa; or 35 MPa to 40 MPa. In some embodiments, the compressive strengths described herein are the compressive strengths after 1 day, or 3 days, or 7 days, or 28 days, or 56 days, or longer.

Building Material

The "building material" used herein includes material used in construction. In one aspect, there is provided a structure or a building material comprising the set and hardened form of the composition comprising the vaterite and the magnesium oxide when the vaterite converts to the aragonite and/or the calcite and the magnesium oxide converts to the magnesium hydroxide that sets and hardens. In one aspect, there is provided the structure or the building material comprising the aragonite and/or the calcite and the magnesium hydroxide. The product (product (A) or (B) in the FIGS. 1-3) containing the aragonite and/or the calcite and the magnesium hydroxide form shows one or more unexpected properties, including but not limited to, high compressive strength, high porosity (low density or light weight), neutral pH (e.g., useful as artificial reef), microstructure network, etc.

Examples of such structures or the building materials include, but are not limited to, concrete, aggregate, building, driveway, foundation, kitchen slab, furniture, pavement, road, bridges, motorway, overpass, parking structure, brick, block, wall, footing for a gate, fence, or pole, and combination thereof.

Formed Building Material

The "formed building material" used herein includes materials shaped (e.g., molded, cast, cut, or otherwise produced) into structures with defined physical shape. The formed building material may be a pre-cast building material, such as, a pre-cast cement or concrete product. The formed building materials and the methods of making and using the formed building materials are described in U.S. application Ser. No. 12/571,398, filed Sep. 30, 2009, which is incorporated herein by reference in its entirety. The formed building materials may vary greatly and include materials shaped (e.g., molded, cast, cut, or otherwise produced) into structures with defined physical shape, i.e., configuration. The formed building materials are distinct from amorphous building materials (e.g., powder, paste, slurry, etc.) that do not have a defined and stable shape, but instead conform to the container in which they are held, e.g., a bag or other container. The formed building materials are also distinct from irregularly or imprecisely formed materials (e.g., aggregate, bulk forms for disposal, etc.) in that formed building materials are produced according to specifications that allow for use of formed building materials in, for example, buildings. The formed building materials may be prepared in accordance with traditional manufacturing protocols for such structures, with the exception that the compositions provided herein are employed in making such materials.

In some embodiments, the methods and systems provided herein further include setting and hardening the composition comprising the vaterite and the magnesium oxide where the vaterite converts to the aragonite and/or the calcite and the magnesium oxide converts to the magnesium hydroxide, that sets and hardens and forms a formed building material. In one aspect, there is provided the formed building material comprising the aragonite and/or the calcite and the magnesium hydroxide.

In some embodiments, the formed building materials made from the composition comprising the vaterite and the magnesium oxide have a compressive strength or the flexural strength of at least 0.05 MPa, at least 3 MPa, at least 10 MPa, or at least 14 MPa, or between 3-30 MPa, or between about 14-100 MPa, or between about 14-45 MPa; or the compressive strength of the composition after setting, and hardening, as described herein.

Examples of the formed building materials that can be produced by the foregoing methods and systems, include, but not limited to, masonry units, for example only, bricks, blocks, and tiles including, but not limited to, ceiling tiles; construction panels, for example only, cement board (boards traditionally made from cement such as fiber cement board) and/or drywall (boards traditionally made from gypsum); conduits; basins; beam; column, slab; acoustic barrier; insulation material; or combinations thereof. Construction panels are formed building materials employed in a broad sense to refer to any non-load-bearing structural element that are characterized such that their length and width are substantially greater than their thickness. As such the panel may be a plank, a board, shingles, and/or tiles. Exemplary construction panels formed from the precipitation material provided herein include cement boards and/or drywall. Construction panels are polygonal structures with dimensions that vary greatly depending on their intended use. The dimensions of construction panels may range from 50 to 500 cm in length, including 100 to 300 cm, such as 250 cm; width ranging from 25 to 200 cm, including 75 to 150 cm, such as 100 cm; thickness ranging from 5 to 25 mm, including 7 to 20 mm, including 10 to 15 mm.

In some embodiments, the cement board and/or the drywall may be used in making different types of boards such as, but not limited to, paper-faced board (e.g. surface reinforcement with cellulose fiber), fiberglass-faced or glass mat-faced board (e.g., surface reinforcement with glass fiber mat), fiberglass mesh reinforced board (e.g. surface reinforcement with glass mesh), and/or fiber-reinforced board (e.g., cement reinforcement with cellulose, glass, fiber etc.). These boards may be used in various applications including, but not limited to, sidings such as, fiber-cement sidings, roofing, soffit, sheathing, cladding, decking, ceiling, shaft liner, wall board, backer, trim, frieze, shingle, and fascia, and/or underlayment.

The cement boards made by the methods and systems provided herein are made from the composition comprising the vaterite and the magnesium oxide that partially or wholly replaces the traditional cement in the board. In some embodiments, the cement boards may comprise construction panels prepared as a combination of the aragonitic and the magnesium hydroxide cement or a combination of the calcitic and the magnesium hydroxide cement and fiber and/or fiberglass and may possess additional fiber and/or fiberglass reinforcement at both faces of the board.

The cement boards are formed building materials which in some embodiments, are used as backer boards for ceramics that may be employed behind bathroom tiles, kitchen counters, backsplashes, etc. and may have lengths ranging from 100 to 200 cm. The cement boards may vary in physical and mechanical properties. In some embodiments, the flexural strength may vary, ranging between 1 to 7.5 MPa, including 2 to 6 MPa, such as 5 MPa. The compressive strengths may also vary, ranging from 5 to 50 MPa, including 10 to 30 MPa, such as 15 to 20 MPa. In some embodiments, the cement boards may be employed in environments having extensive exposure to moisture (e.g., commercial saunas). The composition or the precipitation material described herein may be used to produce the desired shape and size to form the cement board. In addition, a variety of further components may be added to the cement boards which include, but are not limited to, plasticizers, clay, foaming agents, accelerators, retarders and air entrainment additives. The composition is then poured out into sheet molds or a roller may be used to form sheets of a desired thickness. The shaped composition may be further compacted by roller compaction, hydraulic pressure, vibrational compaction, or resonant shock compaction. The sheets are then cut to the desired dimensions of the cement boards.

Another type of construction panel formed from the composition described herein is backer board. The backer board may be used for the construction of interior, and/or exterior floors, walls and ceilings. In the embodiments, the backer board is made partially or wholly from the composition comprising the vaterite and the magnesium oxide.

Another type of construction panel formed from the compositions is drywall. The drywall includes board that is used for construction of interior, and/or exterior floors, walls and ceilings. Traditionally, the drywall is made from gypsum (called paper-faced board). In the embodiments, the drywall is made partially or wholly from the composition comprising the vaterite and the magnesium oxide thereby replacing gypsum from the drywall product. In some embodiments, the drywall may comprise construction panels prepared as a combination of the aragonitic and/or the calcitic and the magnesium hydroxide cement and cellulose, fiber and/or fiberglass and may possess additional paper, fiber, fiberglass mesh and/or fiberglass mat reinforcement at both faces of the board. Various processes for making the drywall product are well known in the art and are well within the scope of the invention. Some examples include, but not limited to, wet process, semi dry process, extrusion process, wonderborad® process, etc., that have been described herein.

In some embodiments, the drywall is panel made of a paper liner wrapped around an inner core. For example, in some embodiments, during the process of making the drywall product from the composition comprising the vaterite and the magnesium oxide, the slurry of the composition comprising the vaterite and the magnesium oxide is poured over a sheet of paper. Another sheet of paper is then put on top of the composition such that the composition is flanked by the paper on both sides (the resultant composition sandwiched between two sheets of outer material, e.g., heavy paper or fiberglass mats). The vaterite in the composition then transforms to the aragonite and/or the calcite and the magnesium oxide transforms to the magnesium hydroxide (optionally using heat) which then sets and hardens. When the core sets and is dried in a large drying chamber, the sandwich becomes rigid and strong enough for use as the building material. The drywall sheets are then cut and separated.

The flexural and the compressive strengths of the drywall formed from the composition comprising the vaterite and the magnesium oxide are equal to or higher than conventional drywall prepared with gypsum plaster, which is known to be a soft construction material. In some embodiments, the flexural strength may range between 0.1 to 3 MPa, including 0.5 to 2 MPa, such as 1.5 MPa. The compressive strengths may also vary, in some instances ranging from 1 to 20 MPa, including 5 to 15 MPa, such as 8 to 10 MPa. In some embodiments, the formed building materials such as, the construction panels such as, but not limited to, the cement boards and the drywall produced by the methods and systems described herein, have low density and high porosity making them suitable for lightweight and insulation applications. The high porosity and light weight of the formed building materials such as the construction panels may be due to the development of the aragonitic and/or the calcitic microstructure when the vaterite transforms to the aragonite and/or the calcite and filling of the porosity of the aragonite and/or the calcite with the magnesium hydroxide. The transformation of the vaterite during dissolution/re-precipitation process may lead to micro porosity generation while at the same time the voids created between the aragonitic crystals and/or the calcite formed may be filled with the magnesium hydroxide providing strength and light weight structure. Certain admixtures may be added during the transformation process such as, but not limited to, the foaming agents, the rheology modifiers and the mineral extenders, such as, but not limited to, clay, starch, etc. which may add to the porosity in the product as the foaming agent may entrain air in the mixture and lower the overall density and mineral extender such as sepiolite clay may increase the viscosity of the mixture thereby preventing segregation of the composition and water.

One of the applications of the cement board or the drywall is the fiber cement siding. The fiber-cement sidings formed by the methods and systems provided herein comprise construction panels prepared as a combination of the aragonitic cement and/or the calcitic cement, aggregate, interwoven cellulose, and/or polymeric fibers and may possess a texture and flexibility that resembles wood.

In some embodiments, the formed building materials are masonry units. The masonry units are formed building materials used in the construction of load-bearing and non-load-bearing structures that are generally assembled using mortar, grout, and the like. Exemplary masonry units formed from the compositions include bricks, blocks, and tiles.

Another formed building material formed from the compositions described herein is a conduit. The conduits are tubes or analogous structures configured to convey a gas or liquid, from one location to another. The conduits can include any of a number of different structures used in the conveyance of a liquid or gas that include, but are not limited to, pipes, culverts, box culverts, drainage channels and portals, inlet structures, intake towers, gate wells, outlet structures, and the like.

Another formed building material formed from the compositions described herein is basins. The term basin may include any configured container used to hold a liquid, such as water. As such, the basin may include, but is not limited to structures such as wells, collection boxes, sanitary manholes, septic tanks, catch basins, grease traps/separators, storm drain collection reservoirs, etc.

Another formed building material formed from the compositions described herein is a beam, which, in a broad sense, refers to a horizontal load-bearing structure possessing large flexural and compressive strengths. The beams may be rectangular cross-shaped, C-channel, L-section edge beams, I-beams, spandrel beams, H-beams, possess an inverted T-design, etc. The beams may also be horizontal load-bearing units, which include, but are not limited to joists, lintels, archways and cantilevers.

Another formed building material formed from the compositions described herein is a column, which, in a broad sense, refers to a vertical load-bearing structure that carries loads chiefly through axial compression and includes structural elements such as compression members. Other vertical compression members of the invention may include, but are not limited to pillars, piers, pedestals, or posts.

Another formed building material formed from the compositions described herein is a concrete slab. The concrete slabs are those building materials used in the construction of prefabricated foundations, floors and wall panels. In some instances, the concrete slab may be employed as a floor unit (e.g., hollow plank unit or double tee design).

Another formed building material formed from the compositions described herein is an acoustic barrier, which refers to a structure used as a barrier for the attenuation or absorption of sound. As such, the acoustic barrier may include, but is not limited to, structures such as acoustical panels, reflective barriers, absorptive barriers, reactive barriers, etc.

Another formed building material formed from the compositions described herein is an insulation material, which refers to a material used to attenuate or inhibit the conduction of heat. Insulation may also include those materials that reduce or inhibit radiant transmission of heat.

In some embodiments, the other formed building materials such as pre-cast concrete products include, but not limited to, bunker silo; cattle feed bunk; cattle grid; agricultural fencing; H-bunks; J-bunks; livestock slats; livestock watering troughs; architectural panel walls; cladding (brick); building trim; foundation; floors, including slab on grade; walls; double wall precast sandwich panel; aqueducts; mechanically stabilized earth panels; box culverts; 3-sided culverts; bridge systems; RR crossings; RR ties; sound walls/barriers; Jersey barriers; tunnel segments; reinforced concrete box; utility protection structure; hand holes; hollowcore product; light pole base; meter box; panel vault; pull box; telecom structure; transformer pad; transformer vault; trench; utility vault; utility pole; controlled environment vaults; underground vault; mausoleum; grave stone; coffin; haz mat storage container; detention vaults; catch basins; manholes; aeration system; distribution box; dosing tank; dry well; grease interceptor; leaching pit; sand-oil/oil-water interceptor; septic tank; water/sewage storage tank; wetwells; fire cisterns; floating dock; underwater infrastructure; decking; railing; sea walls; roofing tiles; pavers; community retaining wall; res. retaining wall; modular block systems; and segmental retaining walls.

Non-Cementitious Compositions

In some embodiments, the methods and systems described herein include making other products from the compositions described herein including, but not limited to, non-cementitious compositions including paper, polymer product, lubricant, adhesive, rubber product, chalk, asphalt product, paint, abrasive for paint removal, personal care product, cosmetic, cleaning product, personal hygiene product, ingestible product, agricultural product, soil amendment product, pesticide, environmental remediation product, and combination thereof. Such compositions have been described in U.S. Pat. No. 7,829,053, issued Nov. 9, 2010, which is incorporated herein by reference in its entirety.

Artificial Marine Structures

In some embodiments, the methods described herein include making artificial marine structures from the compositions described herein including, but not limited to, artificial corals and reefs. In some embodiments, the artificial structures can be used in the aquariums or sea. In some embodiments, these products are made from the compositions comprising the vaterite and the magnesium oxide that transforms to the aragonite and/or the calcite and the magnesium hydroxide, after setting and hardening. The aragonitic cement and/or the calcitic cement may provide neutral or close to neutral pH which may be conducive for maintenance and growth of marine life. The aragonitic reefs may provide suitable habitat for marine species.

Throughout the description, where compositions are described as having, including, or comprising specific components, or where processes and methods are described as having, including, or comprising specific steps, it is contemplated that, additionally, there are compositions of the present invention that consist essentially of, or consist of, the recited components, and that there are processes and methods according to the present invention that consist essentially of, or consist of, the recited processing steps.

In the application, where an element or component is said to be included in and/or selected from a list of recited elements or components, it should be understood that the element or component can be any one of the recited elements or components, or the element or component can be selected from a group consisting of two or more of the recited elements or components.

Further, it should be understood that elements and/or features of a composition or a method described herein can be combined in a variety of ways without departing from the spirit and scope of the present invention, whether explicit or implicit herein. For example, where reference is made to a particular composition, that composition can be used in various embodiments of compositions of the present invention and/or in methods of the present invention, unless otherwise understood from the context. In other words, within this application, embodiments have been described and depicted in a way that enables a clear and concise application to be written and drawn, but it is intended and will be appreciated that embodiments may be variously combined or separated without parting from the present teachings and invention(s). For example, it will be appreciated that all features described and depicted herein can be applicable to all aspects of the invention(s) described and depicted herein.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

Certain ranges are presented herein with numerical values being preceded by the term "about." The term "about" is used herein to provide literal support for the exact number that it precedes, as well as a number that is near to or approximately the number that the term precedes. As used herein, the term "about" refers to a +10% variation from the nominal value unless otherwise indicated or inferred.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the invention, representative illustrative methods and materials are described herein.

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided may be different from the actual publication dates, which may need to be independently confirmed.

It should be understood that the expression "at least one of" includes individually each of the recited objects after the expression and the various combinations of two or more of the recited objects unless otherwise understood from the context and use.

It is noted that, as used herein and in the appended claims, the singular forms "a", "an", and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method can be carried out in the order of events recited or in any other order, which is logically possible. It should be understood that the order of steps or order for performing certain actions is immaterial so long as the present invention remain operable. Moreover, two or more steps or actions may be conducted simultaneously.

The following examples are put forth so as to provide those of ordinary skill in the art with a complete disclosure and description of how to make and use the invention and are not intended to limit the scope of what the inventors regard as their invention nor are they intended to represent that the experiments below are all or the only experiments performed. Efforts have been made to ensure accuracy with respect to numbers used (e.g., amounts, temperature, etc.) but some experimental errors and deviations should be accounted for.

EXAMPLES

Example 1

Formation and Transformation of Vaterite and Magnesium Oxide $NH_4Cl$ was dissolved into water. Lime containing magnesium oxide was added to the aqueous solution and mixed at 30° C. in a vessel. The precipitation reactor was an acrylic cylinder equipped with baffles, pH electrode, thermocouple, turbine impeller, and inlet and outlet ports for liquid feeds and product slurry. During startup, the $CaCl_2$)-containing solution was pumped into the reactor and a 4:1 $N_2$:$CO_2$ gas mixture was sparged into the reactor until the desired pH was reached. After achieving the desired pH, the $CaCl_2$)-containing solution was pumped into the reactor at a fixed flow rate. The mixture was stirred continuously. The vaterite and the magnesium oxide slurry were formed and were removed from the top of the reactor. The resultant vaterite and the magnesium oxide slurry were continuously collected into a holding container. The collected slurry was periodically vacuum filtered. The vaterite and the magnesium oxide filter cake was oven dried at 100° C. The cake showed 74% vaterite, 1% calcite, and 25% periclase via X-ray diffraction with a median particle size of 13.1 microns. The clear filtrate containing regenerated $NH_4Cl$ was recycled in subsequent experiments.

The dried vaterite and the magnesium oxide powder was mixed with water into a paste. The paste was cured at 80° C. and 98% relative humidity. After 1 day the hardened paste was removed from the curing environment and dried at 100° C. XRD analysis of the hardened paste showed 1% vaterite, 65% aragonite, 1% calcite, 1% periclase, and 32% brucite.

Example 2

Formation and Transformation of Vaterite and Magnesium Oxide

This Experiment demonstrated that the hydration of the magnesium oxide to form the magnesium hydroxide increased the volume of the solid fraction of the cement paste (vaterite transformed to aragonite) by chemically binding water, whereas the transformation of the vaterite to the aragonite (in the absence of the magnesium oxide) resulted in a decrease in the volume of the cement paste because the aragonite is denser than the vaterite. Table 2 compares the solid volume of a (a) pure calcium carbonate cement paste to (b) a calcium carbonate cement paste that contained 25% magnesium oxide. Table 2 below shows that the vaterite, periclase (MgO) and water formed the cement paste which after setting and hardening formed aragonite and brucite ($Mg(OH)_2$). The water in the paste (b) bound to the Mg(OH) 2 after setting and hardening of the cement. Replacing 25% vaterite with magnesium oxide resulted in a 20% increase in the solid volume of the hardened cement, which means that the cement had lower porosity and higher strength, hardness, and durability compared to a 100% calcium carbonate cement paste.

TABLE 2

| Cement | Property | Vaterite | Periclase | Water | Total | Aragonite | Brucite | Water | Total | Change (%) |
|---|---|---|---|---|---|---|---|---|---|---|
| | Density ($g/cm^3$) | 2.5 | 3.6 | 1.0 | | 2.9 | 2.4 | 1.0 | | |
| a) | Mass (g) | 100.0 | 0.0 | 30.0 | | 100.0 | 0.0 | 30.0 | | |
| | Solid Volume ($cm^3$) | 39.4 | 0.0 | | 39.4 | 34.0 | 0.0 | | 34.0 | −13.6% |
| b) | Mass (g) | 75.0 | 25.0 | 30.0 | | 75.0 | 36.2 | 18.8 | | |
| | Solid Volume ($cm^3$) | 29.5 | 7.0 | | 36.5 | 25.5 | 15.1 | | 40.6 | 11.3% |

Figure 6B:
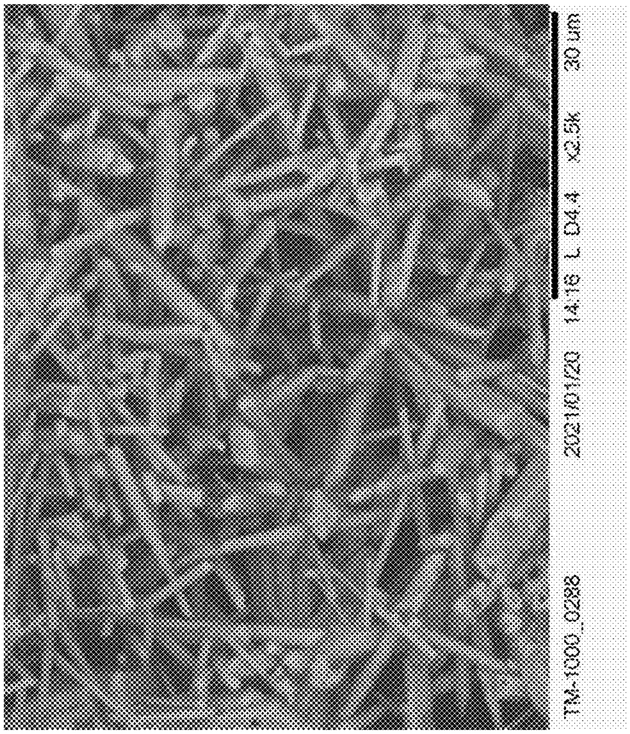
FIG. 6A and FIG. 6B illustrate scanned electron microscope images of calcium carbonate cement containing the aragonite made from the vaterite at 1000× magnification (FIG. 6A) and 2500× magnification (FIG. 6B).
Figure 6A:
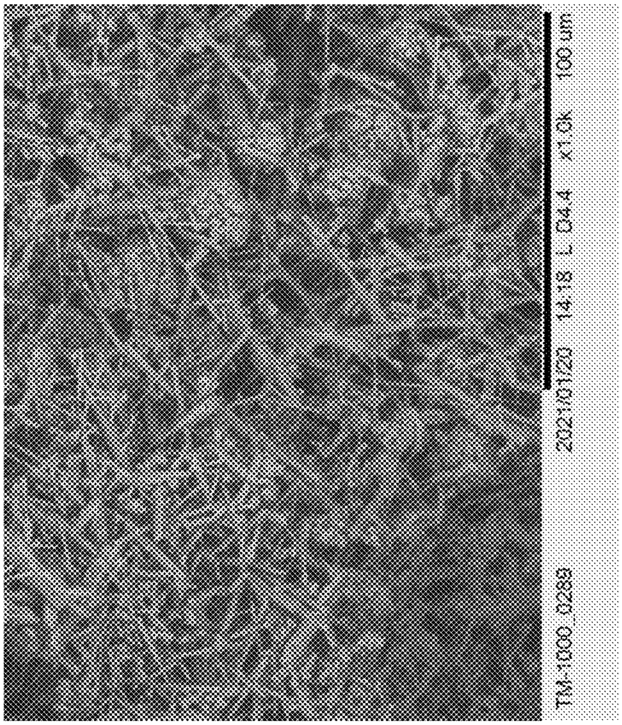
Figure 7A:
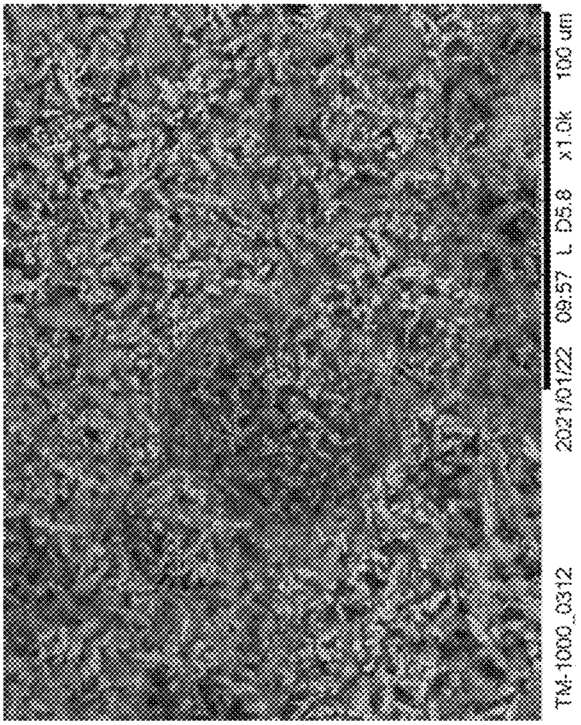
FIG. 7A and FIG. 7B illustrate scanned electron microscope images of calcium carbonate cement containing the aragonite and the magnesium hydroxide made from the vaterite and the magnesium oxide, respectively, at 1000× magnification (FIG. 7A) and 2500× magnification (FIG. 7B).
Figure 7B:
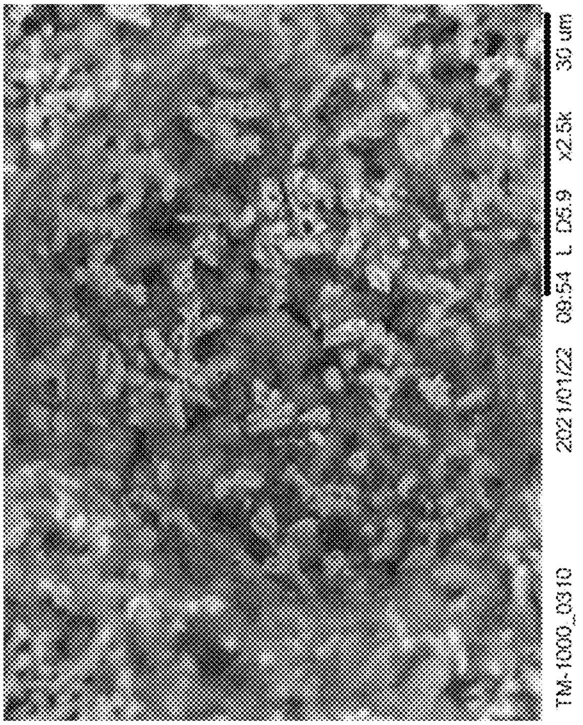

FIGS. 6-7 show the microstructural differences between the calcium carbonate cement made from the vaterite (FIGS. 6A-6B) and the calcium carbonate cement made from the vaterite and the magnesium oxide (FIGS. 7A-7B). In FIGS. 6A-B, the interconnected aragonite network of the calcium carbonate cement can be seen. In FIGS. 7A-7B, the magnesium hydroxide can be seen surrounding the aragonite network which helped to fill the porosity of the aragonite network and bind the aragonite needles together resulting in lower porosity and higher strength, hardness, and durability.

Example 3

Controlling Vaterite Transformation to Aragonite by Controlling MgO Firing Temperature Vaterite with a 4 μm median size was combined at a ratio of 4:1 with magnesium oxide that had been separately fired. The magnesium oxide was produced by firing magnesium hydroxide for 4 hours at either 750° C. or 950° C. A cement paste was formed by mixing the vaterite/magnesium oxide mixture with water at a water to solids ratio of 0.6. The paste was then cured in a sealed container at 80° C. for 24 hours. After curing, the paste was dried at 110° C., then analyzed via X-ray diffraction. Table 3 shows the X-ray diffraction results of the paste transformation study. As shown in Table 3, the 4 μm vaterite in combination with the lightly burned magnesium oxide (at 750° C.) had sufficient rate of dissolution of the magnesium ions to control the transformation of the vaterite to the aragonite. In contrast, the magnesium oxide burned at 950° C., did not dissolve readily enough and the vaterite transformed to the calcite.

TABLE 3

Quantitative X-ray diffraction results of the paste transformation

| Firing Conditions | Vaterite (%) | Aragonite (%) | Calcite (%) | Periclase (%) | Brucite (%) |
|---|---|---|---|---|---|
| 4 hr at 750° C. | 29 | 44 | 1 | 1 | 25 |
| 4 hr at 950° C. | 0 | 0 | 73 | 5 | 22 |

Although the foregoing invention has been described in some detail by way of illustration and example for purposes of clarity of understanding, it should be readily apparent to those of ordinary skill in the art in light of the teachings of this invention that certain changes and modifications may be made thereto without departing from the spirit or scope of the appended claims. Accordingly, the preceding merely illustrates the principles of the invention. It will be appreciated that those skilled in the art will be able to devise various arrangements, which, although not explicitly described or shown herein, embody the principles of the invention, and are included within its spirit and scope. Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein. It is intended that the following claims define the scope of the invention and that methods and structures within the scope of these claims and their equivalents be covered thereby.

What is claimed is:

1. A system to form a composition, comprising:

(i) a calcining reactor configured to calcine limestone to form a mixture comprising lime and magnesium oxide, and a gaseous stream comprising carbon dioxide;

(ii) a dissolution reactor operably connected to the calcination reactor configured for dissolving the mixture comprising lime and magnesium oxide in an aqueous N-containing salt solution to produce an aqueous solution comprising calcium salt and solid comprising magnesium oxide; and (iii) a treatment reactor operably connected to the dissolution reactor and the calcination reactor configured for treating the aqueous solution comprising calcium salt with the gaseous stream comprising carbon dioxide, to form a composition comprising vaterite and magnesium oxide.

2. The system of claim 1, wherein the aqueous solution further comprises ammonia and/or the N-containing salt.

3. The system of claim 1, wherein the dissolution reactor is further configured to produce a gaseous stream comprising ammonia and the treatment reactor is further configured to treat the aqueous solution comprising calcium salt with the gaseous stream comprising carbon dioxide and the gaseous stream comprising ammonia, to form the composition.

4. The system of claim 3, further comprising:

a cooling reactor operably connected to the dissolution reactor and the calcination reactor configured for recovering the gaseous stream comprising carbon dioxide and the gaseous stream comprising ammonia and subjecting the gaseous streams to a cooling process to condense a second aqueous solution comprising ammonium bicarbonate, ammonium carbonate, ammonia, ammonium carbamate, or combination thereof; and the treatment reactor operably connected to the dissolution reactor and the cooling reactor further configured for treating the aqueous solution comprising calcium salt with the second aqueous solution comprising ammonium bicarbonate, ammonium carbonate, ammonia, ammonium carbamate, or combination thereof to form the composition.

5. The system of claim 4, wherein the dissolution reactor is integrated with the cooling reactor.

6. The system of claim 1, wherein the calcining reactor comprises pre-calciner, shaft kiln, rotary kiln, electric kiln, or combination thereof.

7. The system of claim 1, wherein the limestone comprises magnesium or magnesium bearing mineral and/or wherein the system further comprises a mixer configured to mix a magnesium bearing mineral with the limestone before the calcination.

8. The system of claim 7, wherein the magnesium bearing mineral comprises magnesium carbonate, magnesium salt, magnesium hydroxide, magnesium silicate, magnesium sulfate, or combination thereof.

9. The system of claim 1, wherein the mixture comprises under burnt lime, soft burnt lime, dead burnt lime, under burnt magnesium oxide, soft burnt magnesium oxide, dead burnt magnesium oxide, or combination thereof.

10. The system of claim 1, wherein the N-containing salt is selected from the group consisting of N-containing inorganic salt, N-containing organic salt, and combination thereof.

11. The system of claim 1, further comprising a separator operably connected to the dissolution reactor configured to separate the solid from the aqueous solution.

12. The system of claim 11, further comprising a mixer operably connected to the treatment reactor and the separator configured to mix a composition comprising vaterite and the solid comprising magnesium oxide to form the composition comprising vaterite and magnesium oxide.

13. The system of claim 1, wherein the composition is a dry powder composition, wet cake composition, or slurry.

14. The system of claim 1, wherein the composition is a slurry composition further comprising aragonite, magnesium hydroxide, and water, wherein the aragonite is in the shape of a network of needles.

15. The system of claim 14, wherein the magnesium hydroxide is bound with the aragonite needles.

16. The system of claim 1, further comprising a mixer configured to mix the composition with admixture, aggregate, additive, Portland cement clinker, supplementary cementitious material (SCM), or combination thereof.

17. The system of claim 1, further comprising a system to form building material, formed building material, non-cementitious product, and/or artificial marine structure from the composition.

18. The system of claim 17, wherein the building material comprises concrete, aggregate, building, driveway, foundation, kitchen slab, furniture, pavement, road, bridge, motorway, overpass, parking structure, brick, block, wall, footing for a gate, fence, or pole, and combination thereof.

19. The system of claim 17, wherein the formed building material comprises brick, blocks, tile, construction panel, conduit, basin, beam, column, slab, acoustic barrier, insulation material, or combination thereof.

20. The system of claim 1, further comprising a control station comprising a set of valves which are manually, mechanically or digitally controlled, a computer interface, or combination thereof.

* * * * *